(12) United States Patent
Gould et al.

(10) Patent No.: US 9,459,920 B1
(45) Date of Patent: Oct. 4, 2016

(54) PROVIDING HIERARCHICAL THREAD STORAGE

(71) Applicant: EMC Corporation, Hopkinton, MA (US)

(72) Inventors: Christopher M. Gould, Lunenburg, MA (US); Peter J. McCann, Mason, NH (US); Joseph B. Caisse, Dracut, MA (US)

(73) Assignee: EMC Corporation, Hopkinton, MA (US)

( * ) Notice: Subject to any disclaimer, the term of this patent is extended or adjusted under 35 U.S.C. 154(b) by 222 days.

(21) Appl. No.: 14/038,847

(22) Filed: Sep. 27, 2013

(51) Int. Cl.
*G06F 13/00* (2006.01)
*G06F 9/44* (2006.01)
*G06F 9/50* (2006.01)

(52) U.S. Cl.
CPC ................................ *G06F 9/50* (2013.01)

(58) Field of Classification Search
None
See application file for complete search history.

(56) References Cited

U.S. PATENT DOCUMENTS

| | | | |
|---|---|---|---|
| 8,271,996 B1* | 9/2012 | Gould et al. | 719/312 |
| 8,387,075 B1 | 2/2013 | McCann et al. | |
| 8,555,297 B1* | 10/2013 | Gould et al. | G06F 9/547 719/330 |
| 2006/0059496 A1* | 3/2006 | Joy et al. | 719/310 |
| 2011/0117956 A1* | 5/2011 | Levi et al. | H04B 1/0003 455/552.1 |
| 2014/0282415 A1* | 9/2014 | Ovadia et al. | G06F 11/3636 717/125 |

* cited by examiner

*Primary Examiner* — H S Sough
*Assistant Examiner* — Kimberly Jordan
(74) *Attorney, Agent, or Firm* — Muirhead and Saturnelli, LLC

(57) ABSTRACT

Described are techniques for creating a thread. A first plurality of calls are issued to create the thread. The first plurality of calls are executed in the context of an executing first thread and form a call chain traversing a plurality of code layers in a first order. A data area including thread-specific context information is created and initialized at each of the plurality of code layers when code of each code layer is invoked in accordance with the interface of each code layer to create the thread. Each of the plurality of code layers is included in a registered set. Executing the thread includes issuing a second plurality of calls traversing said plurality of code layers in an order that is a reverse of the first order. The second plurality of calls result in transferring control to a first body of code for the thread.

21 Claims, 24 Drawing Sheets

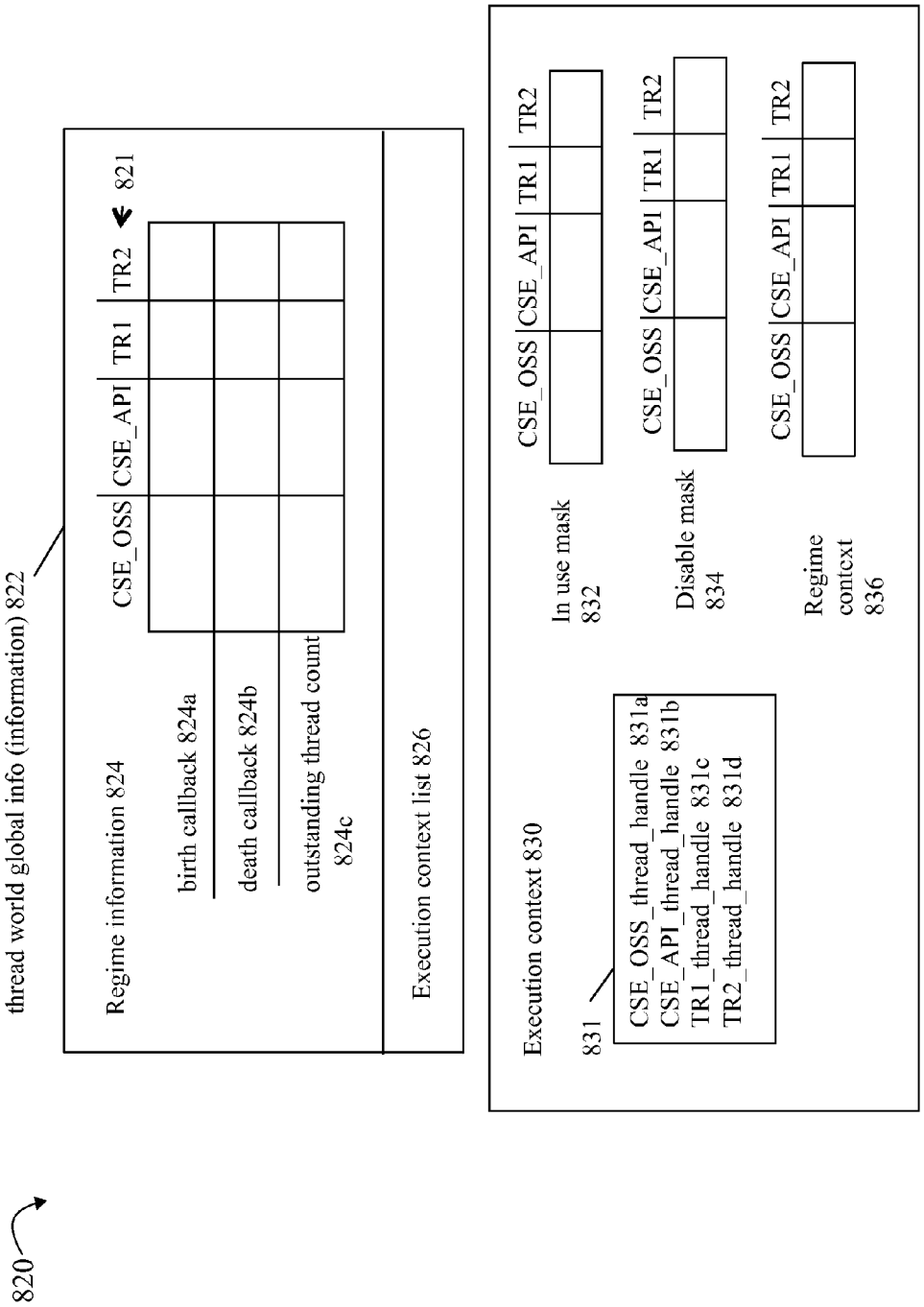

```
1401
/* User code can call TR1 APIs to retrieve contents specific to the TR1 thread regime */
TR1_thread_get_errno_value()
{
1402    execution_context = execution_context_find()

1404    TR1_thread_handle = thread_regime_context_get_and_init_on_first_use(execution_context,
                                TR1_REGIME_ID)

1406    return TR1_thread_handle->errno_value
}
```

```
1410
/* return pointer to regime context for a given regime if it exists. If it doesn't exist, we create it on demand */
thread_regime_context_get_and_init_on_first_use(execution_context, regime_id)
{
1410a   /* this happens when a thread already exists before a REGIME has been registered */
1410b   if (execution_context->regime_context[regime_id] == INITIALIZE_ON_FIRST_USE) {
            thread_regime_birth_callback_issue(regime_id, thread_regime_context_ptr_get(execution_context, regime_id))
1410c   return execution_context->regime_context[regime_id]
}
```

```
thread_regime_birth_callback_issue(regime_id, regime_context_ptr)
{
    /* if thread_birth_callback is registered */
    if(thread_world_global_info.regime_info[regime_id].birth_callback) {
        /* call registered birth callback */
        thread_world_global_info.regime_info[regime_id].birth_callback(regime_context_ptr)
        execution_context = execution_context_find()
        /* add current context to global list if it isn't already on there */
        if (execution_context->inuse_mask == 0) {
            add_context_to_list(thread_world_global_info.execution_context_list, execution_context)
        }
        /* set context to indicate regime is in use */
        set_bit(execution_context->inuse_mask, regime_id)
        /* increment count of outstanding threads */
        thread_world_global_info.regime_info[regime_id].outstanding_thread_count++;
    } else {
        /* birth callback for given regime isn't registered yet so set flag indicating we need to initialize it the first time it is used */
        *context = INITIALIZE_ON_FIRST_USE;
    }
}
```

1500

1501

1502 — /* if thread_birth_callback is registered */
1504 — /* call registered birth callback */
1506 — execution_context = execution_context_find()
1508 — /* add current context to global list if it isn't already on there */
1510 — /* set context to indicate regime is in use */
1512 — /* increment count of outstanding threads */
1514 — *context = INITIALIZE_ON_FIRST_USE;

FIG. 16

```
thread_regime_callbacks_unregister(regime_id)
{
    /* if there are any contexts that haven't been cleaned up yet for the given regime then clean up */
    if (thread_world_global_info.regime_info[regime_id].outstanding_thread_count > 0) {
        for each execution_context entry in thread_world_global_info.execution_context_list {
            /* if the context is in use for this regime set it to no longer be in use */
            if (bit_is_set(execution_context->inuse_mask, regime_id) {
                clear_bit(execution_context->inuse_mask, regime_id)
                /* if the context is no longer used at all we can stop tracking it in the global list */
                if (execution_context->inuse_mask == 0) {
                    remove_context_from_list(thread_world_global_info.execution_context_list, execution_context)
                }
                /* call the death callback for the regime */
                thread_world_global_info.regime_info[regime_id].death_callback(execution_context->regime_context[regime_id]);
            }
        }
    }
    /* set the birth/death callbacks for this regime to NULL so they are no longer called when a thread is created */
    thread_world_global_info.regime_info[regime_id].birth_callback = NULL;
    thread_world_global_info.regime_info[regime_id].death_callback = NULL;
} /* end thread_regime_callbacks_unregister
```

FIG. 17A

PROVIDING HIERARCHICAL THREAD STORAGE

BACKGROUND

1. Technical Field

This application generally relates to code execution, and more particularly to techniques used for communicating between different code modules.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage system containing a plurality of host interface units, disk drives, and disk interface units. The host systems access the storage system through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units. The logical disk units may or may not correspond to the actual disk drives. Allowing multiple host systems to access the single storage system allows the host systems to share data in the system. In order to facilitate sharing of the data on the system, additional software on the data storage systems may also be used.

Code modules that execute on a data storage system, as well as other systems, may use a variety of different techniques for inter-module communications. An environment in which the code executes may provide a facility for such inter-module communication.

SUMMARY OF THE INVENTION

In accordance with one aspect of the invention is a method of creating a thread comprising: issuing a first plurality of calls to create the thread, said first plurality of calls forming a call chain traversing a plurality of code layers in a first order, said first plurality of calls being executed in a context of an executing first thread, wherein said first plurality of calls includes a first call issued by the executing first thread to a first of the plurality of code layers in accordance with a first interface for the first call, each of said plurality of code layers providing a set of interfaces for making calls to code of said each code layer, each of said plurality of code layers providing an interface for invoking code of said each code layer to create the thread, wherein, for the thread being created as a result of said first plurality of calls, a data area including thread-specific context information is created and initialized at each of said plurality of code layers when code of said each code layer is invoked in accordance with said interface of said each code layer to create the thread, wherein each of said plurality of code layers is included in a registered set of code layers; responsive to a last one of the first plurality of calls in the call chain being issued to a last one of the plurality of code layers from another one of the plurality of code layers, creating the thread; and executing the thread, wherein said executing the thread includes issuing a second plurality of calls forming a callback call chain traversing said plurality of code layers in an order that is a reverse of said first order, wherein said second plurality of calls are executed in a context of the thread and results in transferring control to a first body of code for the thread whereby said first body of code is included in a user code module. The first body of code may begin execution responsive to said transferring control to the first body of code. Issuing the second plurality of calls may result in creating and initializing a data area including thread-specific context information for the thread for each code layer that is included in the registered set and wherein said each code layer is also not included in the plurality of code layers traversed when issuing said first plurality of calls to create the thread. Each of the code layers in the registered set may register a birth callback routine and a death callback routine. The birth callback routine of said each code layer may be invoked to perform processing including creating and initializing a data area including thread-specific context information for said each code layer. If said each code layer is not included in said plurality of code layers traversed when issuing the first plurality of calls, the birth callback routine of said each code layer may be subsequently invoked in connection with performing said issuing a second plurality of calls forming a callback call chain traversing said plurality of code layers in an order that is a reverse of said first order. Subsequent to said transferring control to said first body of code for the thread, a new code layer may register and may be included in said registered set. The method may also include executing code of the thread which results in transferring control to first code of said new code layer, said first code of said new code layer using thread-specific context information for said new code layer for said thread; determining that a data area including thread-specific context information for the new code layer for the thread does not exist; and responsive to said determining, creating and initializing a data area including thread-specific context information for the new code layer for the thread. The first code of said new code layer may perform processing using at least some of the thread-specific context information for said new code layer for said thread. Creating and initializing a data area including thread-specific context information for the new code layer for the thread may further include invoking a birth callback routine of said new code layer. A first runtime execution stack for the executing first thread may include said first plurality of calls and wherein a second runtime stack for the thread created may include said second plurality of calls, wherein the method further comprises the thread completing execution. Responsive to said thread completing execution, first processing may be performed, where the first processing may include unwinding said second runtime execution stack including returning through said second plurality of calls of the second runtime execution stack, wherein said returning through said second plurality of calls includes invoking a death callback routine for each of said code layers of said registered set if a birth callback routine for said each code layer was previously executed. Subsequent to the thread being created, processing may be performed to unwind said first runtime execution stack including returning through said first plurality of calls of the first runtime execution stack whereby the executing first thread continues execution of code following the first call. A death callback routine for a first code layer of said registered set may perform second processing including deallocating storage for a first data area including thread-specific context information for said first code layer, wherein said first data area was previously created and initialized by code of a birth callback routine of said first code layer. Responsive to invoking code of said each code layer to create the thread as part of said issuing said first plurality of calls, an entry in a disable bit mask array may be set to denote that said each code layer is included in the call chain comprising the first plurality of calls. Issuing said first plurality of calls may include executing first code of a first of said plurality of code layers that performs processing comprising: determining, using said disable bit mask array, for each other code layer that is supported which may possibly issue a create thread call to said first code layer using said interface of said first code layer to create a thread, whether said each other code layer issued said create thread call in said first plurality of calls; and setting a data item to have a value in accordance with said determining, said data item being included in first thread-specific context information for said thread for said first code layer. Issuing the second plurality of calls may include executing second code of said first code layer that determines, using said first thread-specific information for said thread for said first code layer, whether to invoke a birth callback of each other code layer which may possibly issue said create thread call to said first code layer to create a thread. One of the plurality of code layers in the registered set may perform processing to unregister. A first death callback may be specified for said one code layer when previously registering said one code layer. The first death callback may beinvoked for each existing first data area including thread specific context information for said one code layer.

In accordance with another aspect of the invention is a non-transitory computer readable medium comprising code stored thereon for creating a thread for execution, the non-transitory computer readable medium comprising code for: issuing a first plurality of calls to create the thread, said first plurality of calls forming a call chain traversing a plurality of code layers in a first order, said first plurality of calls being executed in a context of an executing first thread, wherein said first plurality of calls includes a first call issued by the executing first thread to a first of the plurality of code layers in accordance with a first interface for the first call, each of said plurality of code layers providing a set of interfaces for making calls to code of said each code layer, each of said plurality of code layers providing an interface for invoking code of said each code layer to create the thread, wherein, for the thread being created as a result of said first plurality of calls, a data area including thread-specific context information is created and initialized at each of said plurality of code layers when code of said each code layer is invoked in accordance with said interface of said each code layer to create the thread, wherein each of said plurality of code layers is included in a registered set of code layers; responsive to a last one of the first plurality of calls in the call chain being issued to a last one of the plurality of code layers from another one of the plurality of code layers, creating the thread; and executing the thread, wherein said executing the thread includes issuing a second plurality of calls forming a callback call chain traversing said plurality of code layers in an order that is a reverse of said first order, wherein said second plurality of calls are executed in a context of the thread and results in transferring control to a first body of code for the thread whereby said first body of code is included in a user code module. The first body of code may begin execution responsive to said transferring control to the first body of code and wherein each of said code layers in said registered set may register a birth callback routine and a death callback routine. Issuing said second plurality of calls may result in creating and initializing a data area including thread-specific context information for the thread for each code layer that is included in the registered set and wherein said each code layer is also not included in the plurality of code layers traversed when issuing said first plurality of calls to create the thread.

BRIEF DESCRIPTION OF THE DRAWINGS

Features and advantages of the present invention will become more apparent from the following detailed description of exemplary embodiments thereof taken in conjunction with the accompanying drawings in which:

FIGS. 9A, 9B and 14A illustrate data structures that may be used in an embodiment in accordance with techniques herein;

FIGS. 15, 16, 17 and 17A provide further details regarding processing that may be performed by different routines or bodies of code in an embodiment in accordance with techniques herein;

Figure 1:
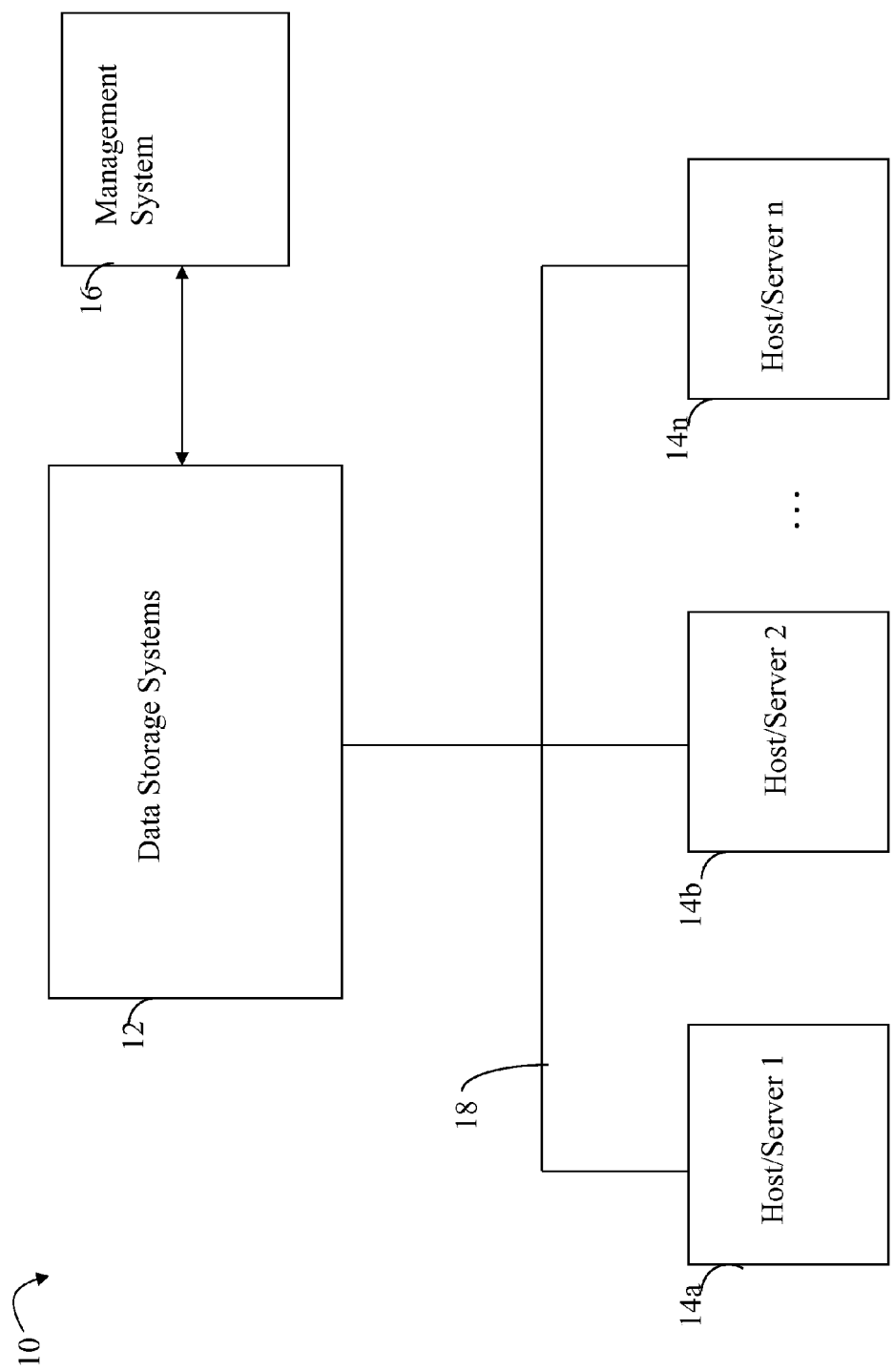
FIG. 1 is an example of an embodiment of a system that may utilize the techniques described herein.

DETAILED DESCRIPTION OF
EMBODIMENT(S)

With the growing popularity of all types of data storage devices, there is also a growing demand for software and features for data storage devices. However, developing software components for the devices is a difficult task because storage devices operate under constraints which at least in some cases are distinct or prioritized differently from those imposed on other types of computing systems.

For example, data storage devices require solutions to different sets of problems. A wide variety of data storage hardware solutions are available in the market. The solutions require significant efforts from software developers to provide high performance and reliability and other desired storage features and to integrate them with software solutions that would present to the end-customers easy and friendly user-interfaces. In addition, providers of hardware solutions are challenged to provide reasonable hardware-to-software interface mechanisms.

In many cases these constraints have resulted in providing largely static and non-expandable programming environments for data storage devices. The programming environments for these devices also tend to lack a common or standard interface to handle the integration of software components in a data storage environment. Thus, the creation of component-oriented software is rendered difficult and becomes a custom solution. Accordingly, conventional programming and testing environments for such devices present a substantial obstacle to software developers for such devices. Adding functionality to the operating system of a storage device can be difficult. Adding the same functionality to a storage device having a different operating system may require in general not only a different set of function calls and programming methods, but a different programming environment altogether.

Examples of conventional methods providing platform independence include the CORBA architecture and Sun Microsystems' Java. A CORBA architecture employs a middle layer called Object Request Broker ("ORB") to facilitate integration of software objects. The middle layer requires memory and a CPU's processing power.

A conventional Java architecture employs a virtual machine which provides platform independence at run-time. A virtual machine facilitates different object components to find each other, and the object components interact with each other via the virtual machine. Because object components interact and execute via the virtual machine versus execution of native code of the underlying processor, the processing speed is noticeably slowed down in a Java architecture. In addition, the virtual machine requires a large amount of memory and only executes code in user space. Furthermore, a software developer is required to use the Java language, and thus needs to expend a large amount of time and effort to become versatile in using a Java system. In addition, a large amount of legacy code written in non-Java language becomes unavailable in a Java architecture.

It is desirable to have flexible and platform independent programming environments for storage devices, especially given the growing demand for storage devices having a variety of different data storage system environments.

As described at least in part below, a storage software platform architecture can be provided that converges and leverages existing platform capabilities and technologies with other assets to provide a sustainable advantage.

In at least some implementations the architecture allows developers to focus on the customer experience and quality, improved product scalability, reliability, and availability, innovation in response to customer need, development of best of breed products and solutions, product line breadth, and enterprise and data center technologies. In at least some implementations the architecture also facilitates development and/or improvement in key areas such as convergence and leverage, ease of use, channel readiness, consistency and flexibility, application awareness, storage solutions and services, success at the lower end of the market, and efficiency, productivity, and focus of development resources.

In at least one aspect, the architecture is or includes a scalable, common architecture that can be extended across many technical and industry dimensions, and that takes into account that performance considerations vary, that availability and quality concerns may be high but have different complexities, that security is constant (but with perimeter versus internal security priorities varying), and that many different topologies exist. In at least one implementation, the architecture is or includes a unified architecture for integrated management of network attached storage (NAS), and object and storage block services.

The architecture may include features such as openness, application awareness, ease of use and management, partner enablement, scaling, globalization, enhanced platform architecture, and enhanced availability and reliability. Openness may rely on and/or leverage proprietary and third party technologies for accessibility and user interface. Application awareness may include automated discovery, application provisioning, and self-management. Ease of use and management may include a unified user experience, total lifecycle coverage, self-management, and active communities. Partner enablement may include features that facilitate sales channels and OEM arrangements. Scaling may include a range from small and medium size businesses to enterprise, and may include scaling up and scaling out. Globalization may include fully internationalized systems, with localized user interface screens and behavior. Enhanced platform architecture may include modular building blocks and well defined interfaces. Enhanced availability and reliability may include fault domains and autonomous management.

At least one implementation of the architecture takes into account that, from a high level perspective, many different storage platforms have many of the same features, such as moving data from one I/O chip to memory to another I/O chip, high availability, clustering, peer to peer replication, and drive management, and such platforms also support similar interface protocols, transformations, and methods. However, if such platforms have significantly varying implementations and external interfaces, and little commonality, development involves significant duplication of functionality and work, and it can be difficult to move technology or techniques from platform to platform, share or reuse technology or techniques, combine technology or techniques from different platforms together or with new applications, or otherwise avoid doing the same work multiple times. For example, if a new feature or new standard is needed, the new feature or standard must be implemented separately for each platform.

A convergence-oriented common software environment (CSE) based on the architecture takes into account different base architectural assumptions, different terminology for similar concepts, different behaviors or expressions for similar features, different high availability, different clustering, scaling, and non destructive upgrade models, different wire protocols (e.g., replication, mainframe), and different management interfaces and look-and-feel interfaces. As a result, the environment takes into account different software environments, different base operating systems dictating hardware, and different hardware dictating base operating systems.

Thus, the common software environment enables mechanical commonality as a prelude to enabling architectural commonality, with the results that the value of developed technology increases, commonality increases, it takes less work to maintain the same base of functions or add features, flexibility increases, the ability to effect rapid change is improved, technology and techniques are freed from existing mechanical then architectural constraints, the ability to combine existing technology and techniques with new technology and techniques in new ways increases, lost opportunity costs are regained, resources are freed up to refactor and rationalize rather than rewrite or discard current technology or techniques, the underlying basics of technology is preserved, enabling virtualization, code is strengthened by preserving field experience, development, testing, and support are made more efficient, and reliability is improved.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the system 10. In one embodiment, the communication medium 20 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a switching equipment, a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, a touchpad, and the like. A data storage system manager may, for example, view information about a current storage volume configuration on a display device of the management system 16.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with techniques described in following paragraphs which are part of a common software environment (CSE).

In another embodiment, the data storage systems 12 may include one or more data storage systems such as one or more of the data storage systems, such as a data storage array, offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for the common software environment.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

The common software environment may include components described herein executing on each data storage system. Each of the data storage systems may have any one of a variety of different hardware and software platforms comprising a supported environment. For example, a first data storage system may include the common software environment with a first operating system and underlying hardware. A second data storage system may include the common software environment with a different operating system and different underlying hardware.

The common software environment (CSE) includes a framework which may be implemented using APIs (application programming interfaces) and other code modules described herein. The APIs may implement the underlying functionality which varies with the different possible data storage system hardware and software platforms. As such, code may be written using the APIs so that the code is insulated from the underlying platform dependencies. The code may be executed on any data storage system utilizing the APIs regardless of the particular hardware and/or software platform of the data storage system. Additionally, the API code of the CSE may be written so that the code is allowed to execute in user space or kernel space as will be described in more detail herein. As such, the API may utilize the underlying primitives of the particular operating system or may also emulate functionality on an operating system lacking a particular feature. A code module using the API can also execute in user mode or kernel mode on a supported operating system. For example, a code module may make a first API call to CSE on a data storage system having a first operating system. For the first operating system, the API of the CSE may implement the first API call utilizing the underlying primitives of the first operating system. The code module may also be executed on another data storage system having a second different operating system. For the second operating system, the first API call to CSE may be implemented using the primitives of the second operating system. The second operating system may not have a rich or full set of primitives so the API code of the CSE may emulate the necessary functionality of the primitives missing from the second operating system. The API code of the CSE uses the underlying operating system primitives where available and may otherwise synthesize or emulate the functionality necessary as may vary with the capabilities of each operating system.

As described in more detail below, a code module may also be coded for use with other APIs besides the API of the CSE.

Figure 2:
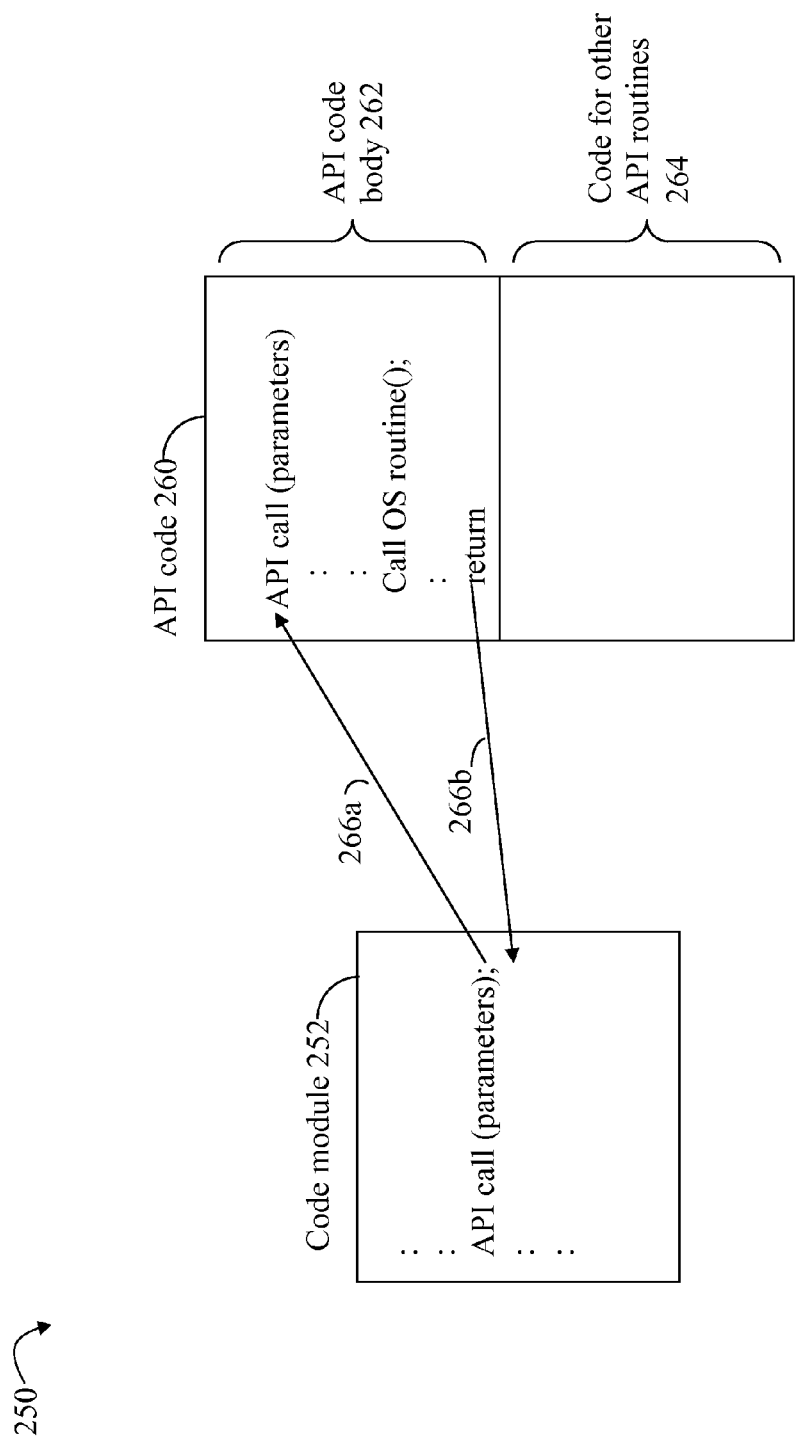
FIG. 2 is an example illustrating how code of the CSE (common software environment) API may be used as a wrapper around platform-dependent calls to insulate a code module and promote portability in an embodiment using the techniques herein.

Referring to FIG. 2, shown is an example illustrating general data flow between a code module and code of an API of the CSE in accordance with techniques herein. The example 250 also illustrates the API code utilizing underlying native operating system functionality. The API code effectively provides a "wrapper" or layer of code around the underlying operating system calls that may be made to implement functionality of the particular API feature and operation. The API thus insulates the code module 252 from the different operating system specific calls that may be made to implement the API functionality providing portability of the code module across different operating systems that may be used in different execution environments. It should be noted that, as described herein, the underlying operating system functionality may vary with environment. Where a particular functionality needed to perform an operation in connection with the API is not directly available in a native operating system, the functionality may be emulated or synthesized using other functionality which is available in the native operating system.

The example 250 includes code module 252 which makes a call, "API call (parameters)", to code in the API of the CSE. When the code module 252 is executed and the foregoing API call is made, control is transferred to an entry point in the API code 260 as indicated by 266a. The API code body 262 is executed and may invoke one or more operating system routines (OS routines) to implement the particular operation of the API call. Subsequently, control is returned to the code module 252 as indicated by 266b when the API code body 262 has completed. It should be noted that in the example 250, the code module 252 calls a routine in the API. The code module 252 may be code developed to run in user mode, kernel mode, and/or in any one of a variety of different environments each having a different operating system. The API routine may return to the calling routine once the called API routine has completed.

The example 250 illustrates a template in which functionality provided in the native environment, such as by an operating system, may be used by the API of the CSE so that user or developer code invokes the CSE API rather than calling the underlying operating system routines directly. Such code which invokes the API rather than directly invoking the underlying operating system routines provides portability of the developed code module across user and kernel mode as well as the different supported environments.

As described above, the CSE may include the API code 260 and other code modules to implement the framework providing portability among different hardware and software platforms (e.g., different operating systems, data storage systems and underlying hardware, and the like). The common software environment may include other code provided as a layer between the API and operating system specific code.

The same API of the CSE may be used by a code module when the code module is executed in user space, kernel space, and/or on different data storage systems having different environments such as different operating system and/or processor architecture. The code module may make CSE API calls so that the API implements the same set of API calls to facilitate portability of the code module for execution in user space, kernel space, different operating systems, or on any one of a variety of different software environments that may be supported in accordance with the functionality included in the API. Thus, a module coded using the CSE API may be executed in user mode, kernel mode, or on any supported operating system and calls may be made between two modules coded in accordance with different software environments. Furthermore, the same module may be executed on different data storage systems having different data storage system environments provided the particular data storage system environment is supported by the CSE API code. Thus, processing dependencies that may vary with operating system and/or underlying processor architecture may be handled by the API code of the CSE so that a module utilizing the CSE API may be executed in a variety of different data storage system environments as well as user or kernel mode.

The foregoing describes a user code module, such as module 252, which may be coded for use in accordance with the CSE API such as to create a thread. However, it may also be possible that other existing code modules are coded for use in accordance with a different API for creating threads. For example, a user code module may be coded to use another different API such as for use with a particular operating system, such as a Unix-based operating system or a proprietary operating system, such as the DART (Data Access in Real Time) real-time operating system by EMC Corporation. (The DART operating system runs on EMC data storage systems such as the EMC Celerra family of data storage system products by EMC Corporation. Code of the other different API may, in turn, invoke the CSE API to create a thread.

A code module creating a thread may result in multiple create thread API calls through a hierarchy of different layers of APIs. Thus, there may be multiple thread regimes or API layers each corresponding to a different thread model. Each such thread regime or layer may provide an API invoked for implementing and using threads based on a different thread model. For example, a first thread regime may provide a first API for use when creating and using threads with a first operating system, such as a Unix operating system, and its particular first thread model or implementation. A second thread regime may provide a second API for use when creating and using threads with a second operating system, such as the DART operating system, and its particular second thread model or implementation. A first user code module may be coded in accordance a particular first thread model or implementation of the first operating system using APIs of the first thread regime so that threads of the first code module may use thread-specific runtime context information of the first thread model. Similarly, a second user code module may be coded in accordance a particular second thread model or implementation of the second operating system using APIs of the second thread regime so that threads of the second code module may use thread-specific runtime context information of the second thread model.

In an environment described herein, a first code entity of the first user code module may call a second code entity of the second user code module whereby both the first and second code entities may execute in the context of the same first thread. It should be noted that use of the term "code entity" herein may generally refer to any suitable unit of executable code in an embodiment, such as a function, routine, handler, and the like. Described herein are techniques that may be used to facilitate making such calls between two different code entities executing in the context of the same thread whereby the two code entities are each coded for execution in different hardware and/or software environments, such as different operating systems. As noted above, a first code module may include a first module with a first code entity coded for execution on a Unix operating system, and a second code module including the second code entity may be coded for execution on a different operating system, such as the DART operating system. As such, code entities of the two modules each coded for use in a different hardware and/or software environment, may use different threading regimes or APIs each of which use different thread-specific information or context for a particular thread model of the regime. Thread-specific context information may be, for example, runtime state information (e.g., different runtime error code and error state information recorded upon the occurrence of an error for a particular thread regime), thread attributes and thread-local storage particular to a regime or thread model, and the like. For example, a first code entity of a first code module coded for execution on a first operating system may have a first attribute and/or runtime state information which are unknown or not included in thread-specific context information for a second thread model used by the second module (and second code entity thereof) which is coded for execution in a second operating system. However, when executing in the context of a thread making calls from a first code entity of a first module coded for use in the first operating system to a second code entity of the second module coded for use in the second operating system, it may be necessary to provide the invoked second code entity of the second module with sufficient thread context information of the first thread, where such context information is particular for use with the second operating system, to properly execute the code of the second entity of the second module when invoked by the first entity of the first module. For example, the first module may be coded to use first thread-specific context information applicable in the first operating system which needs to be provided in connection with the call made to code of the second module (coded for the second operating system) which may use different thread-specific context information than code of the first module (coded for use with the first operating system).

As such, when executing in the context of a single thread, techniques herein may be used to facilitate making calls between different code entities of different modules, such as of the foregoing two modules coded for use in different environments which use different thread regimes based on different thread models by establishing appropriate thread context information needed for making calls across all registered supported environments. Furthermore, an embodiment in accordance with techniques herein may include a CSE layer which facilitates execution of both the first and second code modules on the same system and in the same environment by emulating or simulating any needed functionality. The CSE layer and first and second code modules may execute in the context of a single thread of a process on any supported underlying native hardware and/or software.

Techniques herein may be used to ensure that, for a call made between a first code entity of a first code module to a second code entity of a second code module where each of the two entities execute in the context of the same thread and the two modules may use any supported threading regime and model, the called or invoked second code entity of the second module has available the appropriate thread-specific context information for the particular thread regime and thread model used by the operating system of invoked second entity of the second module. Techniques herein may be used to facilitate calls between two bodies of executing code each from a different module coded for use with a different regime and thread model where each body of executing code may execute in the context of the same thread.

The thread regimes or layers may be stacked at runtime (e.g., form a runtime call stack). For example, a first module may use a first API to create a thread which results in a first call to a first thread regime. The first thread regime may include code which further uses a second API to create the requested thread which results in a second call to a second thread regime. In connection with examples provided herein, a C-like or pseudo-code level syntax may be used to express parameters, calls, and the like.

Figure 3:
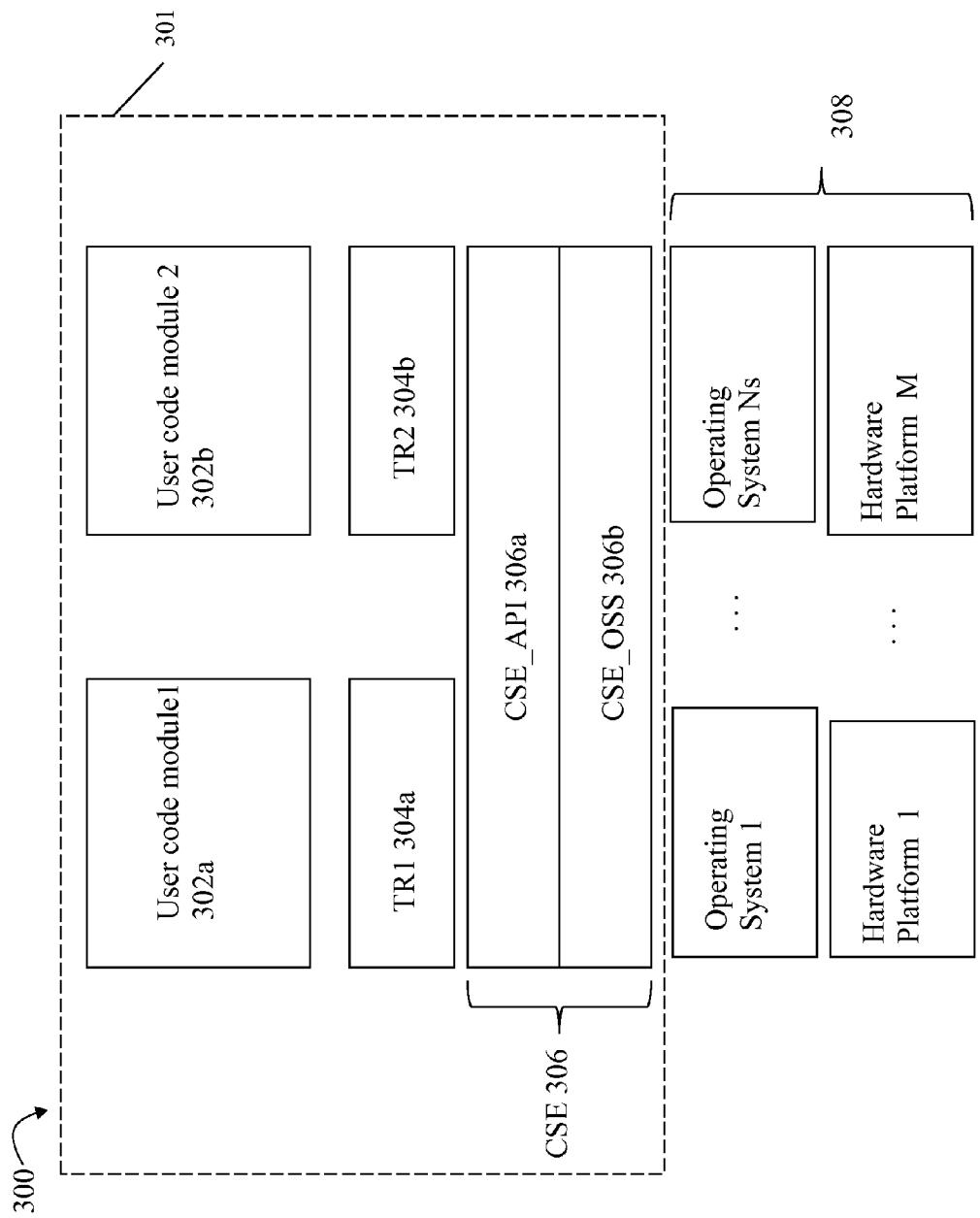
FIGS. 3 and 4 are examples of components that may be used in an embodiment in accordance with techniques herein.

Referring to FIG. 3, shown is an example illustrating components that may be included in an embodiment in accordance with techniques herein. The example 300 includes user code modules 302a, 302b, thread regimes (TRs) 304a, 304b, and CSE layer 306. The user code module 1 302a may be coded for use in a Unix-based operating system using a Unix-based thread regime and model. For example TR1 may represent the Unix thread regime that includes a first API and thread model used by the code module 1 302a to create threads. Code of TR1 302a may implement and create threads by making calls to the CSE layer 306 which further includes multiple thread regimes CSE_API 306a and CSE_OSS 306b. Thread regime CSE_API 306a may include the API exposed or presented by CSE for use by other code which makes calls into the CSE layer 306. Thread regime CSE_OSS 306b may represent a CSE internal regime which acts as a further insulating layer or regime between 306a and 308. CSE_OSS 306b may include a lower level CSE-internally used API which provides an API implementation specific to a particular operating system and makes calls to the different supported native operating systems (e.g., any of the operating systems 1-n as represented in layer 308). TR2 304b may represent the DART operating system-based thread regime that includes a second API and second thread model used by the code module 2 302b to create threads. Code of TR2 302b may implement and create threads by making calls to the CSE layer 306 in a manner similar to code of TR1 302a noted above. The user code module 2 302b may be coded for use in a system running the DART operating system using a DART operating system-based thread regime and model and therefore use the API provided by TR2 304b for creating threads.

Consistent with description herein, CSE 306 may be a layer which insulates code above the CSE layer 306 from dependencies of the underlying operating system or hardware platform 308 that may be in use on a particular system. Element 308 includes operating system 1 through operating system n and hardware platform 1 through hardware platform n and represents the various possible combinations of underlying hardware and/or operating system software that may exist in a supported system. Thus, the CSE layer 306 may include code to appropriately interface with all supported combinations of hardware and software of 308 to thereby insulate any code above CSE 306 from dependencies in the underlying operating systems and hardware platforms of 308. It should be noted that 308 is not meant to imply that a single system includes all combinations of operating systems and hardware platforms. Rather, element 308 represents the fact that a single system may include any particular one of the "N" operating systems and/or particular one of the "M" hardware platforms and the CSE 306 may insulate code layers above 306 from any coding dependencies of the particular operating system and/or hardware platform.

Element 301 may represent a single executing process having its own process address space, execution fault domain, and the like. Element 301 illustrates that each of the different elements included therein may be included in the same process and mapped for execution in the same single process address space. It should be noted that there may be a single physical copy of the different regimes or layers 304a, 304b, 306a and 306b which may be mapped for use into the single process address space for process 301. For example, 304a, 304b, 306a and 306b may be API routines having code included in one or more libraries which are mapped for use into the address space of each individual executing process.

Figure 4:
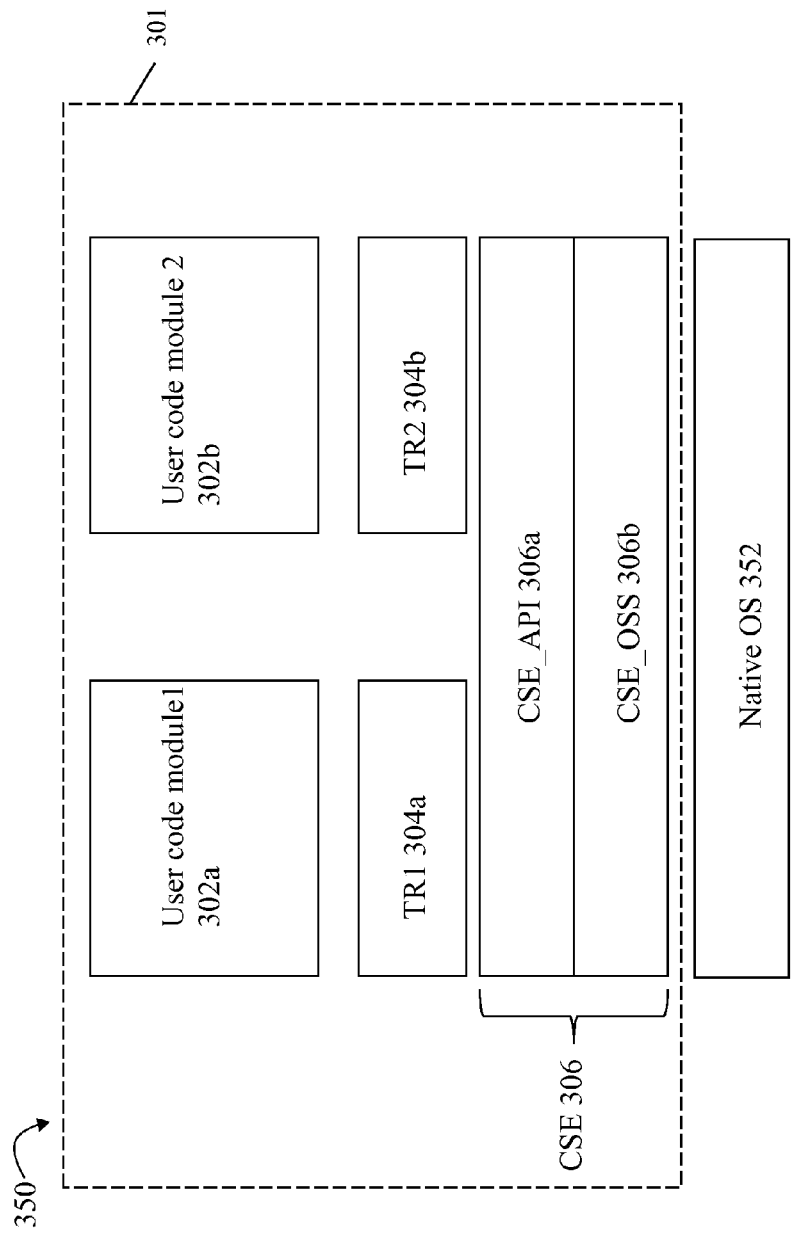

It should be noted that element 301 representing a single process and its associated address space and may be omitted in some subsequent figures for sake of simplicity In accordance with techniques herein, user code module 1 302a may include code to create a first thread and may also include code of a first code entity executing in the context of the first thread. The first code entity may make a call to a second code entity of user code module 2 302b, whereby both the first and second code entities execute in the context of the same first thread. To facilitate such calls and ensure that the appropriate thread context information for the first thread may be provided to the second code entity coded for use with a second thread model and regime different from a first thread model and regime used the first code entity, techniques described in following paragraphs may be utilized. There may be a different instance of CSE_OSS 306b for each of the different "N" supported operating systems of 308. Each of the different "N" supporting operating systems may provide a native operating system (OS) layer or API for implementing native threads. This is represented in FIG. 4 where element 352 represents a particular native OS layer supported by the CSE layer 306 (e.g., a particular 1 of the N operating systems represented by 308 that may run on a particular system). There may be an instance of 352 for each particular "N" native operating system. The example 350 of FIG. 4 may represent different software layers in an embodiment in accordance with techniques herein.

Each of the foregoing regimes 304a, 304b, 306a and 306b may have its own set of APIs and associated code bodies such as for thread creation, and for other thread-based operations.

Thus, when user code module 1 302a executes and performs a call to create a thread using an API of 304a, a call is made to code of TR1 304a resulting in a runtime transfer of control to code of 304a. Responsive to the call to 304a, code of TR1 304a makes a call to create a thread using an API of 306a resulting in a runtime transfer of control to code of 306a. Responsive to the call to code of 306a, code of 306a makes a call to create a thread using an API of 306b resulting in a runtime transfer of control to code of 306b. Responsive to the call to 306b, the code of 306b uses a native OS API to create a native OS thread. In this manner, the initial call from 302a to create a thread results in a runtime execution stack including multiple thread regimes and layers.

The foregoing of FIGS. 3 and 4 are exemplary layers and regimes that may be used in an embodiment. An embodiment may more generally include any number of regimes and layers.

Techniques described in following paragraphs provide the appropriate thread context information at each layer and regime to facilitate making calls between threads of different code modules 302a, 302b each possibly coded based on a different thread regime and thread model.

With reference to FIG. 4, elements 304a, 304b, 306a, 306b and 352 may be included in infrastructure code of a system and facility in accordance with techniques herein for use by one or more user code modules 302a, 302b. Each of the layers or regimes 304a, 304b, 306a, 306b and 352 may represent a body of code providing an API for use by a layer above said each layer in the runtime stack.

Each of the layers or regimes 304a, 304b, 306a, 306b and 352 may be characterized as providing an API for creating and using threads, as well as possibly other processing. In connection with a runtime stack or call chain for creating a thread, a first API at an upper level in the stack for creating threads is mapped to a second API at a lower level in the stack for creating threads. Thus, to create a thread generally involves invoking multiple APIs for creating threads at different levels in the runtime stack based on such mapping between APIs of different levels or regimes.

What will be described in following paragraphs are some examples of increasing and varying complexity illustrating the different layers and regimes that may be included in a particular runtime stack for creating threads depending on which thread regime API and thread model is used by the user code module.

A first example will consider a user code module which interfaces directly with the CSE_API 306a. A second example will consider a user code module, such as module 302a, which interfaces directly with a different TR, such as TR1 304a, that runs on top of CSE_API 306a. A third example will consider a more complex example in which not all the thread regimes are loaded and registered when a first module creates threads. For example, as part of initialization or startup, only the native OS 352 and the lower regimes CSE_OSS 306b may be loaded for use. The first user code module may interface directly with the CSE_OSS 306b layer to create worker threads as part of this initialization process. Later on, additional regimes 306a, 304a and 304b may be loaded and registered for use. Techniques herein may be used to further provide appropriate context information for use in regimes 306a, 304a, and 304b since it may be possible that threads of the CSE_OSS layer or regime may make calls to and/or receive calls from other threads or bodies of code which use any one or more of the regimes 306a, 304a and 304b. In other words, the third example illustrates processing that may be performed with a thread which is created prior to other upper level thread regimes, such as 304a, 304b, being registered and loaded.

Figure 5:
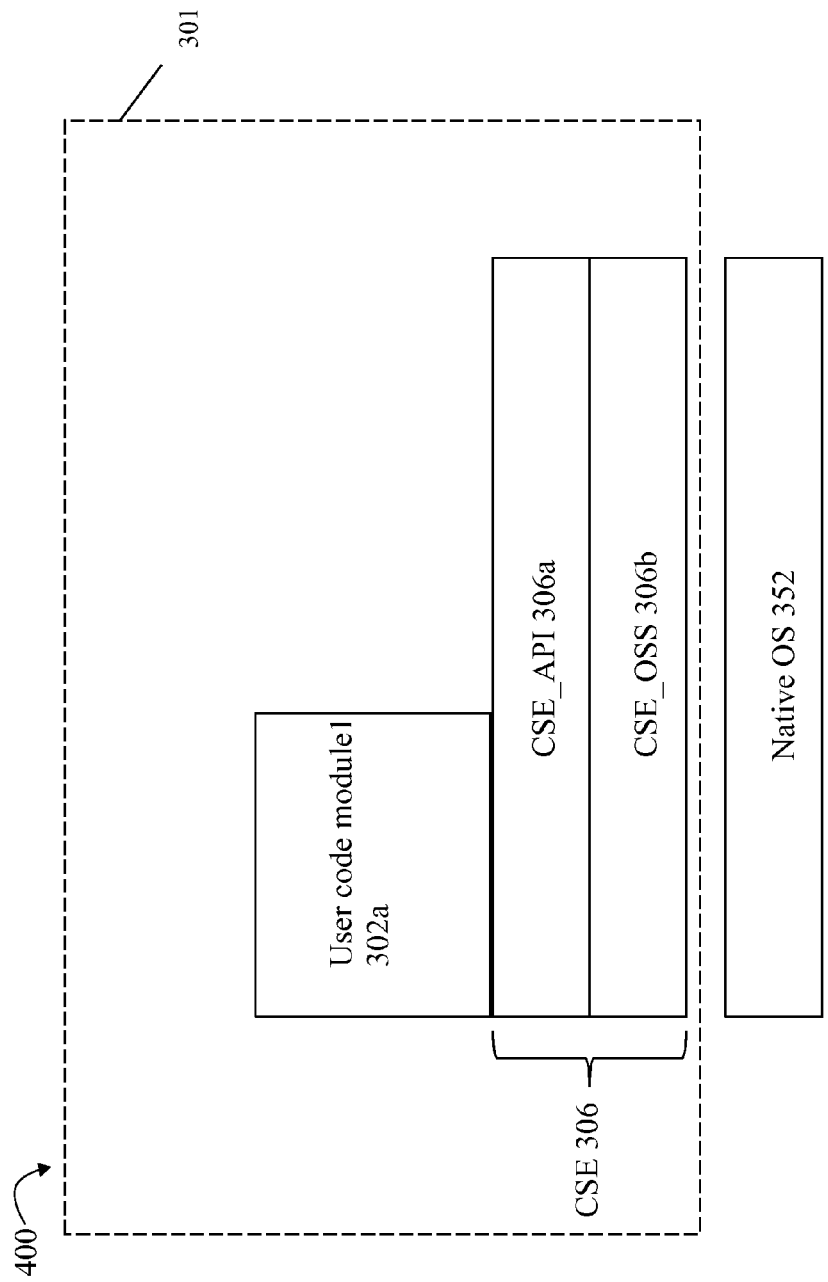
FIGS. 5, 6, 7, and 8 are illustrations used in connection with a first example in an embodiment in accordance with techniques herein.

Referring to FIG. 5, shown is an illustration of the first example in accordance with techniques herein. As mentioned above, the first example described in following paragraphs is made with reference to the illustration of 400 where a user code module 1 302a uses the thread API or regime and associated thread model of the CSE_API 306a to directly call into the code of the regime 306a to create a thread. In accordance with techniques herein, the runtime stack of regimes or layers may include 306a, 306b and 352 with a different create thread API being invoked at each layer or regime in the foregoing stack at runtime responsive to an initial call made from 302a to 306a to create the thread. This runtime call stack is further illustrated with reference to FIG. 6.

Figure 6:
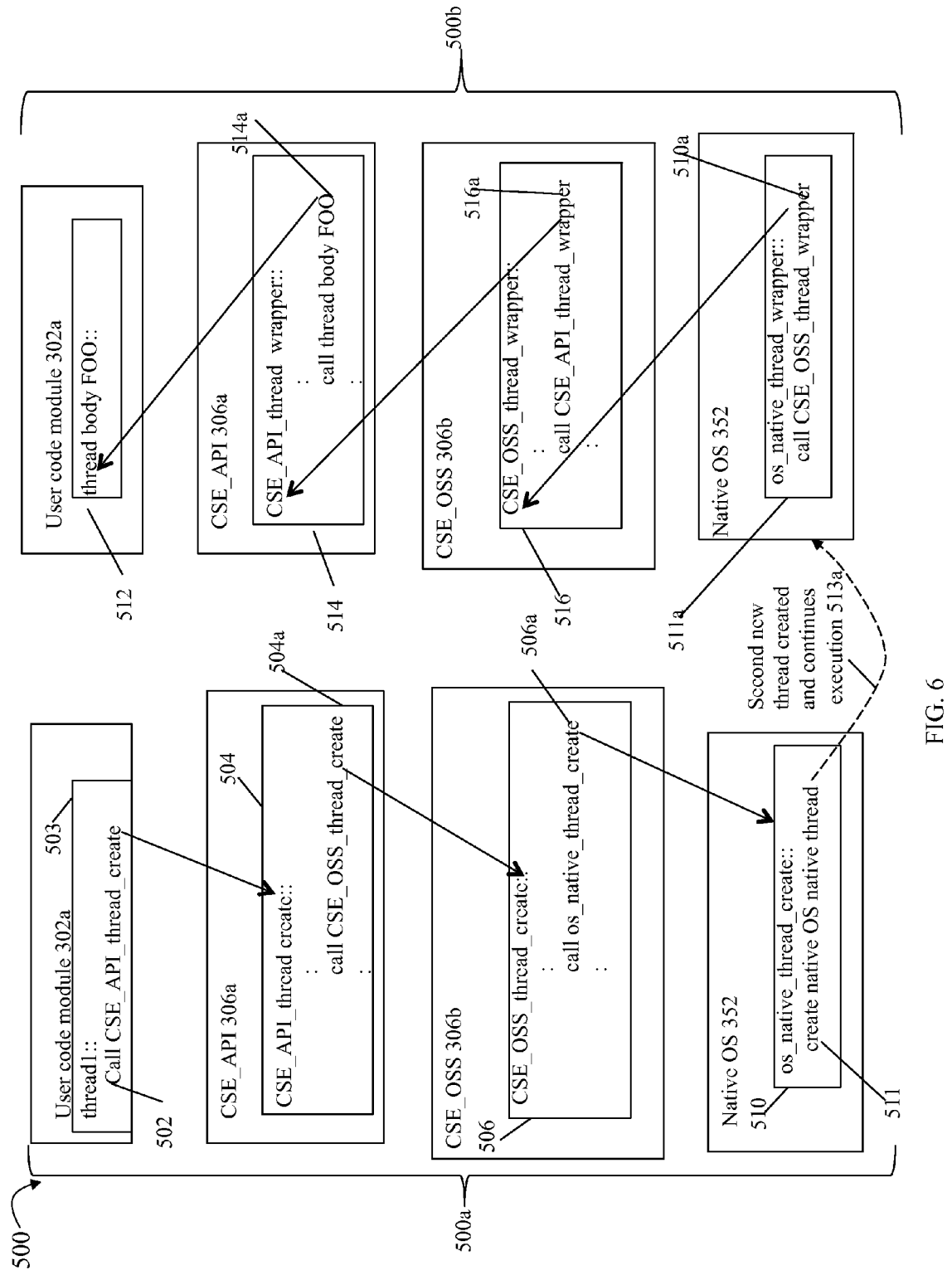

The example 500 of FIG. 6 illustrates the runtime execution flow of the first example. The four boxes on the left hand side illustrate runtime execution flow between different regimes or API layers going down the runtime stack to create a new second native thread between different create thread APIs of the different layers or regimes. The sequence of calls illustrated by the four boxes on the left hand side 500a may form a first runtime call stack that may also be referred to as the create thread call chain. Code 503 of a first executing thread may include call 502 to create a second new thread. In connection with creating this second new thread and responsive to executing call 502, the sequence of API calls of the first runtime call stack including the create thread call chain through layers 302a, 306a, 306b and 352 may be made resulting in creation of the second native OS thread by executing 511. It should be noted that execution of the create thread call chain 500a to create the second new thread are executed in the context of the first thread. Once the second new native OS thread has been created at 511, the processing of the first thread may return up the runtime stack 900a through the layers 352, 306b, 306a where the first thread resumes execution following the point of invocation 502 which created the second new thread.

Subsequently, the newly created second thread spawned by the native OS create thread call at 511 continues processing (as denoted by 513a) with its own runtime stack. In the context of the newly created second thread, processing and runtime flow continues with an additional chain of calls traversing back through the layers of the create thread call chain in a reverse layer ordering as illustrated by the different regimes or API layers on the right hand side of the example 500. The sequence of calls illustrated by the four boxes on the right hand side 500b may be included in a second runtime call stack for the second thread that may be also be referred to herein as the callback call chain which includes a sequence of callbacks between layers or regimes from the native OS 352 to a code body of the newly created second thread in the user code module 302a.

Thus, element 500a represents a create thread call chain that may be included in the first runtime call stack for the first thread to create a second new thread. Element 500b represents a callback call chain that may be included in a second runtime call stack for the newly created second thread.

In connection with the runtime execution flow down the runtime stack of regimes or API layers, reference is made to the 4 boxes on the left side of the example 500 comprising the create thread call chain whereby such processing executes in the context of the first thread. The create thread call chain illustrated by the 4 boxes on the left side illustrates the series of calls between thread create APIs of different layers or regimes. In a first step, a call is made from user module 302a at statement 502 to CSE_API 306a using the appropriate API call CSE_API_thread_create of the regime 306a. Element 504 represents the body of code for the entry point CSE_API_thread_create to which control is transferred as a result of executing 502a. In a second step, a call is made from the body of code 504 at line 504a to the CSE_OSS 306b using the appropriate API call CSE_OSS_thread_create of the regime 306b. Element 506 represents the body of code for the entry point CSE_OSS_thread_create to which control is transferred as a result of executing 504a.

In a third step, a call is made from the body of code 506 at line 506a to the native OS 352 using the appropriate API call os_native_thread_create of the regime 352. Element 510 represents the body of code for the entry point os_native_thread_create to which control is transferred as a result of executing 506a. The code of 510 results in creation of a new second native thread at line 511. Following execution of line 511, two things occur. First, the first thread processing returns up the create thread call chain 500a to the point following 502 whereby the first thread may then continue execution. Secondly, the second new native thread is created as a result of the line 511 whereby the second thread then proceeds with its own runtime execution flow with calls denoted by 500b from the native OS 352 to each regime or API layer previously traversed in connection with the create thread API call chain.

In connection with the runtime execution of the second new thread including a next set of calls through the regimes or API layers, reference is made to the 4 boxes on the right side of the example 500 comprising the callback call chain 500b. After the new second native OS thread is created in 511, the newly created second thread commences execution with the os_native_thread_wrapper routine or callback 511a. Code of 511a then performs a callback into the regime or layer 306b. The callback from 352 to 306b is represented by statement 510a which is a call to CSE_OSS_thread wrapper resulting in transfer of control to the body of code 516 having entry point CSE_OSS_thread_wrapper. The body of code 516 may then perform a callback into the regime or layer 306a. The callback from 306b to 306a is represented by statement 516a which is a call to CSE_API_thread wrapper resulting in transfer of control to the body of code 514 having entry point CSE_API_thread_wrapper.

The body of code 514 may then perform a callback into the user code module 302a to the entry point for the thread body of code FOO. In this example, FOO may represent the code body of the newly create second thread which is now being executed as a result of the transfer of control to 512. The callback from 306a to 302a is represented by statement 514a which is a call to thread body FOO resulting in transfer of control to the body of code 512 having entry point thread body FOO.

Each regime or level has thread-specific context information for each thread created such as for the second thread described above. When a create thread API call of the create thread call chain is performed from a first layer or regime to a second layer or regime (where the first layer is above the second layer in the runtime stack as illustrated by the execution flow on the left side of the example 500), the first layer or regime provides the address or entry point of the callback routine body of code located in the first layer or regime. The address or entry point of the callback routine may be communicated from the first layer to the second layer as a parameter of the create thread API call made from the first layer to the second layer. Subsequently, the callback routine of the first layer may be invoked from the second layer at a later point in time in the callback call chain.

As described herein, the callback is included in a series of subsequent callbacks forming the callback call chain illustrated by the execution flow through the layers 352, 306b, 306a, 302a (as denoted by the 4 boxes on the right side of FIG. 6) As illustrated in 500b by the boxes on the right hand side of the example 500, the order in which the layers or regimes are traversed in connection with the callbacks from the native OS 352 to thread body FOO 512 of 302a is the reverse ordering of layer traversal associated with the create thread API call chain (e.g., reverse ordering of the runtime traversal of layers illustrated by the boxes on the left side of the example 500).

Processing that may be performed by each of the thread_ wrapper code bodies 516 and 514, as well as other bodies of code, and also the API details for the various calls are described in more detail elsewhere herein.

The chain of callbacks as illustrated by execution flow on the right side of the example 500 results in transferring control through the various layers 352, 306b, 306a, 302a until the thread body 512 is reached in the user code module 302a. The mechanism providing the linkage for performing the callbacks is described in more detail in following paragraphs.

The foregoing generally describes the runtime execution flow of the calls performed for creating a thread for the different layers or regimes. What will now be described is the information that may be accumulated at each layer, how information from one layer is passed to another layer in the runtime stack in connection with the create thread call chain (e.g., boxes on the left side of FIG. 6) of the first thread issuing an initial call 502 to create the new second thread, and how the various layers of the create thread call chain runtime stack are then traversed in reverse order in connection with a subsequent series of callbacks (e.g., boxes on right hand side of FIG. 6) comprising the runtime call chain of the second newly created thread.

Each of the "thread create" APIs of the example 500 may generally have a name represented as "XXX_thread_create" provided by a regime or layer, where XXX may denote the particular regime or layer including the body of code for XXX_thread_create. As a result of making the call XXX_thread_create, control is transferred from a first layer or regime (e.g., immediately above XXX in the runtime stack) to the regime or layer XXX. The following may represent the parameters of one of the XXX_thread_create APIs (e.g., such as of regimes or layers 306a, 306b and 352):

XXX_thread_create(p1,p2,p3, . . . )

whereby p1 is a parameter that is a handle or pointer to thread-specific context information used by layer "XXX" in the runtime stack (e.g., layer XXX is going to assign a value to p1);

p2 is a parameter identifying a callback or entry point of code in the first layer or regime above XXX whereby the callback is to be called back as part of the callback call chain of the runtime flow of execution traversing the layers of the thread create call chain in reverse order (e.g., as illustrated by the right hand side of the example 500 which traverses the layers of the create thread call chain in reverse order); and p3 is a parameter that identifies thread-specific context information used by the first layer or regime above XXX in the runtime stack whereby this particular call instance XXX_thread_create is made from the first layer or regime to the layer or regime XXX. Parameter p3 identifies the thread-specific context information used by the first layer or regime for the newly created thread, such as the second thread described above in connection with FIGS. 5 and 6.

It should be noted that an embodiment may also include other parameters as represented above by the trailing ellipses ". . . " following parameter p3. Described in more detail elsewhere herein, when the callback is made using parameter p2, the callback may include passing parameter p3 for use by the code of the callback.

Figure 7:
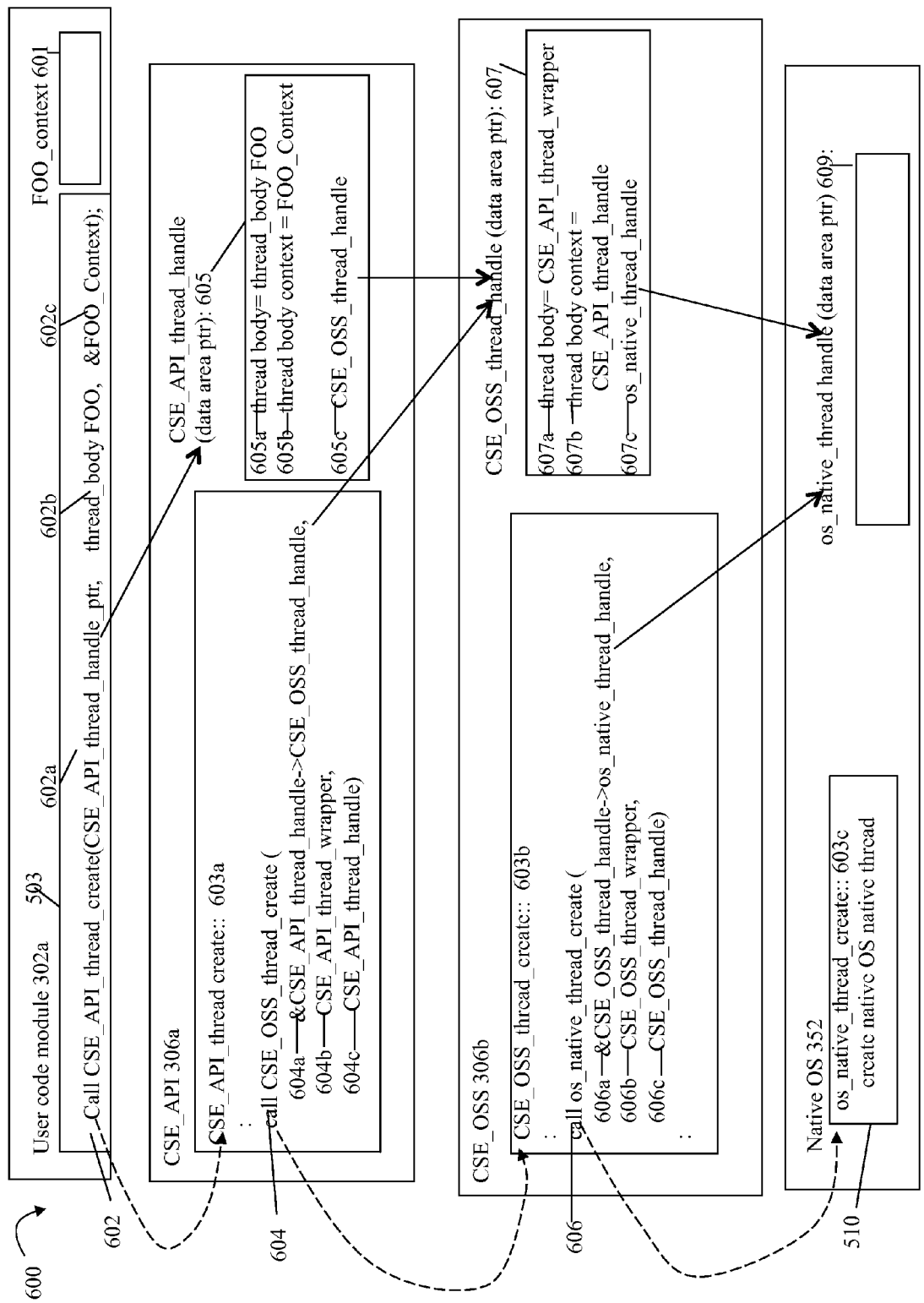

Reference is now made to FIG. 7. The example 600 of FIG. 7 shows the create thread call chain (e.g., 500a on the right hand side of execution flow from the example 500 down the runtime stack) with additional details provided regarding the create thread API parameters for each level and the thread-specific data area of each level. Elements 602, 604, and 606 provide further details regarding the parameters for each create thread call to a regime or layer. Elements 605, 607 and 609 identify the different thread-specific context information data areas of the different regimes or levels. Element 601 identifies context information that may be used by the thread FOO being created. It should be noted that there may be an instance of 601, 605, 607 and 609 for each thread created by a call instance 602 from the user code module 302a.

To further illustrate, element 602 represents a call to CSE_API_thread_create made from module 302a to regime or layer CSE_API 306a to regime. In this case, the parameters of the call CSE_API_thread_create 602 may be as follows:

p1 is 602a, CSE_API_thread_handle, a pointer or handle to thread-specific context information 605 used by layer CSE_API;

p2 is 602b, thread_body FOO, and identifies the entry point or body of code for the callback which is the thread body of code (e.g., the callback made at 514a from CSE_API_thread wrapper 514 of CSE_API 306a to thread FOO of user module 302a as illustrated in FIG. 6); and p3 is 602c, FOO_context, an address or otherwise identifies the thread specific context information 601 used by the created thread FOO in the user code module 302a.

Element 604 represents a call to CSE_OSS_thread_create made from regime or layer CSE_API 306a to regime or layer CSE_OSS 306b. In this case, the parameters of the call CSE_OSS_thread_create 604 may be as follows:

p1 is 604a, &CSE_API_thread_handle→CSE_OSS_thread_handle, a pointer or handle to thread-specific context information 607 used by layer CSE_OSS;

p2 is 604b, CSE_API_thread_wrapper, and identifies the entry point or body of code for the callback CSE_API_thread_wrapper (e.g., the callback made from CSE_OSS 306b to CSE_API 306a as illustrated by the transfer of control at 516a from CSE_OSS_thread wrapper 516 to CSE_API_thread wrapper 514 in FIG. 10); and p3 is 604c, CSE_API_thread_handle, an address or otherwise identifies the thread specific context information 605 (described below) used by layer or regime CSE_API 306a for the newly created thread to be created by execution of 510 and 511 of native OS 352.

Element 606 represents a call to os_native_thread_create made from regime or layer CSE_OSS 306b to the native OS 352. In this case, the parameters of the call 606 may be as follows:

p1 is 606a, &CSE_OSS_thread_handle→os_native_thread_handle, a pointer or handle to thread-specific context information 609 used by layer native OS 352;

p2 is 606b, CSE_OSS_thread_wrapper, and identifies the entry point or body of code for the callback CSE_OSS_thread_wrapper (e.g., the callback made from the native OS 352 to CSE_OSS 306b as illustrated by the transfer of control at 510a from native OS 352 to the CSE_OSS_thread wrapper 516 in FIG. 10); and p3 is 606c, CSE_OSS_thread_handle, an address or otherwise identifies the thread specific context information 607 (described below) used by layer or regime CSE_OSS 306b for the newly created thread to be created by execution of 510 and 511 of native OS 352.

Generally, the body of code for an XXX_thread_create API of a regime or layer may perform processing including:

1. Allocating storage for the thread-specific context information area used by layer XXX (for the new thread to be created by execution of 510 and 511 of native OS 352.

2. Initialize or populating the thread-specific context information area to include:

parameter p2 (e.g., the callback entry point or the body of code invoked for the callback to layer XXX in the series of calls illustrated by boxes on the right hand side of FIG. 6), parameter p3, and optionally any other thread-specific context information used by layer XXX. It should be noted that the thread-specific context information area also includes a pointer to the thread-specific context information of the layer below XXX in the create thread API call chain of the runtime stack which is filled in as a result of completing the call in 3.) below.

3. Calls the XXX_thread_create body of code of the layer below XXX in the runtime stack.

To further illustrate, the body of code CSE_OSS_thread_create 603b may allocate storage for the thread-specific context information data area, CSE_OSS_thread_handle 607 (e.g., used by layer CSE_OSS 306b), populate the storage area 607 just allocated with the thread-specific context information including:

607a, the entry point of the callback routine CSE_API_thread_wrapper 514 in CSE_API layer 306a to be invoked when performing a callback from the CSE_OSS layer 306b to the CSE_API layer 306a,

607b, identifying (e.g., the address of) the thread-specific context information 605 used by the layer or regime CSE_API 306a, and

607c, a field containing a pointer to the thread-specific context information 609 used by native OS layer 352 (e.g., layer below CSE_OSS in the thread create call chain of the runtime stack) which is populated as a result of the call to os_native_thread_create.

It should be noted that each of the XXX_thread_create bodies of code may also perform other processing as described in more detail elsewhere herein.

In a similar manner as noted above for thread-specific context information area 607, the storage area 605, CSE_API_thread_handle, used by the CSE_API layer 306a may include:

605a, the entry point of the callback routine, the thread body for FOO, in user module 302a invoked when performing a callback from the CSE_API layer 306a to the user code module 302a,

605b, identifying (e.g., the address of) the thread-specific context information 601 used by the thread FOO in user module 302a, and

605c, a field containing a pointer to the thread-specific context information 607 used by CSE_OSS layer 306b (e.g., layer below CSE_API in the thread create call chain of the runtime stack) which is populated as a result of the call to CSE_OSS_thread_create.

It should be noted that each of the thread-specific context information areas 602, 605, 607 and 609 at each layer or regime may also include other fields of context information that may be used specifically by that particular layer or regime, as well as a code module coded for use with that particular layer or regime.

Figure 8:
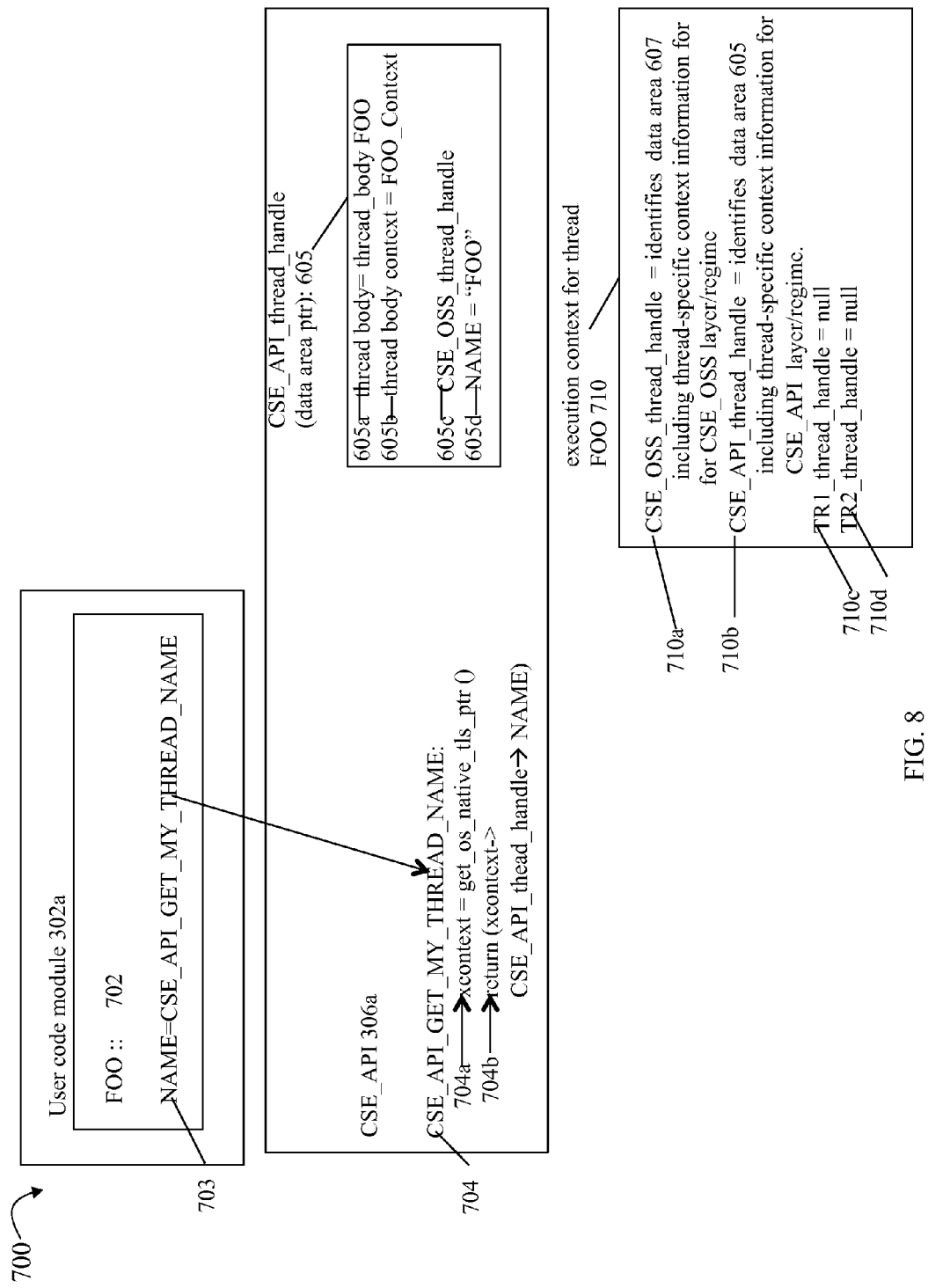

Continuing with the first example and with reference to FIG. 8, assume there is a call in the user code module 302a from the thread body FOO 702 in line 703 to obtain a piece of its own thread-specific context information, such as its thread name "FOO", and the user code module 302a does not have the requested data in FOO's own local thread specific context information 601. Such requested thread-specific context information regarding the thread name may be data included in thread-specific context information for FOO at a different regime or layer (e.g., such as may be included in any of 605, 607 and/or 609 of FIG. 7). In this example, the thread NAME may be included in the thread-specific context information for layer or regime CSE_API 306a and thus in the data area 305 identified by CSE_API_thread_handle, field 605d.

The native OS may include APIs to store and retrieve information for each thread such as regarding the execution context of each thread. An embodiment may use a structure, execution context, for each thread created by the OS. The native OS may include APIs to set and get a pointer to the execution context structure for a particular thread. For example, the native OS may include an API get_os_native_tls_ptr to get or retrieve a pointer to the execution context structure for a particular thread and an API set_os_native_tls_ptr to set a pointer to an execution context structure for a particular thread. The thread may be, for example, the currently executing thread, such as FOO.

Element 710 represents information that may be included in an execution context structure for thread FOO. The execution context 710 for a thread FOO may be characterized as a low level OS structure that includes information about the thread enabling processing to retrieve and locate the different data areas including thread-specific context information for the different layers or regimes such as the non OS layers or regimes (e.g., data areas 605, 607 containing the thread-specific context information as illustrated in FIG. 7.) The execution context structure may be used by processing, such as described in following paragraphs and elsewhere herein, to link to the thread-specific context information used by the different layers or regimes.

Generally the execution context structure created and maintained for each thread may include a field, such as a pointer, for each supported layer or regime whereby the field identifies the thread-specific context information for that layer or regime. The execution context structure may also include other information for the particular thread such as other information that is commonly used by all thread regimes or layers. In the execution context 710, fields 710a-d may identify the data areas including the thread-specific context information used by different supported regimes or layers. For example, element 710a identifies the data area 607 CSE_OSS_thread_handle of FIG. 7 including thread-specific context information for the CSE_OSS layer/regime. Element 710b identifies data area 605 CSE_API_thread_handle including thread-specific context information for the CSE_API layer/regime 306a. Elements 710c and 710d may be null or otherwise not identify data areas for regimes TR1 and TR2 in this particular example since such regimes are not included in the runtime stack for the current thread FOO as illustrated in FIGS. 6 and 7.

Element 605 identifies the data area for thread-specific context information used by the CSE_API layer or regime as described above with the additional field 605d which includes a string that is the thread's name, "FOO".

Processing that may be performed in an embodiment in accordance with techniques herein to set or initialize the information stored in the execution context structure for a created thread is described in more detail elsewhere herein in connection with detail provided regarding the thread wrappers 510, 516, 514 included in the callbacks invoked. Additionally, the thread-specific information such as the thread name FOO of field 605d, may have been previously stored such as by the thread wrapper CSE_API_thread_wrapper 514 of FIG. 6 prior to calling the thread body FOO in 514a.

In the example 700, a call is made at 703 to the API CSE_API_GET_MY_THREAD_NAME in the CSE_API regime or layer 306a to return a string that is the currently executing thread's name. Execution of 703 causes a transfer of control to the body of code 704 for CSE_API_GET_MY_THREAD_NAME. In line 704a, a call is made using a native OS API, get_os_native_tls_ptr (described above) which returns a pointer to the execution context structure for the currently executing thread FOO. In this example, the call in 704a returns a pointer to the execution context structure 710. Line 704b retrieves the thread name from field 605d using the information of 710b (pointer to CSE_API_thread_handle) which identifies the data area 605 including the desired thread-specific context information for the CSE_API regime 306a. The context of 605d is retrieved and also returned to the point of call 703 in thread FOO.

As a variation to the foregoing, it may be that the CSE_API layer or regime 306a did not include the thread name in its thread-specific context information of 605. Rather the thread name may be stored in other thread-specific context information at a different layer or regime. For example, assume the thread name is a field in the thread-specific information 607 of the CSE_OSS layer, in this case, the code of 704 may further invoke an API of the CSE_OSS layer 306b to retrieve and return the thread name from its thread specific information 607. The thread name may then be returned as a value to the original calling thread FOO of module 302a.

Figure 9:
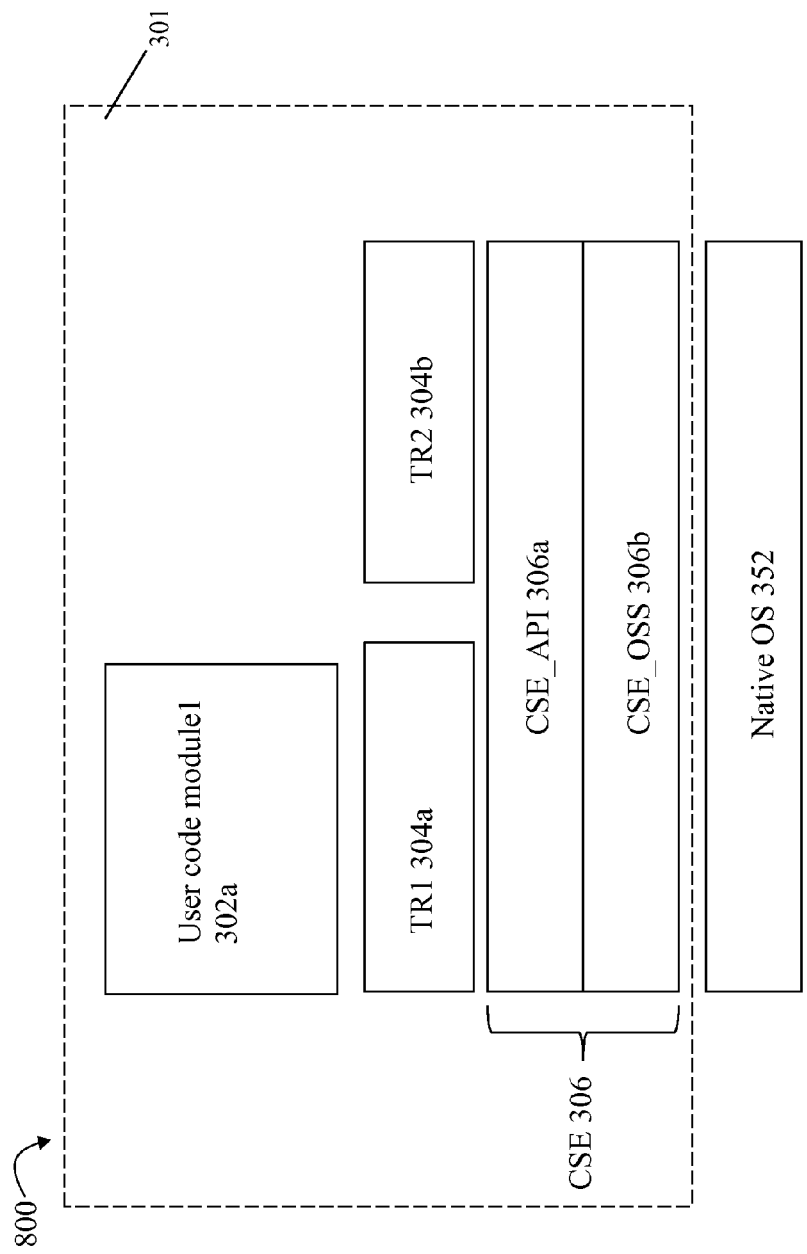
FIGS. 9, 10 and 11 are illustrations used in connection with a second example in an embodiment in accordance with techniques herein.

Referring to FIG. 9, shown is an illustration of the second example in accordance with techniques herein. As mentioned above, the second example considers the user code module 302a, which interfaces directly with a different thread regime or layer, TR1 304a, that runs on top of CSE_API 306a. The second example described in following paragraphs is made with reference to the illustration of 800 where a user code module 1 302a uses the thread API or regime and associated thread model of the TR1 304a to directly call into the code of the regime 304a to create a thread. In accordance with techniques herein, the runtime stack of regimes or layers may include 304a, 306a, 306b and 352 with a different create thread API being invoked at each layer or regime in the foregoing stack at runtime responsive to an initial call made from 302a to 304a to create the thread. This runtime call stack is further illustrated with reference to FIG. 10 below. In the second example as in FIG. 9, there is also an additional thread regime TR2 304b which is not included in the runtime call stack when creating a thread for user code module 302a. As described above, each layer or regime in the runtime call stack performs processing to store thread-specific context information in a data area for that particular level. However, since TR2 304b is not included in the call stack, its thread-specific information is not filled in as part of the runtime call stack processing of the create thread call chain. Thus, assuming the second newly created thread is thread FOO and if a call is ever made from a thread FOO of 302a to an API in TR2 304b (directly or indirectly), the thread specific context information for FOO in TR2 is not completed or filled in. What will now be described is how an embodiment may complete or fill in the thread-specific context information for thread such as FOO in a regime or layer, such as TR2 304b, which is not included in the runtime call stack.

Before proceeding further with details of the second example, a general description is provided regarding aspects of the facility described herein. Each thread regime or layer other than the native OS layer 352 providing an API for use with threads, such as to create threads, may initially register with the infrastructure prior to any user code module invoking APIs of the layer or regime for creating threads.

For example, with reference to FIG. 9, the thread regimes or layers that register with the infrastructure or facility described herein are TR1 304*a*, TR2, 304*b*, CSE_API 306*a* and CSE_OSS 306*b*. Registration may occur, for example, as part of initialization and loading of a particular thread regime or layer providing a set of APIs for use with techniques herein. Similarly, when a thread regime or layer providing a set of thread APIs for use with techniques herein is unloaded for use with techniques herein, the thread regime or layer unregisters with the infrastructure or facility.

Code for the register and unregister APIs may be generally included in a library of routines provided for use with the infrastructure and techniques described herein.

To further illustrate, consider the TR2 304*b* thread regime or layer. As part of initializing and loading TR2, the following function or routine may be executed where the function or routine includes performing registration with the infrastructure or facility described herein:

TR2_world_init(arg1f, . . . , argNf)
/* each "arg" represents a possible optional argument that may be provided
{
　/* register TR2 thread birth/death callbacks */thread regime_callbacks_register(TR2_REGIME_ID,
　　TR2_thread_birth_callback,
　　TR2_thread_death_callback);
　/* perform any other miscellaneous initialization specific to TR2 threading regime */
}

In the foregoing initialization routine, the following is the example registration API that may be used in connection with techniques herein to register with the infrastructure:
thread_regime_callbacks_register(TR2_REGIME_ID, TR2_thread_birth_callback, TR2_thread_death_callback);
where TR2_REGIME_ID is a unique thread regime or layer identifier;

TR2_thread_birth_callback is a birth callback that may be invoked in connection with creating and initializing a data area including thread-specific context information for the regime or layer TR2; and TR2_thread_death_callback is a death or ending callback that may be invoked in connection with a thread exiting or terminating (this callback may perform processing to cleanup, deallocate and deinitialize as may be needed when a thread of the TR2 regime is terminating execution.

The birth callback for a regime, such as TR2_birth_callback, may be invoked as part of processing performed when creating a thread when TR2 is not otherwise invoked as part of the create thread call chain of the runtime stack (e.g., as illustrated in FIGS. 6 and 7). In this manner, the birth callback for a regime or layer may include performing processing to create and initialize a data area including thread-specific context information for the regime or layer such as TR2 when such processing has not already been performed as part of the runtime stack when creating a thread. TR2 306*b* may include the bodies of code for the above-mentioned birth and death callbacks specified in the registration API when registering TR2.

Each regime or layer may register using the foregoing API thread_regime_callbacks_register in a manner similar to that as described for TR2.

With reference to the particular second example as in FIG. 9, the birth callback for TR2 may be invoked as part of processing when creating a thread FOO included in module 302*a* where the create thread call chain of the runtime stack processing does not otherwise result in calling the TR2_create_thread API to create and initialize a data area including thread-specific context information for the regime or layer TR2.

In addition to each regime registering with the facility or infrastructure described herein, each regime may also unregister, for example, when code of the regime is being unloaded or processing is otherwise performed to decouple the regime so that it is not used in connection with techniques herein.

The following may be an example of a routine executed in connection with deinitialization processing for a regime, such as TR2, where such processing includes invoking an unregister API that may be used when unregistering a thread regime or layer:

TR2_world_deinit(arg1i, . . . , argNi)
/* each "arg" represents a possible optional argument that may be provided
{
　/* perform any necessary miscellaneous deinitialization specific to TR2 threading regime */
　/* unregister TR2 thread birth/death callbacks */
　thread_regime_callbacks_unregister(TR2_REGIME_ID)
}

In the foregoing deinitialization routine, the following is the examplary unregister API that may be used in connection with techniques herein to unregister with the infrastructure:

thread_regime_callbacks_unregister
　　　(TR2_REGIME_ID)

where

TR2_REGIME_ID is the unique thread regime or layer identifier as specified in the registration API when previously registering TR2. TR2_world_deinit(arg1i, . . . , argNi) may be invoked when unloading regime TR2.

Each regime or layer may unregister using the foregoing API thread_regime_callbacks_unregister in a manner similar to that as described for TR2.

Referring to FIG. 9A, shown is an example illustrating data structures that may be used in an embodiment in accordance with techniques herein for a single process. The example 820 includes a thread world global information (info) structure 822 which includes regime information 824 and a list of execution context structures 826. The information of 822 may be characterized as global in that a single set of the information in 822 may be maintained for the infrastructure with respect to all threads and all regimes in a single process.

The regime information 824 may include information such as the function pointer or code entry point for all registered birth and death callbacks 824*a*, 824*b* and an outstanding thread count 824*c* for each supported regime or layer (as identified by a column header 821). It should be noted that 824*c* may be an array of integer values where the array includes an entry for each supported regime or layer. The value of an entry in the array for 824*c* corresponding to a particular regime or layer may denote the number of existing threads which have a data area including thread-specific context information created and initialized through the birth callback for that regime. The array 824*c* may be used, for example, in connection with cleanup processing performed when the particular regime is unregistered.

The execution context list 826 may identify a list of execution contexts including thread-specific context information that has been created as a result of a birth callback for any regime for all threads created.

Element 830 provides additional information that may be included in an execution context structure as briefly mentioned elsewhere herein. An execution context may be created for each thread created. In one embodiment, the execution context, which is associated with a particular thread created using techniques herein, may be created and initialized by the thread wrapper or callback of the CSE_OS layer or regime 306b (e.g., by code of the callback CSE_OSS_thread_wrapper 516 which is invoked as part of the callback call chain). Each execution context structure 830 may include information 831 identifying the different data areas of thread-specific context information for each of the thread regimes or layers. It should be noted that element 831 is similar to that as described in element 710 of FIG. 8. In this manner, the information in 831 may be updated by the appropriate thread wrapper callback routines invoked as part of the callback call chain when executing in the context of the newly created thread.

The execution context structure 830 may also include an in use mask 832, a disable mask 834 and a regime context vector or array 836 where each of the foregoing (832, 834 and 836) includes an entry for each supported regime or layer.

The disable mask 834 may include an entry for each supported regime or layer and may be used in connection with determining which, if any, birth callbacks to invoke to ensure that a data area including thread specific context information for each supported regime or layer is created and initialized for each thread that is created.

The regime context array 836 is an array of pointers and includes an entry for each supported regime or layer. An entry of the regime context array 836 corresponding to a regime or layer identifies the data area of thread-specific context information for the regime or layer if such data area is created and initialized by invocation of the birth callback for the regime (e.g., thereby indicating that the thread create API of the regime or layer is not included in the thread create call chain of the runtime stack for the thread having the execution context 830). Otherwise, the entry of the regime context array 836 corresponding to the regime or layer may be null or some other value denoting that the data area of thread-specific context information for the regime or layer is otherwise created and initialized as a result of calling the regime or layer's create thread API as part of the create thread call chain of the runtime stack for the thread having the execution context 830.

The in use mask may include a "1" for each entry corresponding to a regime or layer in which the regime or layer's data area of the thread-specific context information is created and initialized by the regime's registered birth callback. Thus, an entry of the in use mask corresponding to a regime or layer and having a value of "1" denotes that an entry of the regime context array for the regime or layer is non-null and identifies the regime or layer's data area of the thread-specific context information is created and initialized by the regime's registered birth callback.

The foregoing data structures and use in connection with techniques herein are described in more detail elsewhere. For example, as described elsewhere herein, the callback routines, such as the thread wrappers invoked as part of the callback call chain may perform processing using Boolean variables (described below) to determine whether to invoke any of the registered birth callbacks. As also described below and elsewhere herein, each of the Boolean variables may have a value determined using the disable mask Allocating storage for a data area including thread specific context information for a layer or regime may be performed responsive to invoking the registered birth callback for the layer or regime. Thus, such processing may also appropriately update the entries of the regime context array 836 and in use mask 832 for that regime or layer. Similarly, deallocating storage for a data area including thread specific context information for a layer or regime may be performed responsive to invoking the registered death callback for the layer or regime. Thus, such processing may also appropriately update the entries of the regime context array 836 and in use mask 832 for that regime or layer.

With reference back to FIG. 9 and the second example, each of the regimes or layers TR1 304a, TR2 304b, CSE_API 306a, and CSE_OSS 306b may invoke the register API, thread_regime_callbacks_register, to register the birth and death callback routines for each regime. As a result of this regime registration, the rows of information 824a, 824b of the regime information 824 may be populated. At this point prior to any threads being created, the outstanding thread count 826a may include a zero in each entry since no threads have been created. Subsequently, a call may be made from user code module 1 302a to create a thread, such as a thread FOO, as described in connection with the first example with the difference that the user code module 302a directly invokes an API of the TR1 304a regime or layer in the second example with a runtime stack through layers 304a, 306a, 306b and 352 (thereby omitting TR2 304b as mentioned above).

Figure 10:
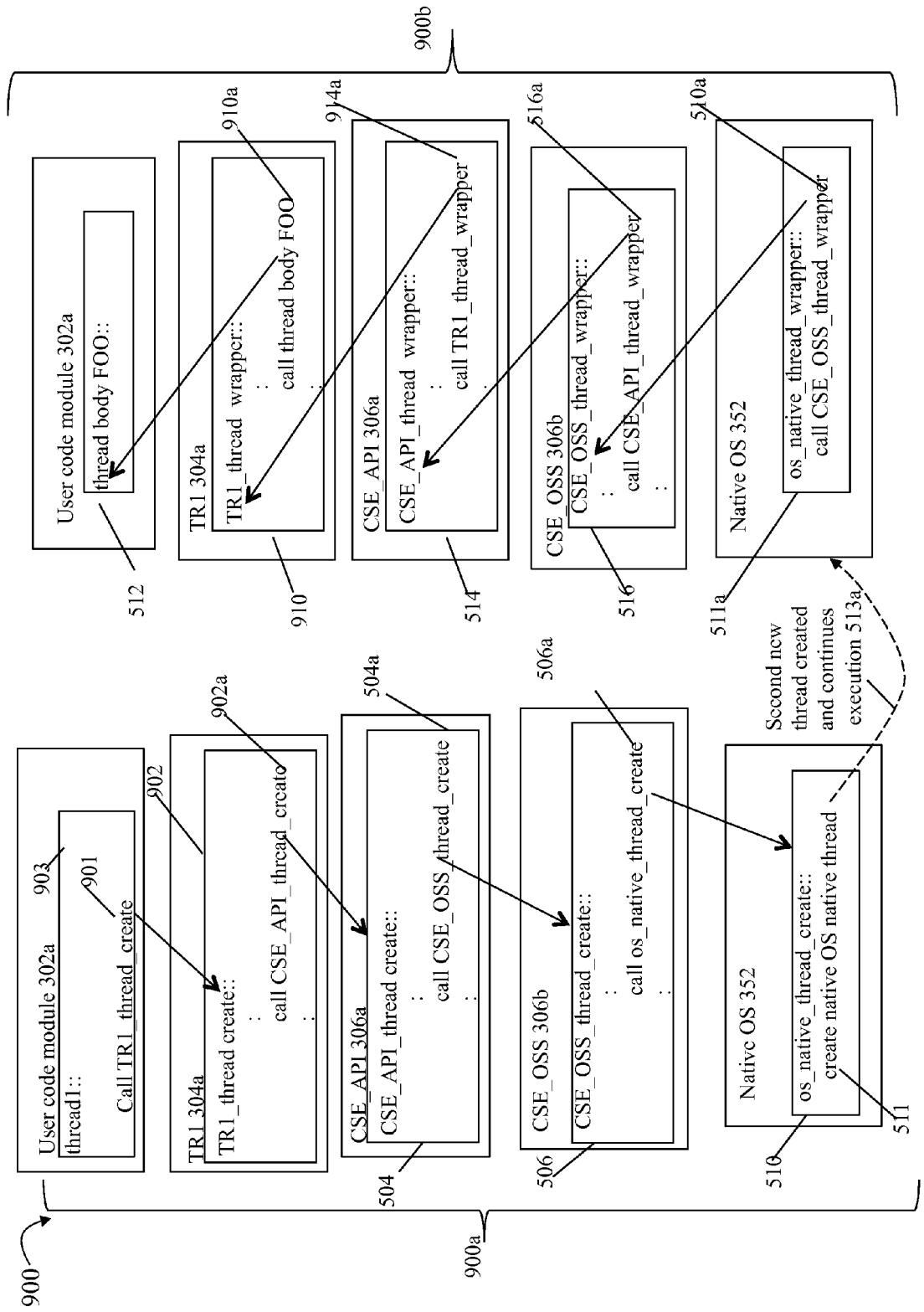

Referring to FIG. 10, shown is an example 900 illustrating the runtime execution flow of the second example when creating a thread which generally follows a similar pattern of execution flow as described above in connection with FIG. 6. Element 900a includes the five boxes on the left hand side illustrating runtime execution flow of the create thread call chain between different regimes or API layers of the runtime stack to create a new second native thread, such as thread FOO. As described above, the create thread call chain 900a executes in the context of a first thread including code 903 which issues a call 901 to create the new second native thread FOO. Once 511 is executed in the context of the first thread, two things occur. First, runtime processing for the first thread returns up the create thread call chain (comprising the runtime stack of the first thread's execution) by returning along the path through layers 352, 306b, 306a, 304a to 903 whereby the first thread resumes execution following 901. Secondly, for the newly created second thread, processing for the newly created second thread continues with processing and runtime flow for the second thread comprising the callback call chain 900b as illustrated by traversal of the different regimes or API layers on the right hand side of the example 900.

In connection with the runtime execution flow for the create thread call chain executing in the context of the first thread to create the second new thread, reference is made to the 5 boxes 900a on the left side of the example 900. User code module 302a includes the body of code 903 for the first thread. The body of code 903 of the first thread includes a call 901 to create the new second thread. In a first step, a call is made from the body of code 903 of the user module 302a at statement 901 to TR1 304a using the appropriate API call TR1_thread_create of the regime 304a. Element 904 represents the body of code for the entry point TR1_thread_create to which control is transferred as a result of executing 901.

In a second step, a call is made from the body of code 902 at line 902a to CSE_API 306a using the appropriate API call CSE_API_thread_create of the regime 306a. Element 902 represents the body of code for the entry point CSE_API_thread_create to which control is transferred as a result of executing 902*a*.

In a third step, a call is made from the body of code 504 at line 504*a* to the CSE_OSS 306*b* using the appropriate API call CSE_OSS_thread_create of the regime 306*b*. Element 506 represents the body of code for the entry point CSE_OSS_thread_create to which control is transferred as a result of executing 504*a*.

In a fourth step, a call is made from the body of code 506 at line 506*a* to the native OS 352 using the appropriate API call os_native_thread_create of the regime 352. Element 510 represents the body of code for the entry point os_native_thread_create to which control is transferred as a result of executing 506*a*. The code of 510 results in creation of a native thread as illustrated by 511. Once the native thread has been created as result of 511, two things occur. First, control returns up the create thread call chain 900*a* back to the statement following 901 whereby the first thread continues execution. Additionally, execution of the newly created second thread continues (as illustrated by 513*a* with a second runtime stack of the second thread comprising the callback call chain 900*b* which traverses layers (e.g., regimes or API layers) of 900*a* in reverse order.

In connection with the callback call chain portion of the runtime stack, reference is made to the 5 boxes 900*b* on the right side of the example 900. After the native OS thread is created in 511, control is transferred to the os_native_thread_wrapper 511*a* which executes in the context of the second newly created thread. The code of 511*a* then performs a callback into the regime or layer 306*b*. The callback from 352 to 306*b* is represented by statement 510*a* which is a call to CSE_OSS_thread wrapper resulting in transfer of control to the body of code 516 having entry point CSE_OSS_thread_wrapper. The body of code 516 may then perform a callback into the regime or layer 306*a*. The callback from layer or regimes 306*b* to 306*a* is represented by statement 516*a* which is a call to CSE_API_thread wrapper resulting in transfer of control to the body of code 514 having entry point CSE_API_thread_wrapper.

The body of code 514 may then perform a callback into the regime or layer 304*a*. The callback from layer or regimes 306*a* to 304*a* is represented by statement 914*a* which is a call to TR1_thread wrapper resulting in transfer of control to the body of code 910 having entry point TR1_thread_wrapper.

The body of code 910 may then perform a callback into the user code module 302*a* to the entry point for the thread body of code FOO. In this example FOO may represent the code of the newly created thread's body (e.g., thread created by 511) which is now being executed as a result of the transfer of control to 512. The callback from 304*a* to 302*a* is represented by statement 910*a* which is a call to thread body FOO resulting in transfer of control to the body of code 512 having entry point thread body FOO.

As with the first example described above (e.g., FIGS. 6 and 7) each regime or level has thread-specific context information for each thread created. When a create thread API call of the create thread call chain is made from a first level or regime to a second level or regime (e.g., as illustrated by the execution flow of 900*a* on the left side of the example 900), the first level or regime provides the address or entry point of the body of code for the callback routine of the first level or regime that is invoked as part of the callback call chain 900*b*. The address or entry point of the callback routine may be communicated from the first layer to the second layer as a parameter of the create thread API call made from the first layer to the second layer. Subsequently, the callback routine of the first layer may be invoked from the second layer at a later point in time in the callback call chain.

As described herein, the callback is included in a series of subsequent callbacks forming the callback call chain 900*b* illustrated by the execution flow through the layers 352, 306*b*, 306*a*, 304*a*, 302*a* (as denoted by the 5 boxes 900*b* on the right side of FIG. 10) whereby the routines invoked as part of the callback chain 900*b* execute in the context of the new thread created by 511. As illustrated by the boxes of 900*b* on the right hand side of the example 900, the order in which the layers or regimes are traversed in connection with the callbacks from the native OS 352 to thread FOO 512 of 302*a* is the reverse ordering of layer traversal associated with the create thread API call chain (e.g., reverse ordering of the runtime traversal of layers illustrated by the boxes of 900*a* on the left side of the example 900) of the first thread which issued the call to create the second thread.

Processing that may be performed by each of the thread_wrapper code bodies 910, 516 and 514, as well as other bodies of code, and also the API details for the various calls are described in more detail elsewhere herein.

The chain of callbacks of 900*b* as illustrated by execution flow on the right side of the example 900 results in transferring control through different layers or regimes until the thread body 512 is reached in the user code module 302*a*.

What will now be described is processing that may be performed in an embodiment in accordance with techniques herein to identify the particular one or more thread regimes or layers that have not been traversed (e.g., are not included) in the create thread call chain 900*a* of runtime call stack of the first thread when creating a second new thread.

When creating the second new thread and traversing down through each regime or layer of 900*a* of the runtime stack (e.g., left side boxes of the example 900), processing is performed by code executing in the context of the first thread at each non_OS layer thread_create API (902, 504, 506) to set the disable mask bit 834 for that particular regime or layer. In this manner, the disable mask 834 may be used to identify any non-OS layers or regimes which are not included in the create thread call chain 900*a* of the runtime stack when creating a thread whereby, after completing the create thread call chain 900*a*, the disable mask 834 includes a 0 for each layer or regime not included in the create thread call chain of the runtime stack and otherwise includes a 1 (e.g., set) for each layer or regime included in the create thread call chain of the runtime stack.

When invoking the thread create API of a first layer or regime, the code of the thread create API has knowledge regarding what layers or regimes, if any, may make appear above the first layer or regime in the create thread call chain portion of the runtime stack (e.g., what other layers may call into the first layer using the first layer's thread create API in the runtime stack). In this manner, the code of the thread API of the first layer may examine the entries of the disable mask 834 corresponding to those layer(s) that may appear above the first layer in the create thread call chain of the runtime stack when creating a thread. For each such layer that may appear above the first layer in the create thread call chain of the runtime stack, the create thread API of the first layer may record information in its thread-specific context information identifying which layer is included in the create thread call chain portion of the runtime stack immediately above the first layer.

For example, with reference to FIG. 9, TR1 304*a* and TR2 304*b* may possibly be in the create thread call chain of runtime stack above the CSE_API layer 306*a* when creating a thread. With the second example, the create thread call chain of the runtime stack includes TR1 304*a* above layer 306*a*. With reference now to FIG. 10, the TR1_thread_create code 902 may set the disable mask bit of 834 corresponding to TR1 prior to 902*a* and then call CSE_API_thread_create at line 902*a* causing a transfer of control to the body of code 504 for CSE_API_thread_create. Within the code 504, prior to calling CSE_OSS_thread_create at line 504*a*, the following may be performed to set two Booleans or flag values, call_TR1_regime_callback and call_TR2_regime_callback, included in the thread-specific context information for layer 306*a*:

if (disable mask(TR1)=1) then
        call_TR1_regime_callback=FALSE
    else
        call_TR1_regime_callback=TRUE
    if (disable mask(TR2)=1) then
        call_TR2_regime_callback=FALSE
    else
        call_TR2_regime_callback=TRUE In this manner, the thread-specific context information of a first regime or layer, such as CSE_API 306*a*, may include a Boolean variable for each other regime or layer (such as TR1 and TR2) which may appear above the first regime or layer in the create thread runtime stack. The value of the Boolean variable, call_TR1_regime_callback, corresponding to TR1 may have a value of 0 or false if the TR1 layer thread-specific context information does not need to be created and initialized, and otherwise may have a value of 1 or true denoting that the TR1 layer thread-specific context information needs to be created and initialized.

The value of the Boolean variable, call_TR2_regime_callback, corresponding to TR2 may have a value of 0 or false if the TR2 layer thread-specific context information does not need to be created and initialized, and otherwise may have a value of 1 or true denoting that the TR2 layer thread-specific context information needs to be created and initialized.

With reference back to FIG. 7, the values for the Boolean variables call_TR1_regime_callback and call_TR2_regime_callback may be included in 605, the thread-specific context information for the CSE_API regime 306*a*.

In a similar manner, in the CSE_OSS layer 306*b* within the code 506, prior to calling native_os_thread_create at line 506*a*, the following may be performed to set a Boolean or flag value, call_CSE_API_regime_callback, included in the thread-specific context information for layer 306*b*:

if (disable mask(CSE_API)=1) then
        call_CSE_API_regime_callback=FALSE
    else
        call_CSE_API_regime_callback=TRUE With reference back to FIG. 7, the value for the Boolean variables call_CSE_API_regime_callback may be included in 607, the thread-specific context information for the CSE_OSS regime 306*b*.

It should be noted that the foregoing knowledge encoded in a first regime or layer regarding what other regimes or layers may possibly be above the first regime or layer in the create thread call chain of the runtime stack when creating a thread may be obtained in other suitable ways than as just described above. For example, an embodiment may provide a service or routine which is invoked with a parameter identifying a particular regime or layer. The service or routine may return as an output the list of other regimes or layers, if any, that may appear in the create thread call chain above the particular regime or layer in the runtime stack when creating a thread. The first layer or regime may then use this returned information to examine the appropriate corresponding bits of the disable mask 834 to store additional information in the thread-specific context information for the first layer or regime as described.

In this manner, the values of the foregoing Boolean variables in the thread-specific context information may be used to identify any birth callback(s) to be invoked for a regime or layer having one of the foregoing Boolean variables with a value of 1 or TRUE.

With reference to FIG. 10, a thread wrapper or callback at a first layer or regime (e.g., 910, 514 and 516) may use any of the foregoing Boolean variables stored in the thread-specific context information of the first layer or regime to determine whether to invoke any birth callback for another layer or regime which may appear above the first regime in the create thread call chain of the runtime call stack when creating a thread. For example, the code of CSE_OSS_thread_wrapper 516 may examine the value of the Boolean call_CSE_API_regime_callback (included in the thread-specific context information for regime CSE_OSS) to determine whether to call the birth callback in 824*a* for the CSE_API regime whereby the birth callback for the CSE_API regime may be invoked if the value of call_CSE_API_regime_callback is true (1).

Similarly, code of CSE_API_thread_wrapper 514 may examine the value of the Boolean call_TR1_regime_callback (as included in the thread-specific context information for regime CSE_API) to determine whether to call the birth callback in 824*a* for the TR1 regime whereby the birth callback for the TR1 regime may be invoked if the value of call_TR1_regime_callback is true (1).

Code of CSE_API_thread_wrapper 514 may also examine the value of the Boolean call_TR2_regime_callback (as included in the thread-specific context information for regime CSE_API) to determine whether to call the birth callback in 824*a* for the TR2 regime whereby the birth callback for the TR2 regime may be invoked if the value of call_ TR2_regime_callback is true (1).

It should be noted that use of the disable mask and performing processing as just described allows for determination of which regimes or layers, if any, were not included in the create thread call chain of the runtime stack when creating a thread and thereby allows for determining which birth callbacks for regimes or layers should be invoked to create and initialize data areas with thread-specific context information for the newly created thread (e.g., created by 511). The foregoing may be performed without requiring modification of any of the APIs of the different thread regimes or layers which may not be feasible in an embodiment. In other words, another possible way in which information may be communicated for use with techniques herein is through introduction of additional API parameters for regimes which passes required information up and/or down the create thread call chain of the runtime call stack when creating a thread. However, the APIs of the different regimes or layers typically cannot be modified so other techniques such as those described herein may be used to determine and communicate necessary information between different code bodies.

Processing proceeds through the chain of callbacks of the runtime stack (e.g., as illustrated by 900*b* including calls traversing the layers 352, 306*b*,306*a*, 304*a* and 302*a* on the right hand side of FIG. 10) whereby code of the callbacks or thread wrappers in the call chain 900*b* are executed in the context of the newly created thread. A first callback of a first layer determines, for the set of layers which may possibly be included in the create thread call chain of runtime stack above the first layer, which of layers of the set, if any, were not included (e.g., invoked) in the create thread call chain of runtime stack immediately above the first layer. The first layer then proceeds with invoking the birth callback for each such layer of the set that was not included in the create thread call chain immediately above the first layer.

For the second example described above in connection with FIGS. 9 and 10, based on the foregoing, the birth callback for regime or layer TR2 is invoked by code of the CSE_API_thread_wrapper 514 of FIG. 10.

It should be noted that the regime context vector or array 836 of FIG. 9A is an array of pointers that may be used in an embodiment in connection with referencing thread-specific context information through multiple levels of pointers such as when invoking a birth callback.

Figure 9B:
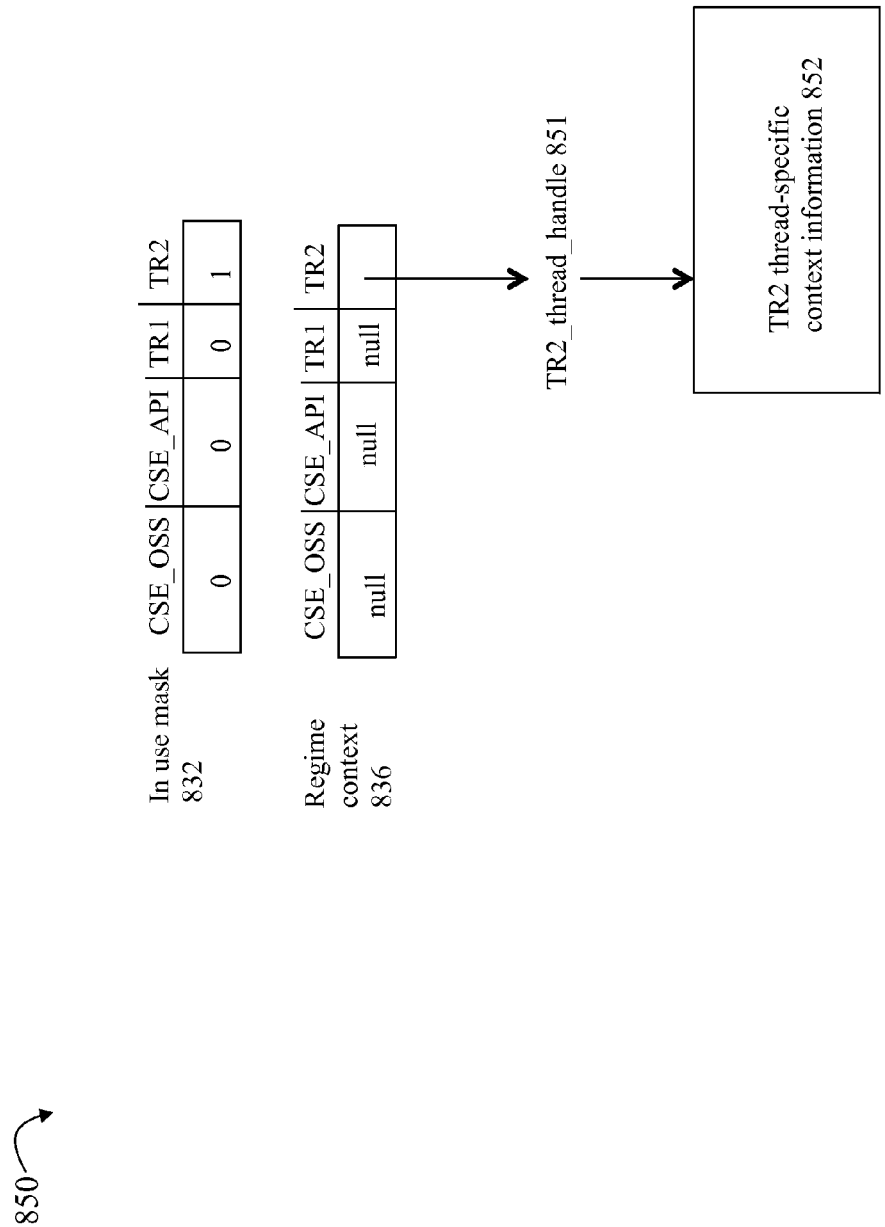

For example, with reference to FIG. 9B, shown is an example 850 including the regime context array of pointers. The example 850 illustrates that the regime context entry for a particular regime, such as TR2, may be a first pointer to TR2_thread_handle 851 (e.g., similar to the data area identified by 607 or 605 as illustrated in FIG. 7) where TR2_thread_handle 851 is a second pointer to the TR2 thread specific context information 852 created and initialized as a results of invoking the registered TR2_birth_callback. Other entries of the regime context array 836 may similarly point to, or identify, other data areas of the thread-specific context information of other regimes or layers where each such data area is created and initialized by a birth callback. However, in this particular second example, only TR2's thread-specific context information is stored in a data area that is created and initialized as a result of invoking a birth callback, the TR2 birth callback, so that all other entries of 836 corresponding to other regimes or layers are null. In the second example, each of the remaining supported regimes or layers other than TR2 have their respective data areas, including thread-specific context information particular to each regime or layer, created and initialized as part of the create thread call chain of the runtime stack.

Additionally, with reference to the second example, the in use mask 832 may include a "1" in the corresponding entry for TR2 and a "0" in all remaining entries corresponding to other regimes or layers. The in use mask may include a "1" for each entry corresponding to a regime or layer in which the regime or layer's data area of the thread-specific context information is created and initialized by the regime's registered birth callback. Thus, an entry of the in use mask corresponding to a regime or layer, such as TR2, having a value of "1" denotes that an entry of the regime context array for the regime or layer is non-null and identifies the regime or layer's data area of the thread-specific context information is created and initialized by the regime's registered birth callback.

The particular use of the regime context array 836 is illustrated in more detail in connection with a pseudo-code like description provided for various routines that may be used in an embodiment in accordance with techniques herein.

As described herein, a thread create API may be included in each of the different regimes or layers whereby, for a first executing thread, a create thread call chain of a runtime stack may include invoking one or more such thread create APIs which result in creating a new second OS native thread. Once the second thread is created by code of the native OS layer 352, processing of the first thread may return back up through the layers (352, 306b, 306a, 304a, 302a) of the create thread call chain 900a to resume execution of the first thread following the initial create thread API invocation (e.g., such as 901 of FIG. 10). In this manner, the create thread call chain of the first thread may unwind. Additionally, execution of the newly created second thread proceeds with invoking one or more thread wrappers as callbacks in the different regimes or layers of the callback call chain 900b to finally result in execution of code of the thread body for the newly created thread. Once the newly created thread completes its processing, the thread may return (e.g., exit, terminate, and the like) thereby subsequently causing an unwinding of its runtime stack such as illustrated by the call chain 900b of FIG. 10. For example, with reference to FIG. 10, responsive to code of the thread body for FOO 512 of user module 302a exiting or returning, processing may be performed to return in the reverse direction (e.g., unwind) along the newly created thread's runtime stack. The return path may be as follows: 512, 910, 514, 516, 511a (e,g, where 512, 910, 514, 516 and 511a are the thread wrappers or callbacks, respectively, at layers 302a, 304a, 306a, 306b and 352).

In connection with unwinding the runtime stack for the newly created thread FOO having the body of code 512, any of the thread wrappers 910, 514, 516 which issued birth callbacks may also now issue corresponding death callbacks during this unwinding. Recall that a registered birth callback for a first regime or layer is invoked by one of the thread wrappers (e.g., 516, 514, 910) to create and initialize a data area including thread-specific context information for the first regime or layer which was not included in the create thread call chain of create thread APIs (e.g., 902, 504, 506, 510) of 900a (e.g., from user code module to native OS). In a complementary fashion, responsive to a thread returning or exiting, a death callback is invoked for each regime or layer where a prior birth callback was invoked for that same regime or layer. A death callback registered for a first regime or layer may, for example, perform processing to deallocate storage previously allocated for the thread-specific context information in a prior birth callback registered for the first regime.

As described above with a birth callback invocation, a first layer or regime may invoke a registered death callback for a second layer or regime which may possibly be included in the create thread call chain of the runtime stack of create thread API calls above (e.g., prior to) the first layer and whereby the second layer or regime was actually not included in the create thread call chain of the runtime stack of create thread API calls.

For the second example described above in connection with FIGS. 9 and 10, based on the foregoing, the death callback registered for regime or layer TR2 is invoked by code of the CSE_API_thread_wrapper 514 of FIG. 10 while returning through the runtime execution stack layers of 900b (layers 302a, 304a, 306a, 306b, 352 in order) when unwinding the runtime stack upon thread exit or return (e.g., completion of thread body FOO 512 completing execution). For example, the death callback for TR2 may be invoked during the unwinding of 900b (from layer 302a to 352 to unwind the callback call chain 900b) following the statement 914a in the code of CSE_API_thread_wrapper 514.

Figure 11:
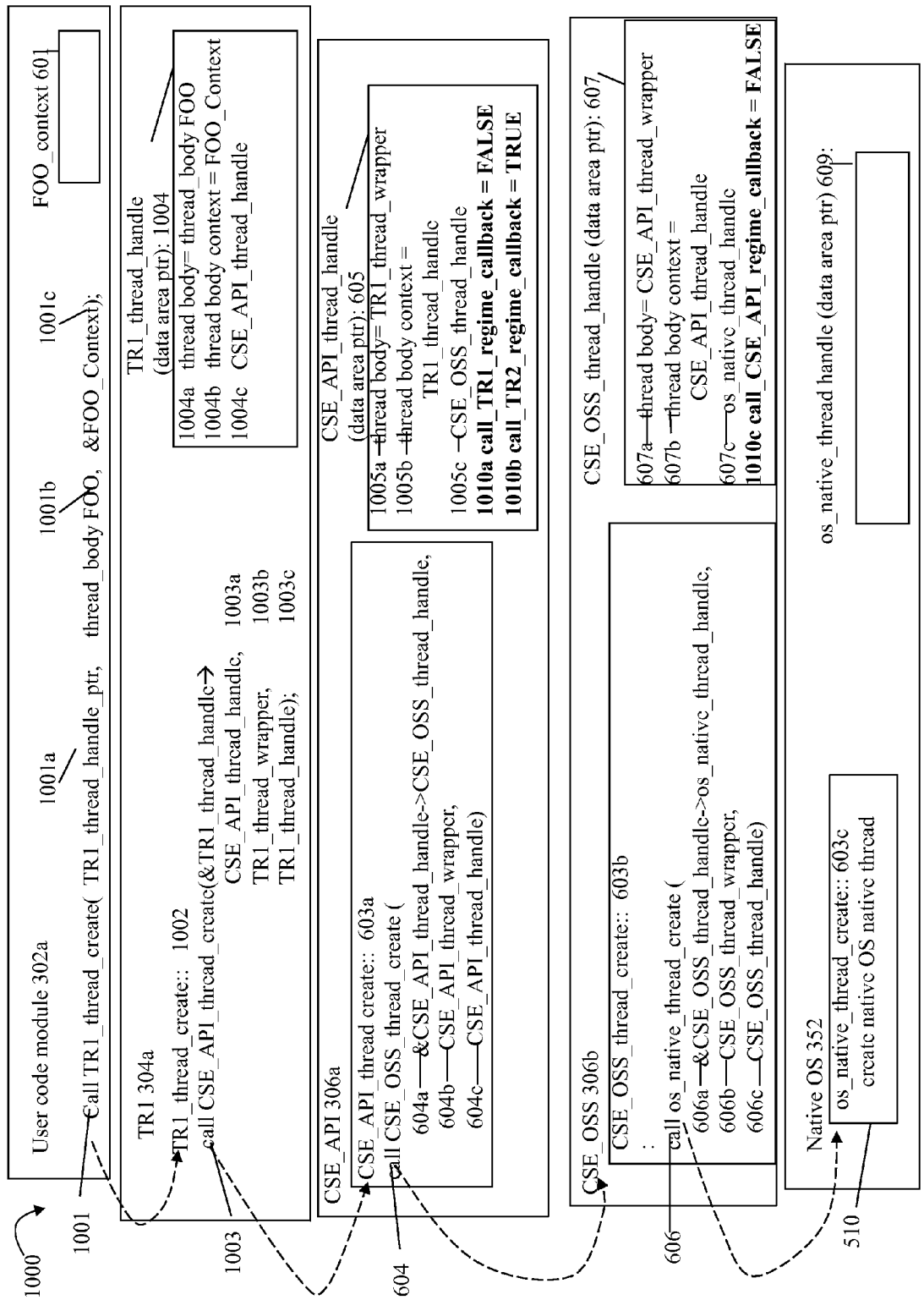

Reference is now made to FIG. 11. The example 1000 of FIG. 11 shows the create thread call chain (e.g., the left hand side of execution flow 900a) for the second example with additional details provided regarding the create thread API parameters for each level and the thread-specific data area of each level. Additionally, FIG. 11 provides further details regarding the create thread APIs invoked at each layer in the runtime stack in a manner similar to that as described herein with FIG. 7 for the first example. The difference between FIGS. 7 and 11 is that FIG. 11 includes such details and modification for the additional create thread API for layer or regime TR1 304a included in the create thread call chain of the runtime stack of the first thread for the second example (e.g., FIGS. 9 and 10) but not the first example (e.g., FIGS. 5 and 6).

Elements 1001, 1003, 604, and 606 provide further details regarding the parameters for each create thread call to a regime or layer. Elements 1004, 605, 607 and 609 identify the different thread-specific context information data areas of the different regimes or levels and element 601 identifies context information that may be used by the thread FOO being created. It should be noted that there may be an instance of 601, 1004, 605, 607 and 609 for each thread created by a call instance 602 from the user code module 302a.

To further illustrate, element 1001 represents a call to TR1_thread_create made from module 302a to regime or layer TR1 304a. In this case, the parameters of the call TR1_thread_create 602 may be as follows:

p1 is 1001a, TR1_thread_handle, a pointer or handle to thread-specific context information 1004 used by layer TR1;

p2 is 1001b, thread_body FOO, and identifies the entry point or body of code for the callback which is the thread body of code (e.g., the callback made from TR1 304a to user module 302a as illustrated by the transfer of control at 910a from TR1_thread wrapper 910 to the thread body of FOO 512 in FIG. 10); and p3 is 1001c, FOO_context, an address or otherwise identifies the thread specific context information 601 used by the created thread FOO in the user code module 302a.

Element 1003 represents a call to CSE_API_thread_create made from regime or layer TR1 304a to regime or layer CSE_API 306a. In this case, the parameters of the call CSE_API_thread_create 1003 may be as follows:

p1 is 1003a, &TR1_thread_handle→CSE_API_thread_handle, a pointer or handle to thread-specific context information 605 used by layer CSE_API;

p2 is 1003b, TR1_thread_wrapper, and identifies the entry point or body of code for the callback TR1_thread_wrapper (e.g., the callback made from CSE_API 306a to TR1 304a as illustrated by the transfer of control at 914a from CSE_API_thread wrapper 514 to TR1_thread wrapper 910 in FIG. 10) and p3 is 1003c, TR1_thread_handle, an address or otherwise identifies the thread specific context information 1004 (described below) used by layer or regime TR1 304a.

The create thread API calls in the layers or regimes as denoted by 604 and 606 and the associated parameters of each are described above in connection with FIG. 7.

The data area 605, CSE_API_thread_handle, used by the CSE_API layer 306a may include:

1005a, the entry point of the callback routine, TR1_thread_wrapper 910, in the TR1 304a regime invoked in runtime stack from the CSE_API layer 306a, 1005b, identifying (e.g., the address of) the thread-specific context information 1004 used by the layer or regime TR1 304a, 1005c, a field containing a pointer to the thread-specific context information 607 used by CSE_OSS layer 306b (e.g., layer below CSE_API in the chain of create thread APIs of runtime stack) which is populated as a result of the call 604 to CSE_OSS_thread_create, 1010a, a field for the Boolean variable call_TR1_regime_callback as described elsewhere herein used in connection with determining whether to invoke a registered birth callback for the TR1 regime, and 1010b, a field for the Boolean variable call_TR2_regime_callback as described elsewhere herein used in connection with determining whether to invoke a registered birth callback for the TR2 regime.

The data area 607 is as described in connection with FIG. 7 with the additional Boolean variable 1010c call_CSE_API_regime_callback as described elsewhere herein used in connection with determining which registered birth callback(s), if any are invoked.

The data area 1004, TR1_thread_handle, used by the TR1 layer 304a may include:

1004a, the entry point of the callback routine, the thread body for FOO, in user module 302a invoked in the runtime stack from the CSE_API layer 306a (e.g., the call at 910a of FIG. 10), 1004b, identifying (e.g., the address of) the thread-specific context information 601 used by the thread FOO in user module 302a, and 1004c, a field containing a pointer to the thread-specific context information 605 used by CSE_API layer 306a (e.g., layer below TR1 in the chain of create thread APIs of the runtime stack) which is populated as a result of the call to CSE_API_thread_create 1003.

Additionally, as a result of invoking the registered birth callback for the TR2 regime whereby the invocation is done from CSE_API_thread_wrapper 514 as described above, a data area for TR2 for thread FOO is also created and initialized as generally described in connection with FIG. 9B. In more detail, the thread specific context information 852 for the TR2 regime may include information and fields similar to that as described above for data area 1004. For example, the TR2 thread specific data area 852 may include a thread body field and a thread body context field (both of which may be null in this particular case), and a field 1004c CSE_API_thread_handle with a pointer or other identifier identifying the data area 605.

It should be noted that each of the thread-specific context information areas 1004 605, 607 and 609 at each layer or regime may also include other fields of context information that may be used specifically by that particular layer or regime, as well as a code module coded for use with that particular layer or regime.

Figure 12:
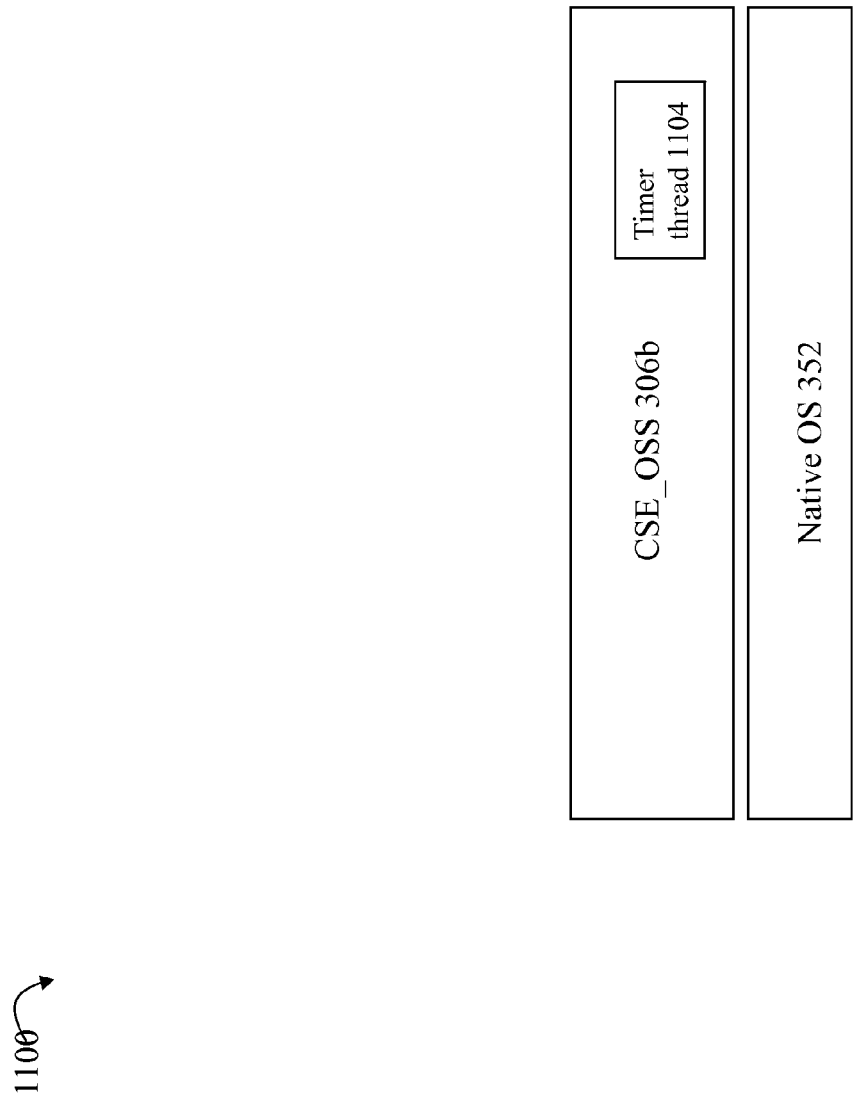
FIGS. 12, 13, and 14 are illustrations used in connection with a third example in an embodiment in accordance with techniques herein.

Referring to FIG. 12, shown is an illustration of the third example in accordance with techniques herein. As mentioned above, the third example described in following paragraphs is made initially with reference to the illustration of 1100 where, at a first point in time, only the regimes or layers CSE_OSS 306b and the native OS 352 are loaded and thus only regime CSE_OSS 306b is registered. Code of the CSE_OSS 306b may create a thread, the timer thread 1104, which may be invoked to wait an amount of time and then subsequently invoke a specified callback routine after that amount of time has elapsed. When the timer thread 1104 is created, consistent with other descriptions herein such as illustrated in connection with previous examples, only thread specific context information for regimes 352 and 306b for timer thread 1104 are created.

In this third example, it should be noted that the regimes or layers CSE_API 306a, TR1 306a, and TR2 306b are supported but have not yet registered. Thus, FIG. 12 is an illustration of the code loaded and executing at a first point in time prior to the remaining regimes or layers CSE_API 306*a*, TR1 306*a*, and TR2 306*b* being registered.

At a second point in time subsequent to the first point in time, the remaining regimes or layers CSE_API 306*a*, TR1 306*a*, and TR2 306*b* may register.

Figure 13:
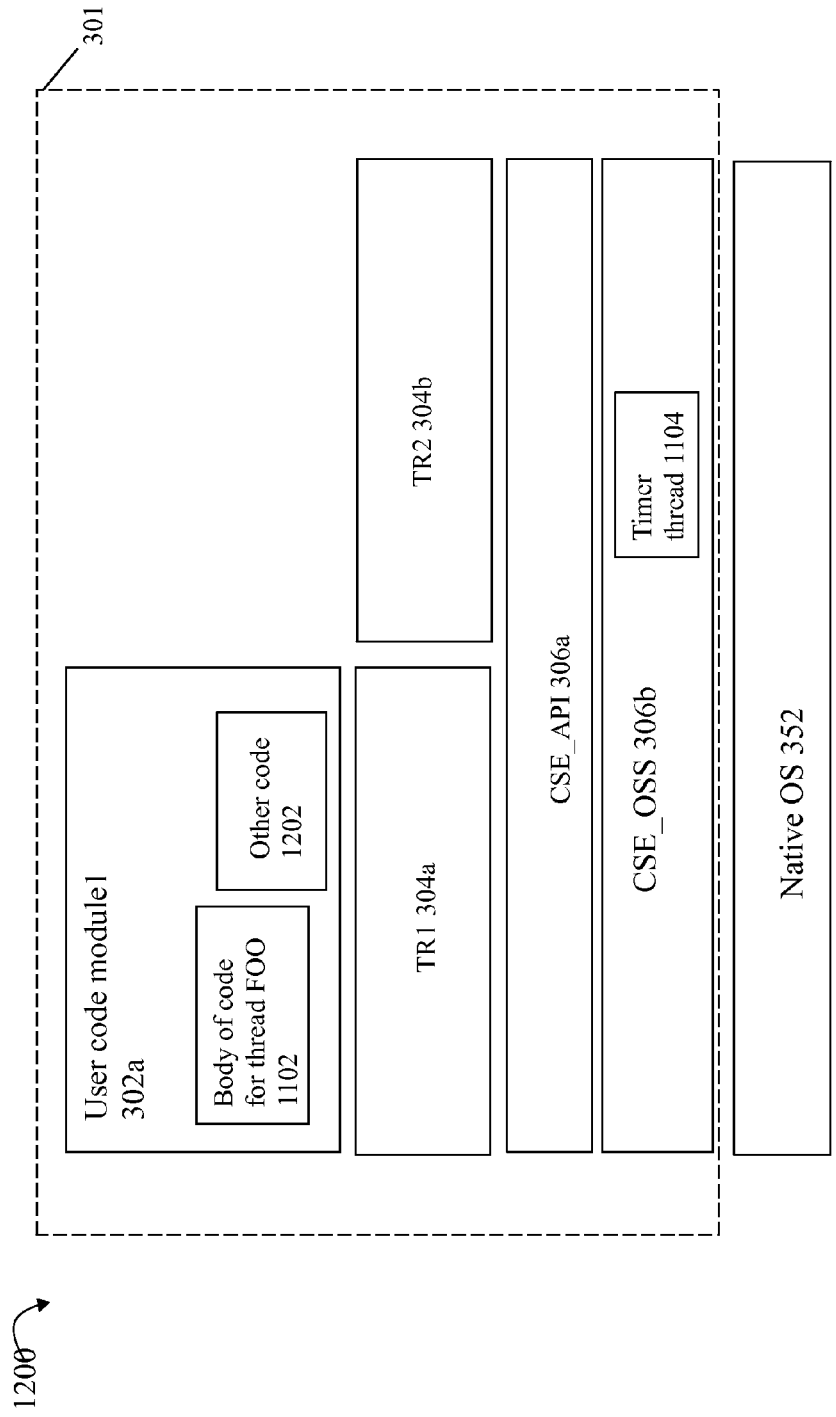

With reference now to FIG. 13, shown is an illustration of the registered regimes or layers and executing user code module 302*a* at the second point in time. The layers or regimes have a stacking order which, consistent with description elsewhere herein, represent the runtime stack and ordering of the different layers which are traversed with the create thread API call chain. Subsequent to the second point in time after remaining regimes 304*a*, 304*b* and 306*s* are registered and module 302*a* begin execution, code of user code module 302*a* creates thread FOO. The user code module 302*a* is coded for use with the TR1 304*a* API and regime for creating threads. Thus processing may be performed to create thread FOO as described in connection with the second example herein (e.g., code of a first thread of module 302*a* may issue a create thread API call to the TR1 regime or layer to result in creating a create thread API call chain resulting in creating a new native OS thread for thread FOO. The create thread call chain may return back to 302*a* to continue execution of the first thread. Additionally, a callback call chain included in the runtime stack for thread FOO results in execution of the body of code 1202 for thread FOO.). The user code module 302*a* may also include other code 1202 such as code for a timer event callback or interrupt handler as described in more detail below.

Figure 14:
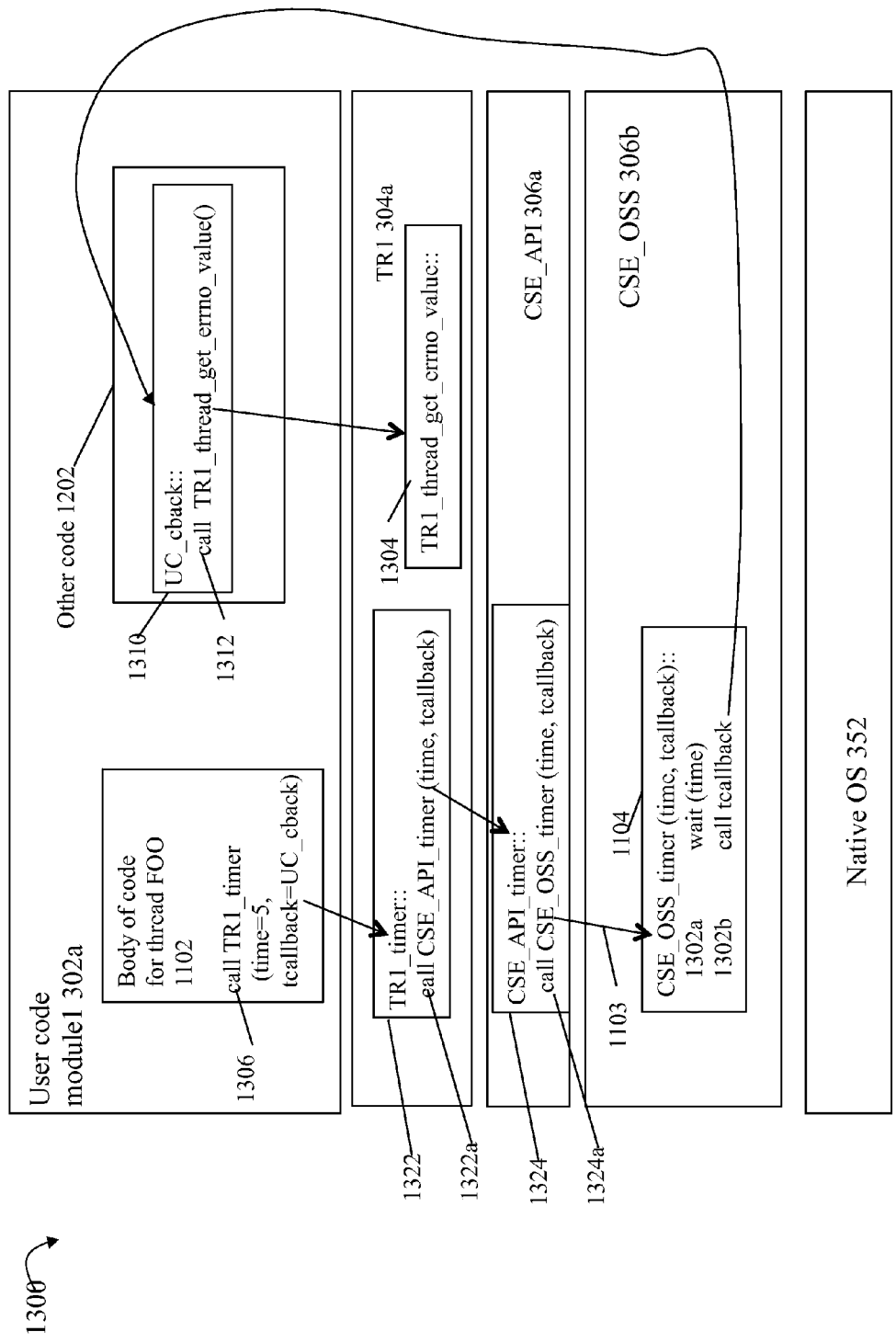

With reference now to FIG. 14, shown are further details regarding the third example. In 1300, the executing thread FOO 1102 may include a call 1306 to an API in the TR1 layer 306*b*. The call 1306 may be a call to a timer routine, TR1_timer 1322, which takes a first parameter, time, identifying the amount of time to wait, and a second parameter, tcallback indicating the routine to call or invoke once the amount of time specified by the first parameter has elapsed. As a result of call 1306, control is transferred to the body of code TR1_timer 1322 which may include call 1322*a* to the CSE_API timer API of the CSE_API regime 306*a*. As a result of call 1322*a*, control is transferred to the body of code 1324 for the CSE_API timer which may include call 1324*a* to the CSE_OSS_timer API of the CSE_OSS regime 306*b* which may wake up the timer thread having the body of code 1104 which may then begin execution. Thus, as a result of call 1324*a*, control is transferred to the body of code 1104 for the thread timer (previously created and as described in connection with FIG. 13 at the first point in time when only the regime 306*b* was registered).

It should be noted that waking up the timer thread as a result of executing 1324*a* (as illustrated by 1103) causes a switch in thread execution context to the timer thread. Up to and including code executed at point 1324*a*, execution is performed in the context of the thread FOO.

Element 1104 may represent the body of code for CSE_OSS_timer to which control is transferred as a result of execution of 1324*a*. Code for the CSE_OSS_timer 1104 is illustrated as including statement 1302*a* which waits an amount of time denoting by the first parameter, time, where "wait" in 1302*a* may be a call to a native OS routine. Statement 1302*b* results in transfer of control to the timer-related callback such as provided in the second parameter tcallback, established as an interrupt handler, or other suitable means. Execution of 1302*b* results in a transfer of control to the UC_cback in the other code 1202 of the user code module 302*a*. The other code 1202 may include 1310, the body of code for the timer callback handler or routine, UC_cback. The routine UC_cback 1310 may include a statement 1312 that is a call to the TR1_thread_get_errno_value API of the TR1 regime or layer 304*a*. Performing call 1312 results in a transfer of control to the code of 1304 to obtain the error number associated with the last routine or function having code executed prior to transferring control to UC_cback. Thus, the error number obtained specifies an error number encoding a status regarding execution of CSE_OSS_timer thread 1104.

It should be noted that the call at 1302*b* results in a transfer of control to the routine or body of code for the UC_cback 1310 whereby code of 1310 and subsequently 1304 execute in the context of the current thread which is the timer thread 1104 of the CSE_OSS layer or regime 306*b*. Thus, processing just described subsequent to waking up the timer thread and causing execution of code 1104 is in the context of the timer thread.

It should also be noted that any one or more of the layers or regimes may include other APIs and associated functionality besides that associated with creating a thread. For example, as indicated by 1310, the TR1 regime or layer 1304 may include a routine or function, TR1_thread_get_errno_value which may return a value denoting the current error condition associated with the currently executing thread FOO 1102. Also, as in connection with the third example, each regime or layer may include an API for a timer which results in the runtime call chain just described.

As an alternative to specifying the second parameter tcallback in each of the invocations to 1320, 1322 and 1104, the callback routine to be called or invoked upon the amount of time denoted by the time parameter elapsing may be established or defined in other ways. For example, the routine called may be an interrupt handler established as the routine to be invoked upon the occurrence of one or more events, such as a timer-related event that occurs due to processing performed by CSE_OSS_timer 1104 (also referred to herein as the timer thread or the CSE_OSS_timer thread). In the example of 1300, the call at 1306 indicates that the parameter time is 5 (e.g., 5 seconds or other time unit), and that the timer callback (tcallback) routine is UC_cback.

Figure 14A:
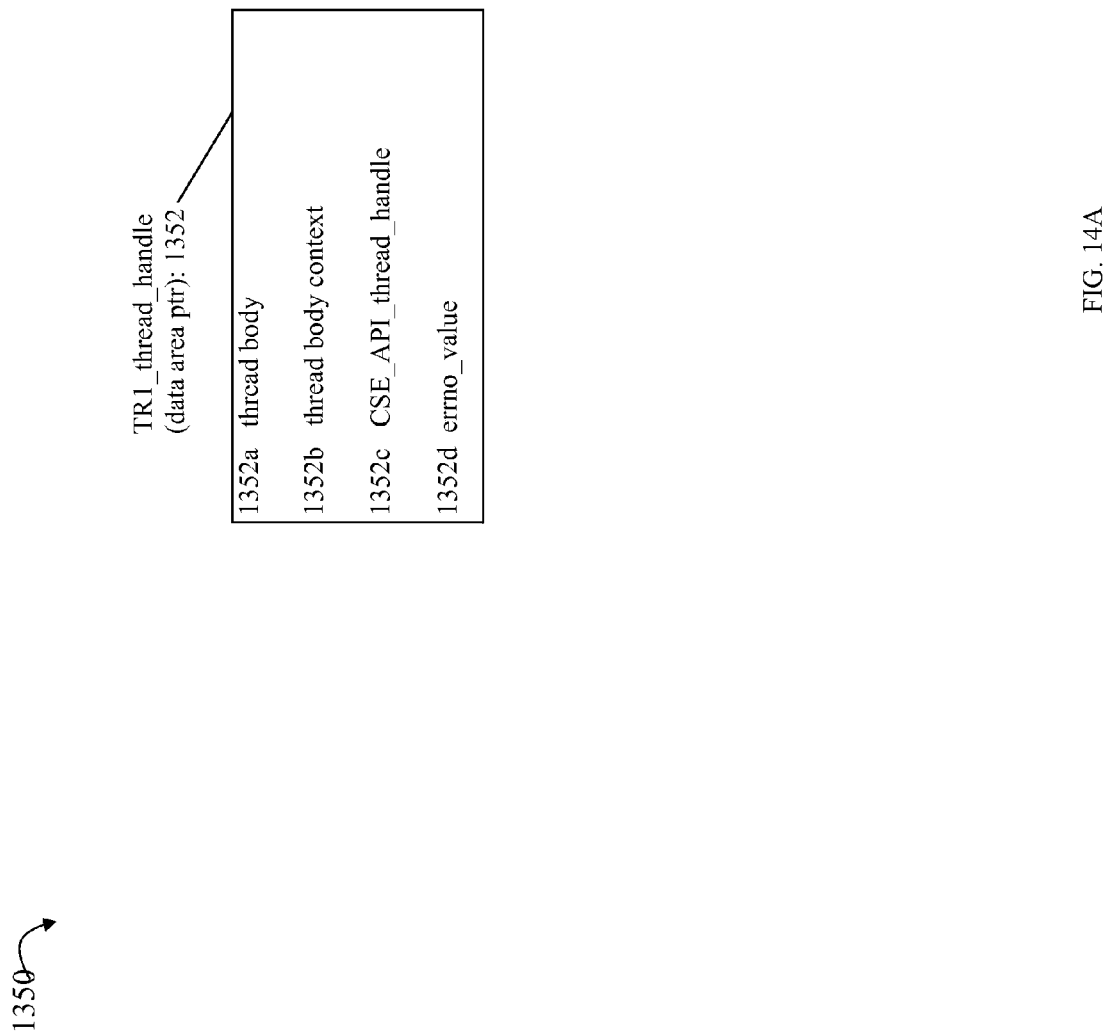

Referring to FIG. 14A, shown is an example illustrating the thread-specific context information that may be used for the TR1 regime in connection with the third example in an embodiment in accordance with techniques herein. The example 1350 includes fields 1352*a* thread body, thread body context 1352*b*, and CSE_API_thread_handle 1352*c* as described elsewhere herein, such as in connection with the second example and FIG. 11. Additionally, the thread-specific context information for the TR1 regime may also include field 1352*d* errno_value, which may be an integer field including a value for the error number encoding a status regarding execution of the last TR1 function or routine executed. As known in the art, errno is a well known Unix thread-specific value that may be set to any one of multiple predefined error number values each denoting a different error status regarding execution of the last function or routine for an executing thread.

What will now be described are techniques that may be performed to create and initialize the thread-specific context information for thread CSE_OSS_timer when executing the routine TR1_thread_get_errno_value of the TR1 regime whereby TR1 is a regime which was not loaded and registered at the time thread CSE_OSS_timer was created and thus where thread-specific context information for the regime TR1 for the thread CSE_OSS_timer was not created.

Referring to FIG. 15, shown is an example of logical processing that may be performed by routines in an embodiment in accordance with techniques herein. Element 1401 provides further details regarding logical processing that may be performed by the routine TR1_thread_get_errno included in the TR1 regime or layer in an embodiment in accordance with techniques herein. The example 1401 includes a statement 1402 to retrieve the execution context for the currently executing thread. Execution_context_find may be an API of the CSE_OSS layer which further invokes the get_os_native_tls_ptr API of the native OS layer. The API get_os_native_tls_ptr is described elsewhere herein. Statement 1404 may be a call to thread_regime_context_get_and_init_on_first_use, which retrieves from an execution context structure, provided as the first parameter "execution_context", the pointer or handler to the thread-specific context information for the regime identified by the second parameter, TR1_REGIME_ID. Statement 1406 returns the value of the particular data item, "errno_value", from the thread-specific context information for the regime TR1 for the currently executing thread FOO. It should be noted that the processing performed by thread_regime_context_get_and_init_on_first_use referenced at line 1404 and other routines are described in more detail elsewhere herein.

In this example, though, there is no existing data area including the thread-specific context information for layer or regime TR1 for thread CSE_OSS_timer 1104 since the layer or regime TR1 was not registered at the time thread CSE_OSS_timer 1104 was created. Thus, with reference back to FIG. 9A, although there is an execution context structure 830 for the currently executing thread CSE_OSS_timer 1104, the value for TR1_thread_handle 831c may be null or otherwise indicate that there is no thread-specific context information for the TR1 regime for thread CSE_OSS_timer.

What will now be described are techniques that may be used to create and initialize the thread-specific context information for the TR1 regime for thread CSE_OSS_timer 1104. With reference to statement 1404, such processing is performed as a result of the call to thread_regime_context_get_and_init_on_first_use whereby element 1410 provides further detail regarding logical processing performed by thread_regime_context_get_and_init_on_first_use. As indicated in 1410, the routine thread_regime_context_get_and_init_on_first_use returns a pointer that is an entry of the regime context array 836 for the specific execution_context whereby the pointer identifies the data area including the thread-specific context information for the desired regime, TR1. Additionally, if the data area does not exist, processing is performed to create and initialize it to include the appropriate thread-specific context information.

Statement 1410a is an IF statement that determines whether the thread-specific context information for the TR1 regime, as denoted by the second parameter, regime_id, of the specified execution context structure, as denoted by the first parameter execution_context, has been created. The IF statement evaluates to true if such thread-specific context information does not exist and results in execution of statement 1410b which performs a call to the routine thread_regime_birth_callback_issue to invoke the registered birth callback for the desired TR1 regime and create and initialize the thread-specific context information for TR1 for the execution_context.

Referring to FIG. 16, shown is an example providing more detail regarding processing performed by thread_regime_birth_callback_issue in an embodiment in accordance with techniques herein. At step 1502, a determination is made by the IF statement whether there is a registered birth callback for the desired regime TR1. If step 1502 evaluates to yes, statement 1504 is performed to invoke the registered birth callback for the desired regime, such as TR1 in this example. Line 1506 obtains the execution context structure for the currently executing thread CSE_OSS_timer 1104. Element 1508 adds the current context to the execution_context_list 826 of the global information 822 (e.g., as in FIG. 9A). As mentioned elsewhere herein, the execution_context_list 826 may identify a list of execution contexts including thread-specific context information for a regime where the thread-specific context information is created as a result of a registered birth callback for the regime. The execution context list 826 may be a single list of such execution contexts for thread specific information created as a result of a registered birth callback with respect to all regimes for a single process. Line 1510 results in setting the in use mask bit 832 for the desired regime, such as TR1 in this example, to denote the thread-specific context information for the TR1 regime has been created as a result of the registered birth callback for the TR1 regime. Line 1512 results in incrementing the outstanding thread count 824c (of FIG. 9A) for the regime TR1 to indicate that a thread CSE_OSS_timer has thread-specific context information for regime TR1 that needs to be cleaned up if and when the TR1 regime is unloaded and unregistered. Line 1514 is executed if statement 1502 evaluates to false denoting that the birth callback for the specified regime, such as TR1, is not registered so the context pointer is initialized to null or another predetermined value, such as INITIALIZE_ON_FIRST_USE.

Figure 17:
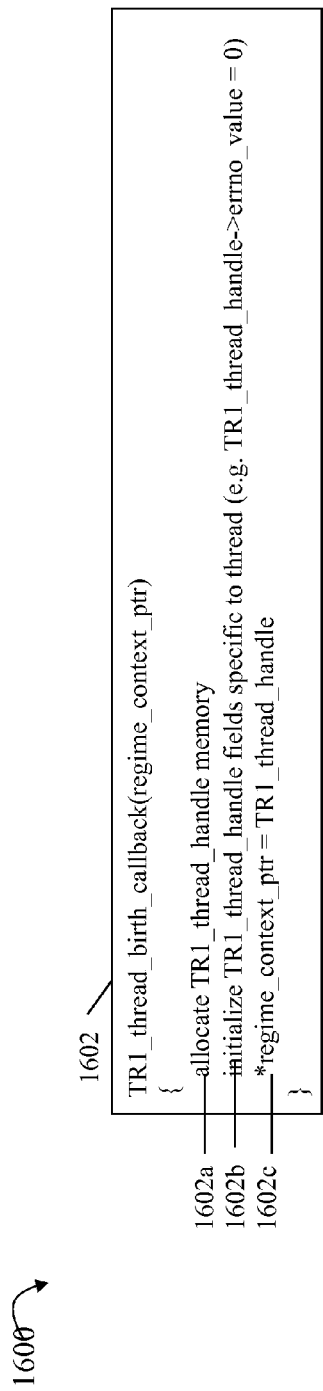

Referring to FIG. 17, shown is an example of processing that may be performed for the registered birth callback for the TR1 regime or layer in connection with an embodiment in accordance with techniques herein. The example 1600 includes element 1602 describing in more detail logical processing that may be performed for the birth callback of the TR1 regime or layer. At 1602a, memory may be allocated for the pointer or identifier, TR1_thread_handle, of data area including thread-specific context information for the TR1 regime. At 1602b, the data area is initialized to include the thread-specific context information for the TR1 regime for the specific thread, such as the CSE_OSS_timer thread. At 1602c, the regime context ptr (e.g., array of the regime context array) is updated to identify the data area just created and initialized.

Thus, as a result of calling thread_regime_birth_callback_issue with respect to the thread CSE_OSS_timer for the TR1 regime (which ultimately results in invoking the birth callback for the TR1 regime such as described in 1602), the data area for the thread-specific context information for the TR1 regime for the thread CSE_OSS_timer is created and initialized. With reference back to FIG. 14A, a data area including the information 1352 may be created and initialized for thread CSE_OSS_timer. In this particular example, 1352a, 1352b and 1352c may be initialized to null or some other suitable value.

Each regime may include code for a create thread API particular to that regime. Thread exits by returning from the thread body. It should be noted that each regime may also have other APIs for performing thread operations and use in connection with other thread-based processing and the life cycle of a thread. For example, although not described herein, each regime may also include an exit thread API so that a thread may also terminate as a result of using the exit thread API rather than returning from the thread body as noted above.

Each regime also registers with the infrastructure using the register API, thread_regime_callbacks_register, described herein in order to be used with techniques herein. Each regime may also unregister using the unregister API, thread_regime_callbacks_unregister, described herein when the regime is ready to unload or no longer be used with the infrastructure performing techniques herein. Each regime may include code for the regime-specific birth callback and death callback identified in the register API. Each regime may also include code for the thread wrapper or callback routine included in the callback call chain described herein The register and unregister APIs may be APIs included in infrastructure or facility code.

In connection with the unregister API, thread_regime_callbacks_unregister, processing may be performed to cleanup and remove any thread-specific context information data areas for the regime being unregistered. The unregister API may invoke the death callback for the regime for each such data area including thread-specific information for the regime being unregistered.

Referring to FIG. 17A, shown is an example of processing that may be performed by the thread_regime_callbacks_unregister API in an embodiment in accordance with techniques herein. At line 1652, an IF statement determines whether there are any existing data areas for threads for the particular regime, regime_id. In this example, such a determination may be made with respect to the outstanding_thread_count data item for regime_id. (e.g., data item 824c of thread world global info structure a described in connection with FIG. 9A and elsewhere herein). If 1652 evaluates to true, processing of the THEN portion (e.g., lines 1654-1660) may be performed. Line 1654 is a for loop which traverses the list of execution contexts for the current process. For each execution context in the list lines 1656-57 ensure that the entry in the in use mask 832 (of FIG. 9B) for the particular regime_id is clear thereby indicating that the execution context for the regime is no longer in use. At line 1658, a determination is made as to whether all entries of the in_use mask of the current execution context structure are zero. If so, then the execution context may be removed from the execution_context_list at line 1659. At line 1660, the death callback for the regime is called to deallocate storage and perform any other suitable cleanup processing for the thread-specific context information data area of the current execution context. Steps of the for loop beginning spanning lines 1654 through 1660 (e.g., including 1654, 1656, 1657, 1658, 1659, 1660) are performed with respect to each entry of the execution context list.

Once the for loop processing beginning at step 1654 has been performed with respect to each execution context in the execution context list, control then proceeds to line 1661 where the entry of the birth callback array 824a (of FIG. 9B) for the particular regime, regime_id, being unregistered is set to NULL. Similarly, line 1662 sets the entry of the death callback array 824b (of FIG. 9B) for the particular regime, regime_id, being unregistered to NULL. If the conditional IF statement at line 1652 evaluates to false, processing proceeds directly to line 1661.

In an embodiment in accordance with techniques, an assumption may be that the regime CSE OSS registers prior to any other regime. As part of initialization processing performed for the CSE_OSS regime, such initialization processing may include registering the CSE_OSS regime and also may include creating and initializing various structures described herein, such as the thread world global information, used in connection with techniques herein.

Figure 18A:
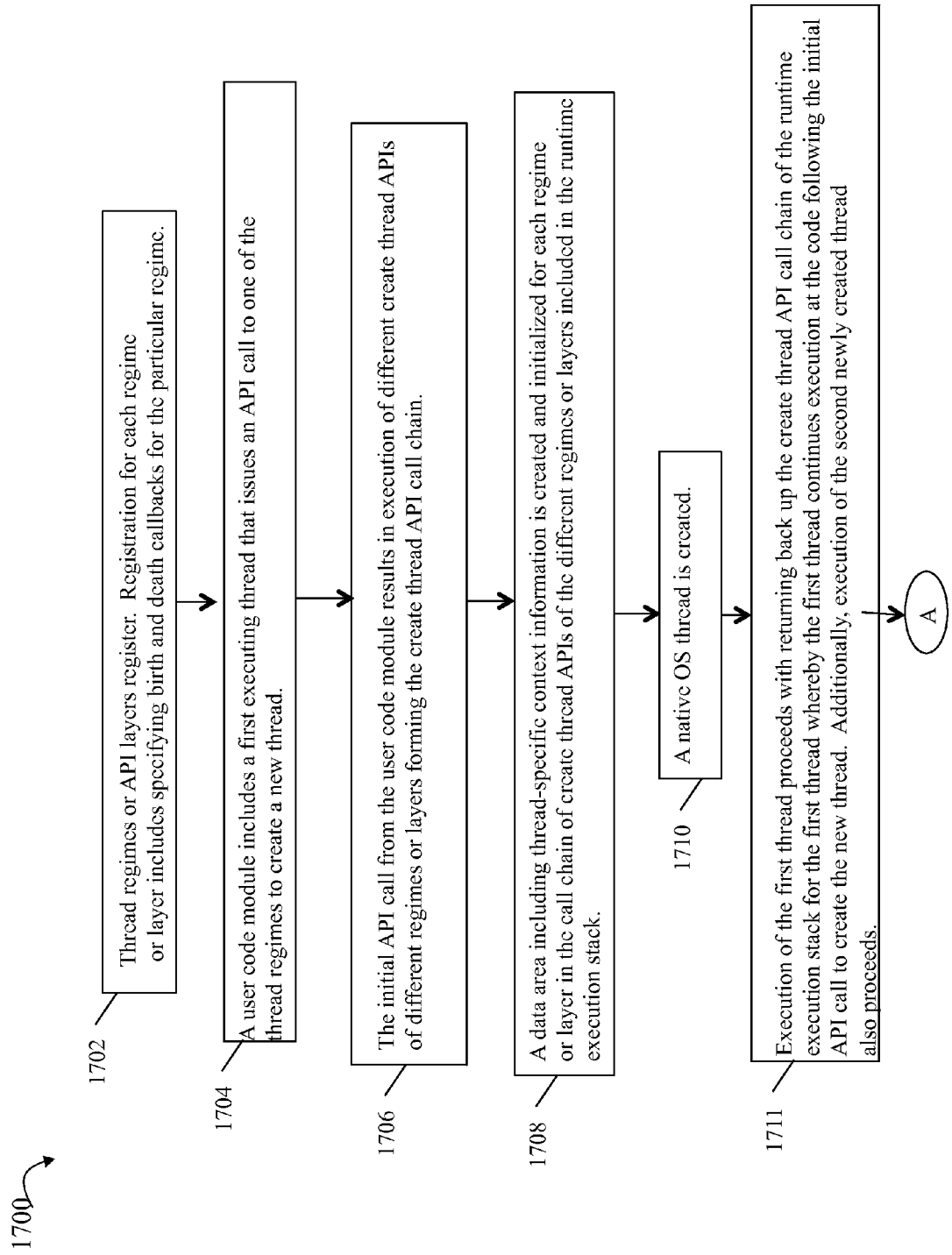
FIGS. 18A-18C are flowcharts of processing steps that may be performed in an embodiment in accordance with techniques herein.
Figure 18B:
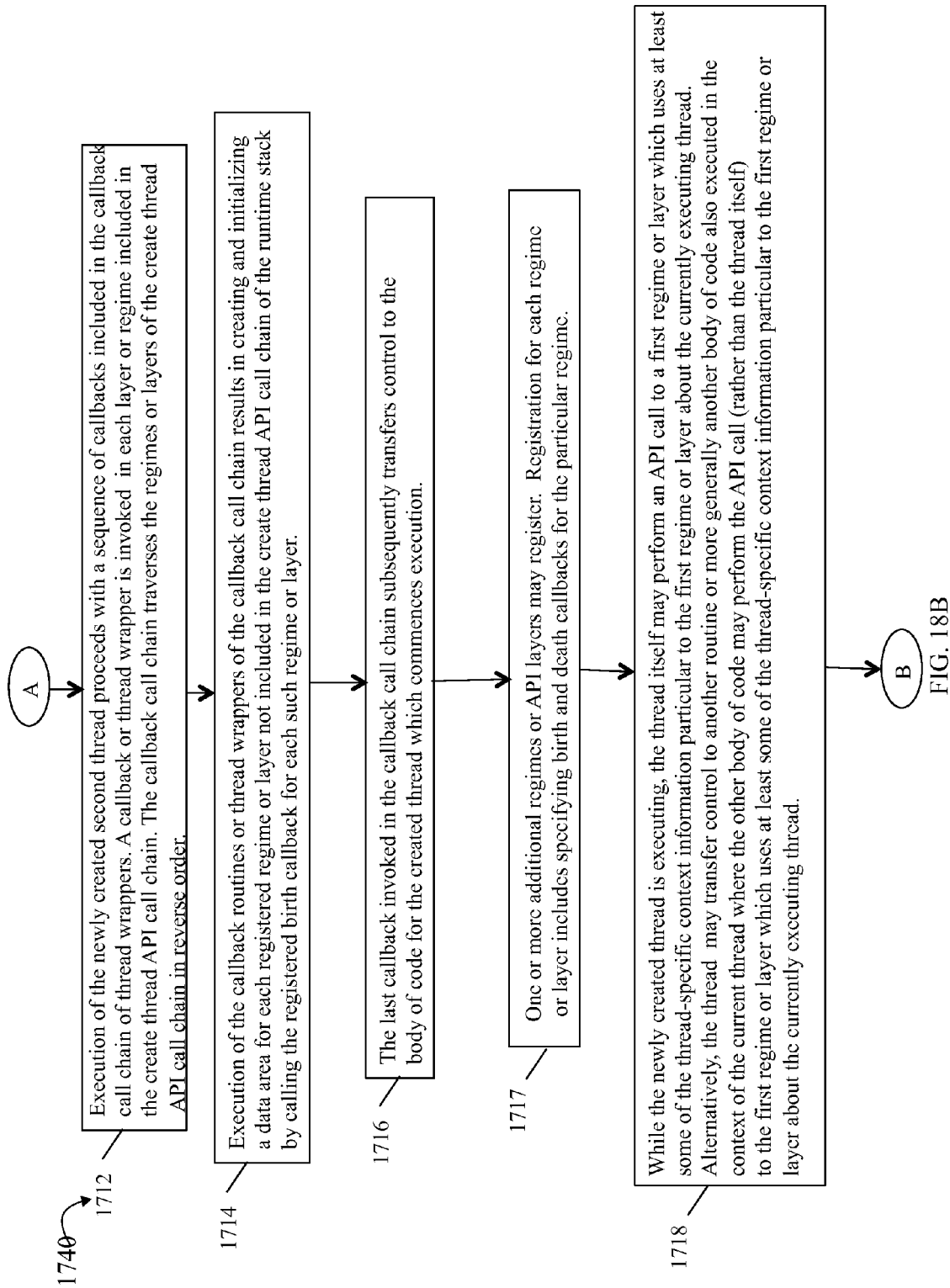
Figure 18C:
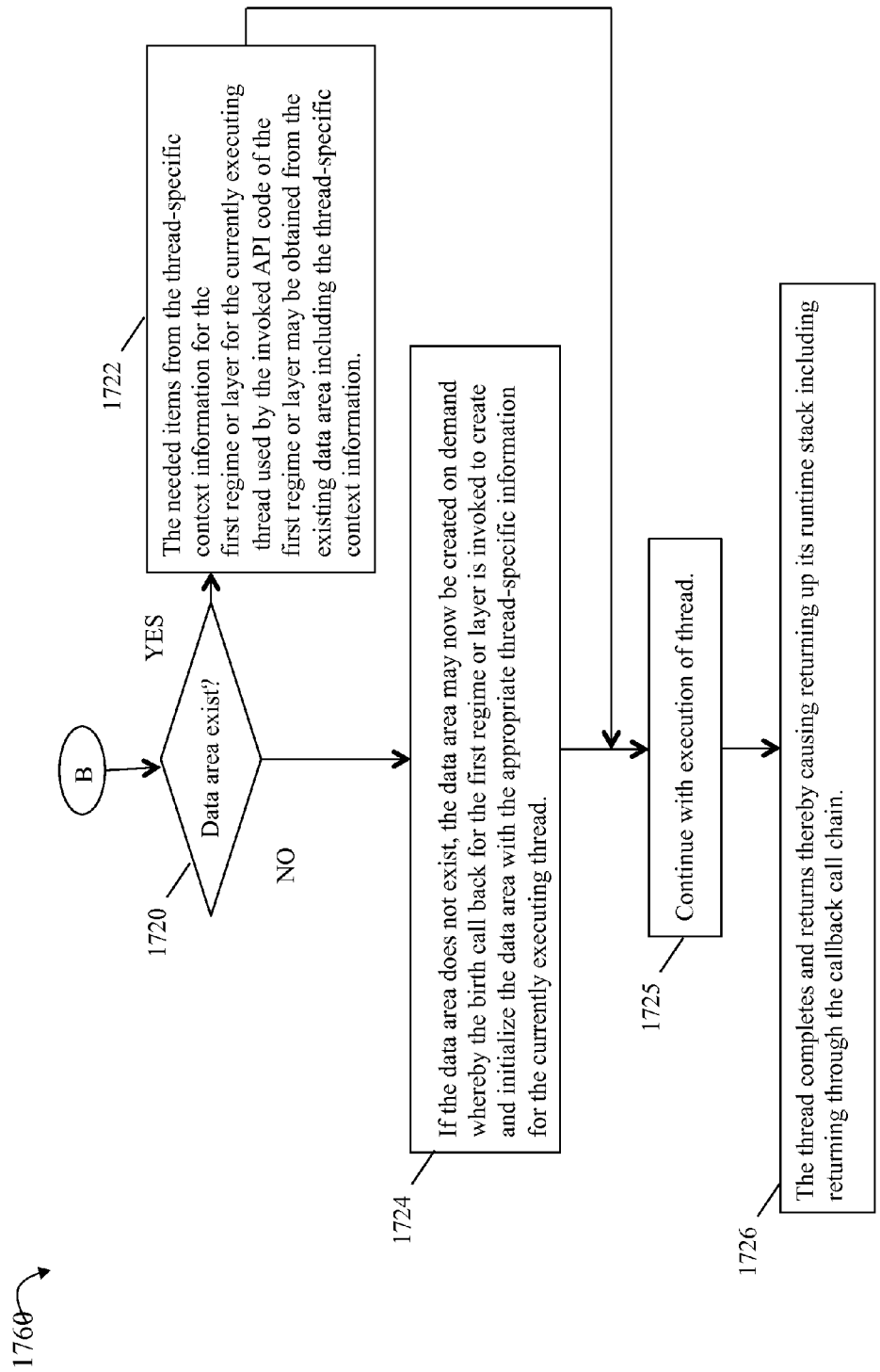

Referring to FIGS. 18A-18C, shown are flowcharts of processing steps that may be performed in an embodiment in accordance with techniques herein. The steps of the flowcharts 1700, 1740 and 1760 generally summarize processing described above. The processing described is performed with respect to a single process that may include a first executing thread which issues a create thread API call to create a new second thread.

At step 1702, one or more thread regimes or API layers register. Registration for each regime or layer includes specifying a birth and death callback for each of the regimes. At step 1704, a user code module executes and includes a first executing thread that issues an API call to one of the registered thread regimes to create a second new thread. At step 1706, the initial API call made by the first thread executing code of the user code module results in execution of different create thread APIs of different regimes or layers forming the create thread API call chain for creating the second new thread. At step 1708 a data area including thread-specific context information for the second new thread is created and initialized for each regime or layer in the call chain of create thread APIs of the different regimes or layers included in the runtime execution stack. At step 1710, a new native OS thread (e.g., for the second thread) is created. The call to create the new OS native thread in 1710 may be executed in the context of the first thread and, responsive to such a call, results in creating the second new thread. At step 1711, execution of the first thread proceeds with returning back up the create thread API call chain of the runtime execution stack for the first thread whereby the first thread continues execution at the code following the initial API call to create the new thread (e.g., continue execution of code of the first thread following invocation of create thread API in step 1704). Additionally, execution of the second newly created thread also proceeds. It should be noted that steps subsequent to 711 are executed in the context of the newly created second thread. Processing associated with steps 1704, 1706, 1708 and 1710 may be performed by the first thread (e.g., in the context of the first thread). In connection with step 711 with the first thread returning or unwinding its execution stack with respect to the create thread API call, processing for the first thread proceeds with traversal of its runtime stack to unwind through the various layers or regimes of the create thread call chain (e.g., from the native OS where the native OS create thread call is made in step 710 to return to the user code module following the point in step 1704 where the initial API call was made to create the new second thread.

At step 1712, execution of the second thread (e.g., newly created in step 1710) proceeds with a sequence of callbacks included in the callback call chain of thread wrappers. A callback or thread wrapper is invoked in each layer or regime included in the create thread API call chain. The callback call chain traverses the regimes or layers of the create thread API call chain in reverse order. At step 1714, execution of the callback routines or thread wrappers of the callback call chain results in creating and initializing a data area for each registered regime or layer not included in the create thread API call chain of the runtime stack by calling the registered birth callback for each such regime or layer. At step 1716, the last callback or thread wrapper invoked in the callback call chain subsequently results in transfer of control to the body of code for the created thread which commences execution. At step 1717, one or more additional regimes or API layers may register. Registration for each regime or layer includes specifying birth and death callbacks for the particular regime. At step 1718, while the second thread (e.g., created in step 710) is executing, the thread itself may perform an API call to a first regime or layer which uses at least some of the thread-specific context information particular to the first regime or layer about the currently executing thread. Alternatively, the thread may transfer control to another routine or more generally another body of code also executed in the context of the current second thread where the other body of code may perform the API call (rather than the thread itself) to the first regime or layer which uses at least some of the thread-specific context information particular to the first regime or layer about the currently executing thread, the second thread. At step 1720, a determination is made as to whether the data area including the thread-specific context information for the first regime or layer for the currently executing thread (e.g., second thread created in step 710) exists. If step 1720 evaluates to yes, control proceeds to step 1722. At step 1722, The needed items from the thread-specific context information for the first regime or layer for the currently executing thread used by the invoked API code of the first regime or layer may be obtained from the existing data area including the thread-specific context information. From step 1722, control proceeds to step 1725. If step 1720 evaluates to no, control proceeds to step 1724. If the data area does not exist, in step 1724 the data area is now created on demand whereby the birth callback for the first regime or layer is invoked to create and initialize the data area with the appropriate thread-specific information for the currently executing thread. Control proceeds to step 1725. In step 1725, execution of the current second thread continues. At step 1726, the second thread completes and returns thereby causing traversal of its runtime stack to return from the user code including the second thread's body of code to the point in the native OS create thread code at which the second thread was created in step 1710. Step 1726 processing may include unwinding the runtime execution stack of the second thread which includes the callback call chain whereby responsive to the second thread returning or exiting, a death callback is invoked for each regime or layer where a prior birth callback was invoked for that same regime or layer. A death callback registered for a first regime or layer may, for example, perform processing to deallocate storage previously allocated for the thread-specific context information in a prior birth callback registered for the first regime for the second new thread.

In following paragraphs, provided are more detailed descriptions regarding the various structures and fields as well as processing performed by the various bodies of code that may be used in an embodiment in accordance with techniques herein such as in connection with the examples described above.

Following is more detail regarding the various structures that may be included in an embodiment in accordance with techniques herein. Such structures may include fields as mentioned above and also possibly other fields.

```
/* maintains global information about registered threading regimes */
struct thread_world_global_info /* as described, for example, in connection with FIG. 9A */
{
    regime_info[ ] { /* array of entries describing registration information for each thread
regime */
        birth_callback /* called when thread is created or when needed to allow regime to
initialize its per thread data */
        death_callback /* called when thread exits or when regime is unregistered to allow
regime to deinitialize it's per thread data */
        outstanding_thread_count /* count of number of entries on execution_context_list for this
regime */
    }
}
/* contains per thread data common to all thread regimes as well as the information about the
status of the different threading regimes with respect to the current context of execution */
struct execution_context {
/* As described above, for example, in connection with FIGS. 8, 9A */
    TR1_thread_handle
    TR2_thread_handle
    CSE_API_thread_handle
    CSE_OSS_thread_handle
    type /* type of context (thread, DPC (deferred procedure call), interrupt) */
    spinlock_count /* number of spinlocks held by the thread */
    execution_state /* state of the current execution (used to determine what operations can be
safely run) */
        /* these fields are specific to the threading regime support infrastructure */
    execution_context_list_entry /* entry for this execution context in
            thread_world_global_info.execution_context_list. This is used to
            track outstanding dynamically created contexts */
    disable_mask /* mask used by thread create routines to control whether birth/death callbacks
        are issued for a given regime when new threads are created by the current
        thread. Each bit represents a different regime */
    inuse_mask /* mask used to indicate what thread regimes have been dynamically allocated for
this context */
    regime_context[ ] /* array of context pointers that are used by each thread regime to store
their
thread context */
}
```

In some embodiments, it should be noted that the type field of the execution context structure may identify any of a defined set of possible types such as thread, DPC (deferred procedure call), or interrupt. In one embodiment, a thread may be used as code entity to implement or simulate other code entities, such as DPCs, or interrupt service routine such as described, for example, in U.S. Pat. No. 8,387,075, issued Feb. 26, 2013, MCCANN et al, COMMON SCHEDULING AND SYNCHRONIZATION PRIMITIVES, which is incorporated by reference herein.

```
/* contains common info for thread-specific context information for TR1 thread regime */
/* As described above, for example, in connection with FIGS. 7, 11, 14A
struct TR1_thread_handle {
   thread_body_TR1 /* thread entry point provided by user */
   thread_body_context /* pointer to optional user private data */
   errno_value /* the error number of the last TR1 function executed */
   CSE_API_thread_handle /* pointer to thread handle for user CSE_API thread regime */
}
/* contains common info for thread-specific context information for TR2 thread regime */
/* As described above, for example, in connection with FIGS. 7, 11
struct TR2_thread_handle {
   thread_body /* thread entry point provided by user */
   thread_body_context /* pointer to optional user private data */
   last_error /* the last error value -- similar to errno_value of TR1 but different error values for
a
         different TR2 regime
   CSE_API_thread_handle /* pointer to thread handle for user CSE_API thread regime */
}
/* contains common info for thread-specific context information for CSE_API thread regime */
/* As described above, for example, in connection with FIGS. 7, 8, 11
struct CSE_API_thread_handle {
   thread_body /* thread entry point provided by user */
   thread_body_context /* pointer to optional user private data */
   call_TR1_regime_callback /* Boolean indicates whether given thread needs to call birth/death
      callbacks for Thread Regime 1 (TR1) */
   call_TR2_regime_callback /* Boolean indicates whether given thread needs to call birth/death
      callbacks for Thread Regime 2 (TR2) */
   NAME /* thread name */
   CSE_OSS_thread_handle /* pointer to thread handle for low level CSE_OSS thread regime */
}
/* contains common info for thread-specific context information for CSE_OSS thread regime */
/* As described above, for example, in connection with FIGS. 7, 8, 11
struct CSE_OSS_thread_handle {
   thread_body /* thread entry point provided by user */
      thread_body_context /* pointer to optional user private data */
      thread_name /* name of thread */
      call_CSE_API_regime_callback /* indicates whether given thread needs to call CSE_API
         thread regime callback */
      os_native_thread_handle /* pointer to OS native thread handle */
}
/* partner to CSE_OSS_thread_handle. conceptually same sort of information typically stored
on the new threads stack to reduce size of CSE_OSS_thread_handle structure */
struct CSE_OSS_thread_local_info {
   execution_context /* contains per thread data common to all thread regimes as well as the
      information about the status of the different threading regimes with respect to the current
      context of execution */
   thread_id /* native OS thread id for current thread */
      thread_tsv /* optional thread specific information that may or may not be used by an OS
implementation */
}
/* structure allocated dynamically by CSE_OSS (CSE Operating System Specific) thread regime
to maintain state relevant to that regime */
struct CSE_OSS_thread_impersonate_info {
   CSE_OSS_thread_local_info;
   CSE_OSS_thread_handle;
}
```

Following are descriptions providing more detail regarding processing that may be performed for thread create APIs provided by the different regimes.

```
TR1_thread_create(TR1_thread_handle_ptr, thread_body, thread_body_context,
            arg1a, ..., argNa)
{
  Allocate TR1 thread handle
  Initialize/populate TR1 thread handle (store thread_body, thread_body_context, private_data,
args)
   thread_regime_callbacks_disable(TR1_REGIME_ID)
   CSE_API_thread_create(&TR1_thread_handle->CSE_API_thread_handle,
      TR1_thread_wrapper,_TR1_thread_handle,_arg1b, ..., argNb)
   thread_regime_callbacks_enable(TR1_REGIME_ID);
   Store allocated TR1 thread handle in TR1_thread_handle_ptr
}
TR2_thread_create(TR2_thread_handle_ptr, thread_body, thread_body_context, arg1b, ...,
                                    argNb)
{
  Allocate TR2 thread handle
```

```
  Initialize/populate TR2 thread handle (store thread_body, thread_body_context, private_data,
args)
    thread_regime_callbacks_disable(TR2_REGIME_ID)
    CSE_API_thread_create(&TR2_thread_handle->CSE_API_thread_handle,
        TR2_thread_wrapper, TR2_thread_handle, argNc, ..., argNc)
    thread_regime_callbacks_enable(TR2_REGIME_ID);
    Store allocated TR2 thread handle in TR2_thread_handle_ptr
}
CSE_API_thread_create(CSE_API_thread_handle_ptr, thread_body, thread_body_context,
        arg1c, ..., argNc)
{
  allocate CSE_API thread handle
  initialize/populate CSE_API thread handle (e.g., store thread_body, thread_body_context,
      NAME, private_data, args)
  thread_regime_callbacks_disable(CSE_API_REGIME_ID)
  /* if regime callbacks are enabled then set flag in handle to tell wrapper we need to call
regime
callback */
    if (thread_regime_callbacks_are_disabled(TR1_REGIME_ID) {
      CSE_API_thread_handle->call_TR1_regime_callback = FALSE;
    }else {
      CSE_API_thread_handle->call_TR1_regime_callback = TRUE;
    }
  /* if regime callbacks are enabled then set flag in handle to tell wrapper we need to call
regime
callback */
    if (thread_regime_callbacks_are_disabled(TR2_REGIME_ID) {
      CSE_API_thread_handle->call_TR2_regime_callback = FALSE;
    }else {
      CSE_API_thread_handle->call_TR2_regime_callback = TRUE;
    }
    CSE_OSS_thread_create(&CSE_API_thread_handle->CSE_OSS_thread_handle,
        CSE_API_thread_wrapper, CSE_API_thread_handle, arg1d, ..., argNd)
    thread_regime_callbacks_enable(CSE_API_REGIME_ID)
    Store allocated CSE_API thread handle in CSE_API_thread_handle
}/** end CSE_API_thread_create
CSE_OSS_thread_create(CSE_OSS_thread_handle_ptr, thread_body, thread_body_context,
arg1d, ..., argNd)
{
  allocate CSE_OSS thread handle
  initialize/populate CSE_OSS thread handle (store thread_body, thread_body_context, private
data, args)
  /* if regime callbacks are enabled then set flag in handle to tell wrapper we need to call
regime
callback */
    if (thread_regime_callbacks_are_disabled(CSE_API_REGIME_ID) {
      CSE_OSS_thread_handle->call_CSE_API_regime_callback = FALSE;
    }else {
      CSE_OSS_thread_handle->call_CSE_API_regime_callback = TRUE;
    }
    thread_regime_callbacks_disable(CSE_OSS_REGIME_ID)
    os_native_thread_create(CSE_OSS_thread_handle->os_native_thread_handle,
        CSE_OSS_thread_wrapper, CSE_OSS_thread_handle, arg1e, ..., argNe)
    thread_regime_callbacks_enable(CSE_OSS_REGIME_ID)
    Store allocated CSE_OSS thread handle in CSE_OSS_thread_handle_ptr
}/** end CSE_OSS_thread_create
os_native_thread_create(os_native_thread_handle_ptr, thread_body, thread_body_context)
{
  creates os native thread of execution and calls body
}/** end os_native_thread_create
```

Following are descriptions providing more detail regarding processing that may be performed for thread wrapper APIs provided by the different regimes used for callbacks such as, for example, in connection with Figures 6 and 10.

```
CSE_OSS_thread_wrapper(CSE_OSS_thread_handle)
{
    CSE_OSS_thread_local_info;
    initialize CSE_OSS_thread_handle fields specific to thread body (e.g.
        CSE_OSS_thread_handle->local_info = CSE_OSS_thread_local_info);
    execution_context_push(THREAD_TYPE,
        &CSE_OSS_thread_local_info->execution_context);
    CSE_OSS_thread_local_info->execution_context->CSE_OSS_thread_handle =
        CSE_OSS_thread_handle;
    if (CSE_OSS_thread_handle->call_CSE_API_regime_callback) {
      thread_regime_birth_callback_issue(CSE_API_REGIME_ID,
        thread_regime_context_ptr_get(CSE_OSS_thread_local_info->execution_context,
                    CSE_API_REGIME_ID))
```

```
        }
        /* call upper level thread wrapper */
        CSE_OSS_thread_handle->thread_body(CSE_OSS_thread_handle->thread_body_context);
        if (CSE_OSS_thread_handle->call_CSE_API_regime_callback) {
            thread_regime_death_callback_issue(CSE_API_REGIME_ID,
                thread_regime_context_ptr_get(CSE_OSS_thread_local_info->execution_context,
                    CSE_API_REGIME_ID))
        }
        execution_context_pop(&CSE_OSS_thread_local_info->execution_context);
}/* end CSE_OSS_thread_wrapper
CSE_API_thread_wrapper(CSE_API_thread_handle)
{
    execution_context = execution_context_find( );
    initialize CSE_API_thread_handle fields specific to thread body (e.g.
        CSE_API_thread_handle->thread_id = get_os_native_thread_id( ))
    execution_context->CSE_API_thread_handle = CSE_API_thread_handle
    if (CSE_API_thread_handle->call_TR1_regime_callback) {
        thread_regime_birth_callback_issue(TR1_REGIME_ID,
            thread_regime_context_ptr_get(execution_context, TR1_REGIME_ID))
    }
    if (CSE_API_thread_handle->call_TR2_regime_callback) {
        thread_regime_birth_callback_issue(TR2_REGIME_ID,
            thread_regime_context_ptr_get(execution_context, TR2_REGIME_ID))
    }
    CSE_API_thread_handle->thread_body(CSE_API_thread_handle->thread_body_context);
    if (CSE_API_thread_handle->call_TR2_regime_callback) {
        thread_regime_death_callback_issue(TR2_REGIME_ID,
            thread_regime_context_ptr_get(execution_context, TR2_REGIME_ID))
    }
    if (CSE_API_thread_handle->call_TR1_regime_callback) {
        thread_regime_death_callback_issue(TR1_REGIME_ID,
            thread_regime_context_ptr_get(execution_context, TR1_REGIME_ID))
    }
}/* end_CSE_API_thread wrapper
TRI__thread_wrapper(TR1_thread_handle)
{
    execution_context = execution_context_find( );
    initialize TR1_thread_handle fields specific to thread body
        (e.g. TR1_thread_handle->errno_value = 0)
    execution_context->TR1_thread_handle = TR1_thread_handle;
    TRI_thread_handle->thread_body(TR1_thread_handle->thread_body_context);
}/* end_TR1_thread_wrapper
TR2_thread_wrapper(TR2_thread_handle)
{
    execution_context = execution_context_find( );
    initialize TR2_thread_handle fields specific to thread body
        (e.g. TR2_thread_handle->last_error = 0)
    execution_context->TR2_thread_handle = TR2_thread_handle;
    TR2_thread_handle->thread_body(TR2_thread_handle->thread_body_context);
}/* end TR2_thread_wrapper
```

Following are more detailed descriptions of initialize and deinitialization routines that may be invoked in connection with initializing and deinitializing each regime. As part of initialization of a regime, the register API described herein may be invoked and as part of deinitialization, the unregister API described herein may be invoked.

```
TR1_world_init(arg1f, ..., argNf)
{
    /* register TR1 thread birth/death callbacks */
    thread_regime_callbacks_register(TR1_REGIME_ID, TR1_thread_birth_callback,
        TR1_thread_death_callback);
    /* perform misc initialization specific to TR1 threading regime */
}
TR1_world_deinit(arg1g, ..., argNg)
{
    /* perform misc deinitialization specific to TR1 threading regime */
    /* unregister TR1 thread birth/death callbacks */
    thread_regime_callbacks_unregister(TR1_REGIME_ID)
}
TR2_world_init(arg1h, ..., argNh)
{
    /* register TR2 thread birth/death callbacks */
    thread_regime_callbacks_register(TR2_REGIME_ID, TR2_thread_birth_callback,
        TR2_thread_death_callback);
    /* perform misc initialization specific to TR2 threading regime */
}
TR2_world_deinit(arg1i, ..., argNi)
```

```
{
  /* perform misc deinitialization specific to TR2 threading regime */
  /* unregister TR2 thread birth/death callbacks */
  thread_regime_callbacks_unregister(TR2_REGIME_ID)
}
CSE_API_world_init(arg1j, ..., argNj)
{
  /* register CSE_API thread birth/death callbacks */
  thread_regime_callbacks_register(CSE_API_REGIME_ID, CSE_API_thread_birth_callback,
      CSE_API_thread_death_callback);
  /* perform misc initialization specific to CSE_API threading regime */
}
CSE_ API_world_deinit(arg1k, ..., argNk)
{
  /* perform misc deinitialization specific to CSE_API threading regime */
  /* unregister CSE_API thread birth/death callbacks */
  thread_regime_callbacks_unregister(CSE_API_REGIME_ID)
}
CSE_OSS_world_init(arg1m, ..., argNm)
{
  initialize thread _world_global_info
  /* register CSE OSS_thread birth/death callbacks */
  thread_regime_callbacks_register(CSE_OSS_REGIME_ID, CSE_OSS_thread_birth_callback,
      CSE_OSS_thread_death_callback);
  /* perform misc initialization specific to CSE_OSS threading regime */
}
CSE_OSS_world_deinit(arg1n, ..., argNm)
{
  /* perform misc deinitialization specific to CSE_OSS threading regime */
  /* unregister CSE_OSS thread birth/death callbacks */
  thread_regime_callbacks_unregister(CSE_OSS_REGIME_ID)
}
```

Following are more detailed descriptions regarding processing that may be performed for the birth and death callbacks registered for each regime.

```
TR1_thread_birth_callback(regime_context_ptr)
{
    allocate TR1_thread_handle memory
    initialize TR1_thread_handle fields specific to thread
        (e.g. TR1_thread_handle->errno_value = 0)
    *regime_context_ptr = TR1_thread_handle
}
TR1_thread_death_callback(regime_context)
{
  execution_context = execution_context_find( )
  TR1_thread_handle = regime_context
  deinitialize TR1_thread_handle fields specific to thread
  execution_context->regime_context[TR1_REGIME_ID] = INITIALIZE_ON_FIRST_USE;
  free TR1_thread_handle memory
}
TR2_thread_birth_callback(regime_context_ptr)
{
  execution_context = execution_context_find( )
  allocate TR2_thread_handle memory
  initialize TR2_thread_handle fields specific to thread (e.g. TR2_thread_handle->last_error = 0)
    *regime_context_ptr = TR2_thread_handle
}
TR2_thread_death_callback(regime_context)
{
  execution_context = execution_context_find( )
  TR2_thread_handle = regime_context
  deinitialize_TR2_thread_handle fields specific to thread
  execution_context->regime_context[TR2_REGIME_ID] = INITIALIZE_ON_FIRST_USE;
  free TR2_thread_handle memory
}
CSE_API_thread_birth_callback(regime_context_ptr)
{
  execution_context = execution_context_find( )
  allocate CSE_API_thread_handle memory
  initialize CSE_API_thread_handle fields specific to thread
        (e.g. CSE_API_thread_handle->thread_id = get_os_native_thread_id( ))
  CSE_API_thread_handle->execution_context = execution_context;
```

-continued

```
  /* issue regime callback for above regime. */
  thread_regime_birth_callback_issue(TR1_REGIME_ID,
      thread_regime_context_ptr_get(execution_context, TR1_REGIME_ID))
  thread_regime_birth_callback issue(TR2_REGIME_ID,
      thread_regime_context_ptr_get(execution_context, TR2_REGIME_ID))
  *regime_context_ptr = CSE_API_thread_handle
}
CSE_API_thread_death_callback(regime_context)
{
  CSE_API_thread_handle = regime_context
  deinitialize CSE_API_thread_handle fields specific to thread
  /* call the death callback for the regime_id above us */
  thread_regime_death_callback_issue(TR2_REGIME_ID,
      thread_regime_context_ptr_get(CSE_API_thread_handle->execution_context,
      TR2_REGIME_ID))
  /* call the death callback for the regime_id above us */
  thread_regime_death_callback_issue(TR1_REGIME_ID,
      thread_regime_context_ptr_get(CSE_API_thread_handle->execution_context,
      TR1_REGIME_ID))
  CSE_API_thread_handle->execution_context->regime_context[regime_id] =
      INITIALIZE_ON_FIRST_USE;
  free CSE_API_thread_handle memory
}
CSE_OSS_thread_birth_callback(regime_context_ptr)
{
  allocate memory for CSE_OSS_thread_impersonate_info
      (contains CSE_OSS_thread_handle and CSE_OSS_thread_local_info)
  initialize CSE_OSS_thread_handle fields specific to thread
      (e.g. CSE_OSS_thread_handle->local_info = &CSE_OSS_thread_local_info);
  execution_context_push(THREAD_TYPE,
      &CSE_OSS_thread_local_info->execution_context);
  /* issue regime callback for above regime. if we ended up here then we definitely need
context for regimes above us */
  thread_regime_birth_callback_issue(CSE_API_REGIME_ID,
      thread_regime_context_ptr_get(CSE_OSS_thread_local_info->execution_context,
      CSE_API_REGIME_ID))
  *regime_context_ptr = CSE_OSS_thread_impersonate_info;
}
CSE_OSS_thread_death_callback(regime_context)
{
  CSE_OSS_thread_impersonate_info = regime_context
  deinitialize CSE_API_thread_handle fields specific to thread
  /* call the death callback for the regime above us */
  thread_regime_death_callback_issue(CSE_API_REGIME_ID,
      thread_regime_context_ptr_get(CSE_OSS_thread_local_info->execution_context,
      CSE_API_REGIME_ID))
  CSE_OSS_thread_local_info->execution_context->regime_context[regime_id] =
      INITIALIZE_ON_FIRST_USE;
  /* if we're cleaning up after the current thread then pop its execution context to clear the
OS
      native TLS entry.
   */
  if (execution_context_find( ) == &CSE_OSS_thread_local_info->execution_context) {
    execution_context_pop(&CSE_OSS_thread_local_info->execution_context);
  }
  free CSE_OSS_thread_impersonate_info memory
}
```

Following are more processing details provided regarding miscellaneous routines referenced or invoked from other routines.

```
/* initialize the given execution context and store a pointer to it in OS provided thread local
storage */
execution_context_find( )
{
  retrieve execution context pointer for current thread from OS provided thread local storage
and
      return it to caller
}/* end execution context find
execution_context_push(type, execution_context)
{/* push execution_context in OS structure of execution contexts
  /* initialize various execution context fields */
  execution_context->type = type;
  execution_context->spinlock_count = 0;
  /* initialize each possible regime to init on first use */
```

```
    for (idx = 0; idx < REGIME_COUNT; idx++) {
      execution_context->regime_context[idx] = INITIALIZE_ON_FIRST_USE
    }
    execution_context->disable_mask = 0;
    execution_context->inuse_mask = 0;
    /* if there is a previous execution_context pointer already around then chain it to this one
*/
    execution_context->execution_context_next = execution_context_find( )
    /* set the os native thread local storage to point to the current execution context */
    set_os_native_tls_ptr(execution_context);
}/* end execution context push
/* deinitialize the given execution context and change OS provided thread local storage to no
longer point to it */
execution_context_pop(execution_context)
{
    /* validate that the execution_context argument is in good shape */
    check_sanity_of_various_execution_context_fields( )
    /* set os native thread local storage pointer to point to the next execution context (NULL if
this
is the only one) */
    set_os_native_tls_ptr(execution_context->execution_context_next);
}/* end execution context pop
/* return pointer to regime context for given regime */
thread_regime_context_ptr_get(execution_context, regime_id)
{
    return &execution_context->regime_context[regime_id];
}/* end thread regime context ptr get
/* return pointer to regime context for a given regime if it exists. If it doesn't exist, we create
it
        on demand */
thread_regime_context_get_and_init_on_first_use(execution_context, regime_id)
{
    /* this happens when a thread already exists before a REGIME has been registered */
    if (execution_context->regime_context[regime_id] == INITIALIZE_ON_FIRST_USE) {
       thread_regime_birth_callback_issue(regime_id,
thread_regime_context_ptr_get(execution_context, regime_id))
    }
    return execution_context->regime_context[regime_id]
}/* end thread_regime_context_get_and_init_on_first_use
/* set bit in execution context disable_mask indicating that regime callbacks are disabled for a
given regime */
thread_regime_callbacks_disable(regime_id)
{
    execution_context = execution_context_find( );
    set_bit(execution_context->disable_mask, regime_id);
}/* end thread regime callbacks disable
/* set bit in execution context disable_mask indicating that regime callbacks are enabled for a
given regime */
thread_regime_callbacks_enable(regime_id)
{
    execution_context = execution_context_find( );
    clear_bit(execution_context->disable_mask, regime_id)
}/* end thread regime callbacks enable
/* check bit in execution context disable mask to see if regime callbacks are enabled for a
given
        regime */
thread_regime_callbacks_are_disabled(regime_id)
{
    execution_context = execution_context_find( );
    if bit_is_set(execution_context->disable_mask, regime_id)
       return TRUE
    else
       return FALSE
}/* end thread_regime_callbacks_are_disabled
thread_regime_death_callback_issue(regime_id, regime_context_ptr)
{
    /* if the context ptr is valid, and death callbacks are registered for this regime, and the con-
text
pointer isn't still set to initialize on first use, then call the death callback */
    if (*regime_context_ptr) &&
        (thread_world_global_info.regime_info[regime_id].death_callback) &&
        (*regime_context_ptr != INITIALIZE_ON_FIRST_USE)) {
      execution_context = execution_context_find( )
        /* clear context to indicate regime is no longer in use */
      clear_bit(execution_context->inuse_mask, regime_id);
        /* if context is no longer in use remove it from global context list */
      if (execution_context->inuse_mask == 0) {
         remove_context_from_list(thread_world_global_info.execution_context_list,
            execution_context)
      }
```

```
    /* decrement count of outstanding threads */
    thread_world_global_info.regime_info[regime_id].outstanding_thread_count--;
    /* call registered death callback */
    thread_world_global_info.regime_info[regime_id].death_callback(*regime_context_ptr)
  }
}/* end thread_regime_death_callback_issue
```

Following is more detail regarding processing performed by the register and unregister APIs in an embodiment in accordance with techniques herein

```
/* register birth/death callbacks for a given threading regime */
thread_regime_callbacks_register(regime_id, birth_callback, death_callback)
{
  thread_world_global_info.regime_info[regime_id].birth_callback = birth_callback;
  thread_world_global_info.regime_info[regime_id].death_callback = death_callback;
  thread_world_global_info.regime_info[regime_id].outstanding_thread_count = 0;
} /* end_thread_regime_callbacks_register
/* unregister birth/death callbacks for a given threading regime */
thread_regime_callbacks_unregister(regime_id)
{
  /* if there are any contexts that haven't been cleaned up yet for the given regime then
     let's clean them up */
  if (thread_world_global_info.regime_info[regime_id].outstanding_thread_count > 0) {
    for each execution_context entry in thread_world_global_info.execution_context_list
  {
      /* if the context is in use for this regime set it to no longer be in use */
      if (bit_is_set(execution_context->inuse_mask,_regime_id) {
        clear_bit(execution_context->inuse_mask, regime_id)
        /* if the context is no longer used at all we can stop tracking it in the global
list */
        if (execution_context->inuse_mask == 0) {
          remove_context_from_list(thread_world_global_info.execution_context_list,
execution_context)
        }
        /* call the death callback for the regime */
        thread_world_global_info.regime_info[regime_id].death_callback(execution_
context->regime_context[regime_id]);
      }
    }
  }
  /* set the birth/death callbacks for this regime to NULL so they are no longer called
  when a thread is created */
  thread_world_global_info.regime_info[regime_id].birth_callback = NULL;
  thread_world_global_info.regime_info[regime_id].death_callback = NULL;
}/* end thread_regime_callbacks_unregister
```

Although the techniques herein are illustrated in an exemplary embodiment of a data storage system, the techniques herein may be used in connection with code executing on any suitable processor on any system. For example, an embodiment may implement the techniques herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of creating a thread comprising:

issuing a first plurality of calls to create the thread, said first plurality of calls forming a call chain traversing a plurality of code layers, said first plurality of calls being included in a first runtime execution stack of an executing first thread, each of said plurality of code layers providing an interface for invoking code of said each code layer to create the thread, wherein, for the thread being created as a result of said first plurality of calls, a data area including thread-specific context information is created and initialized at each of said plurality of code layers when code of said each code layer is invoked in accordance with said interface of said each code layer to create the thread, wherein each of said plurality of code layers is included in a registered set of code layers, wherein a first code layer of the registered set is not included in the first plurality of calls whereby, as a result of the first plurality of calls, no data area is created and initialized for the first code layer;

responsive to a last one of the first plurality of calls in the call chain being issued to a last one of the plurality of rode layers from another one of the plurality of code layers, creating the thread; and executing the thread, wherein said executing the thread includes issuing a second plurality of calls forming a callback call chain, wherein said second plurality of calls are included in a second runtime stack for the thread created and results in transferring control to a first body of code for the thread, wherein a birth callback routine of said first code layer is invoked in connection with said second plurality of calls performed by the thread and the birth callback routine performs processing comprising creating and initializing a data area including thread-specific context information for the thread for the first code layer.

2. The method of claim 1, wherein said first body of code begins execution responsive to said transferring control to the first body of code.

3. The method of claim 1, wherein the first plurality of calls forms the call chain traversing the plurality of layers in a first order and wherein the second plurality of calls forming the callback call chain traverses the plurality of code layers in an order that is a reverse of said first order, and wherein said issuing said second plurality of calls results in creating and initializing a data area including thread-specific context information for the thread for each code layer that is included in the registered set and wherein said each code layer is also not included in the plurality of code layers traversed when issuing said first plurality of calls to create the thread.

4. The method of claim 3, wherein each of said code layers in said registered set registers a birth callback routine and a death callback routine.

5. The method of claim 4, wherein the birth callback routine of said each code layer is invoked to perform processing including creating and initializing a data area including thread-specific context information for said each code layer.

6. The method of claim 5, wherein, for each code layer of the registered set that is not included in said plurality of code layers traversed when issuing the first plurality of calls, the birth callback routine of said each code layer of the registered set is subsequently invoked in connection with performing said issuing a second plurality of calls forming a callback call chain traversing said plurality of code layers in an order that is a reverse of said first order.

7. The method of claim 6, wherein, subsequent to said transferring control to said first body of code for the thread, a new code layer registers and is thereby included in said registered set.

8. The method of claim 7, further comprising:
executing code of the thread which results in transferring control to first code of said new code layer, said first code of said new code layer using thread-specific context information for said new code layer for said thread;
determining that a data area including thread-specific context information for the new code layer for the thread does not exist; and
responsive to said determining, creating and initializing a data area including thread-specific context information for the new code layer for the thread.

9. The method of claim 8, wherein said first code of said new code layer performs processing using at least some of the thread-specific context information for said new code layer for said thread.

10. The method of claim 8, wherein said creating and initializing a data area including thread-specific context information for the new code layer for the thread further includes:
invoking a birth callback routine of said new code layer.

11. The method of claim 6, wherein the method further comprises the thread completing execution.

12. The method of claim 11, wherein said first plurality of calls includes a first call issued by the executing first thread to one of the plurality of code layers to commence processing to create the thread, and wherein, responsive to said thread completing execution, first processing is performed, said first processing including:
unwinding said second runtime execution stack including returning through said second plurality of calls of the second runtime execution stack, wherein said returning through said second plurality of calls includes invoking a death callback routine for each of said code layers of said registered set if a birth callback routine for said each code layer was previously executed, and
wherein, subsequent to the thread being created, processing is performed to unwind said first runtime execution stack including returning through said first plurality of calls of the first runtime execution stack whereby the executing first thread continues execution of code following the first call.

13. The method of claim 12, wherein a death callback routine for the first code layer of said registered set performs second processing including:
deallocating storage for a first data area including thread-specific context information for said first code layer of the registered set, wherein said first data area was previously created and initialized by code of the birth callback routine of said first code layer of the registered set.

14. The method of claim 6, wherein, responsive to invoking code of one code layer of the plurality of code layers to create the thread as part of said issuing said first plurality of calls, an entry in a disable bit mask array is set to denote that said one code layer is included in the call chain comprising the first plurality of calls.

15. The method claim 14, wherein said issuing said first plurality of calls includes executing first code of a second of said plurality of code layers that performs processing comprising:
determining, using said disable bit mask array, for each supported code layer that is able to issue a create thread call to said second code layer using said interface of said second code layer to create a thread, whether said each supported code layer issued said create thread call in said first plurality of calls; and
setting a data item to have a value in accordance with said determining, said data item being included in first thread-specific context information for said thread for said second code layer.

16. The method of claim 15, wherein said issuing said second plurality of calls includes executing second code of said second code layer that determines, using said first thread-specific information for said thread for said second code layer, whether to invoke a birth callback of each supported code layer able to issue said create thread call to said first code layer to create a thread.

17. The method of claim 13, wherein one of the plurality of code layers in the registered set performs processing to unregister, wherein a first death callback was specified for said one code layer when previously registering said one code layer, and wherein said first death callback is invoked for each existing first data area including thread specific context information for said one code layer.

18. A non-transitory computer readable medium comprising code stored thereon that, when executed, performs a method for creating a thread for execution comprising:
  issuing a first plurality of calls to create the thread, said first plurality of calls forming a call chain traversing a plurality of code layers, said first plurality of calls being included in a first runtime execution stack of an executing first thread, each of said plurality of code layers providing an interface for invoking code of said each code layer to create the thread, wherein, for the thread being created as a result of said first plurality of calls, a data area including thread-specific context information is created and initialized at each of said plurality of code layers when code of said each code layer is invoked in accordance with said interface of said each code layer to create the thread, wherein each of said plurality of code layers is included in a registered set of code layers, wherein a first code layer of the registered set is not included in the first plurality of calls whereby, as a result of the first plurality of calls, no data area is created and initialized for the first code layer;
  responsive to a last one of the first plurality of calls in the call chain being issued to a last one of the plurality of code layers from another one of the plurality of code layers, creating the thread; and
  executing the thread, wherein said executing the thread includes issuing a second plurality of calls forming a callback call chain, wherein said second plurality of calls are included in a second runtime stack for the thread created and results in transferring control to a first body of code for the thread, wherein a birth callback routine of said first code layer is invoked in connection with said second plurality of calls performed by the thread and the birth callback routine performs processing comprising creating and initializing a data area including thread-specific context information for the thread for the first code layer.

19. The non-transitory computer readable medium, of claim 18, wherein said first body of code begins execution responsive to said transferring control to the first body of code and wherein each of said code layers in said registered set registers a birth callback routine and a death callback routine.

20. The non-transitory computer readable medium of claim 18, wherein said issuing said second plurality of calls results in creating and initializing a data area including thread-specific context information for the thread for each code layer that is included in the registered set, and wherein said each code layer is also not included in the plurality of code layers traversed when issuing said first plurality of calls to create the thread.

21. A system comprising:
  a processor; and
  a memory comprising code stored thereon that, when executed, performs a method of creating a thread comprising:
    issuing a first plurality of calls to create the thread, said first plurality of calls forming a call chain traversing a plurality of code layers, said first plurality of calls being included in a first runtime execution stack of an executing first thread, each of said plurality of code layers providing an interface for invoking code of said each code layer to create the thread, wherein, for the thread being created as a result of said first plurality of calls, a data area including thread-specific context information is created and initialized at each of said plurality of code layers when code of said each code layer is invoked in accordance with said interface of said each code layer to create the thread, wherein each of said plurality of code layers is included in a registered set of code layers, wherein a first code layer of the registered set is not included in the first plurality of calls whereby, as a result of the first plurality of calls, DO data area is created and initialized for the first code layer;
    responsive to a last one of the first plurality of calls in the call chain being issued to a last one of the plurality of code layers from another one of the plurality of code layers, creating the thread; and
    executing the thread, wherein said executing the thread includes issuing a second plurality of calls forming a callback call chain, wherein said second plurality of calls are included in a second runtime stack for the thread created and results in transferring control to a first body of code for the thread, wherein a birth callback routine of said first code layer is invoked in connection with said second plurality of calls performed by the thread and the birth callback routine performs processing comprising creating and initializing a data area including thread-specific context information for the thread for the first code layer.

\* \* \* \* \*